(12) United States Patent
Cao et al.

(10) Patent No.: US 12,261,541 B2
(45) Date of Patent: *Mar. 25, 2025

(54) SYSTEMS AND METHODS FOR SYNCHRONOUS RECTIFICATION OF POWER SUPPLY SYSTEMS

(71) Applicant: ON-BRIGHT ELECTRONICS (SHANGHAI) CO., LTD., Shanghai (CN)

(72) Inventors: Yaming Cao, Shanghai (CN); Wuping Lin, Shanghai (CN); Chunsheng Zhao, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,512

(22) Filed: Jul. 24, 2023

(65) Prior Publication Data

US 2024/0063724 A1    Feb. 22, 2024

Related U.S. Application Data

(63) Continuation of application No. 17/333,844, filed on May 28, 2021, now Pat. No. 11,757,366.

(30) Foreign Application Priority Data

May 29, 2020 (CN) .......................... 202010471872.1

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0012* (2021.05); *H02M 1/08* (2013.01)

(58) Field of Classification Search
CPC .......... H02M 3/33592; H02M 1/0012; H02M 1/0025; H02M 1/0006; Y02B 70/10
See application file for complete search history.

(56) References Cited

U.S. PATENT DOCUMENTS

| 6,069,804 A | 5/2000 | Ingman et al. |
| 6,091,233 A | 7/2000 | Hwang et al. |

(Continued)

FOREIGN PATENT DOCUMENTS

| CN | 2529442 Y | 1/2003 |
| CN | 101106333 A | 1/2008 |

(Continued)

OTHER PUBLICATIONS

Chinese Patent Office, Office Action issued Apr. 6, 2022, in Application No. 202110771012.4.

(Continued)

*Primary Examiner* — Kyle J Moody
*Assistant Examiner* — Jye-June Lee
(74) *Attorney, Agent, or Firm* — Faegre Drinker Biddle & Reath LLP

(57) ABSTRACT

System and method for synchronous rectification of a power converter. For example, the system for synchronous rectification includes: a first system terminal configured to receive an input voltage; and a second system terminal configured to output a drive signal to a first transistor terminal of a transistor, the transistor further including a second transistor terminal and a third transistor terminal, the second transistor terminal being connected to a secondary winding of the power converter, the power converter further including a primary winding coupled to the secondary winding; wherein the system is configured to: determine whether the input voltage becomes lower than a predetermined voltage threshold; and if the input voltage becomes lower than the prede- (Continued)

termined voltage threshold, determine whether a time when the input voltage becomes lower than the predetermined voltage threshold is during or not during a demagnetization process of the secondary winding.

35 Claims, 20 Drawing Sheets

(56) References Cited

U.S. PATENT DOCUMENTS

| | | |
|---|---|---|
| 6,198,638 B1 | 3/2001 | Lee |
| 6,972,969 B1 | 12/2005 | Shteynberg et al. |
| 7,173,835 B1 | 2/2007 | Yang |
| 7,447,049 B2 | 11/2008 | Garner et al. |
| 7,768,801 B2 | 8/2010 | Usui et al. |
| 7,791,903 B2 | 9/2010 | Zhang et al. |
| 7,826,237 B2 | 11/2010 | Zhang et al. |
| 7,869,231 B2 | 1/2011 | Cohen |
| 7,952,894 B2 | 5/2011 | Lin et al. |
| 8,102,676 B2 | 1/2012 | Huynh et al. |
| 8,134,851 B2 | 3/2012 | Soldano et al. |
| 8,391,028 B2 | 3/2013 | Yeh |
| 8,542,507 B2 | 9/2013 | Hsu et al. |
| 8,570,772 B2 | 10/2013 | Morris et al. |
| 8,953,342 B2 | 2/2015 | Fang |
| 9,413,246 B2 | 8/2016 | Luo et al. |
| 9,595,874 B2 | 3/2017 | Cao et al. |
| 9,602,006 B2 | 3/2017 | Fahlenkamp |
| 9,608,532 B2 | 3/2017 | Wong et al. |
| 9,787,198 B1 | 10/2017 | Cao et al. |
| 10,003,268 B2 | 6/2018 | Fang et al. |
| 10,063,131 B2 | 8/2018 | Yang et al. |
| 10,063,153 B2 | 8/2018 | Fang |
| 10,122,284 B2 | 11/2018 | Fang |
| 10,148,189 B2 | 12/2018 | Cao et al. |
| 10,158,298 B2 | 12/2018 | Lin et al. |
| 10,193,451 B2 | 1/2019 | Luo et al. |
| 10,270,354 B1 | 4/2019 | Lu et al. |
| 10,411,604 B2 | 9/2019 | Cao et al. |
| 10,411,605 B2 | 9/2019 | Cao et al. |
| 10,432,096 B2 | 10/2019 | Fang et al. |
| 10,432,104 B2 | 10/2019 | Li et al. |
| 10,483,856 B2 | 11/2019 | Cao et al. |
| 10,505,442 B2 * | 12/2019 | Wong ................ H02M 3/33592 |
| 10,516,341 B1 * | 12/2019 | Fu ...................... H02M 3/33592 |
| 10,608,544 B2 * | 3/2020 | Moon ................ H02M 3/33592 |
| 10,622,902 B2 | 4/2020 | Cao et al. |
| 10,622,903 B2 | 4/2020 | Cao et al. |
| 10,651,747 B2 | 5/2020 | Cao et al. |
| 10,756,640 B1 | 8/2020 | Radic et al. |
| 10,819,211 B2 * | 10/2020 | Yang ................. H02M 3/33507 |
| 11,005,364 B1 | 5/2021 | Radic |
| 11,356,030 B2 | 6/2022 | Miao et al. |
| 11,581,815 B2 | 2/2023 | Cao et al. |
| 11,588,405 B2 | 2/2023 | Cao et al. |
| 11,757,366 B2 * | 9/2023 | Cao .................... H02M 3/33592 363/21.14 |
| 11,764,684 B2 | 9/2023 | Cao et al. |
| 11,764,697 B2 | 9/2023 | Zhao et al. |
| 2002/0114172 A1 | 8/2002 | Webb et al. |
| 2003/0117119 A1 | 6/2003 | Bridge |
| 2004/0125621 A1 | 7/2004 | Yang et al. |
| 2004/0257834 A1 | 12/2004 | Kazem |
| 2005/0024897 A1 | 2/2005 | Yang et al. |
| 2005/0057951 A1 | 3/2005 | Berghegger |
| 2006/0018135 A1 | 1/2006 | Yang et al. |
| 2007/0014133 A1 | 1/2007 | Shao et al. |
| 2007/0139095 A1 | 6/2007 | Fang et al. |
| 2008/0037302 A1 | 2/2008 | Yang |
| 2008/0309312 A1 | 12/2008 | Lin et al. |
| 2009/0168464 A1 | 7/2009 | Lin et al. |
| 2009/0257644 A1 | 10/2009 | Dodzin et al. |
| 2009/0322300 A1 | 12/2009 | Melanson et al. |
| 2010/0008106 A1 | 1/2010 | Kawabe et al. |
| 2010/0027298 A1 | 2/2010 | Cohen |
| 2010/0128501 A1 | 5/2010 | Huang et al. |
| 2010/0219802 A1 | 9/2010 | Lin et al. |
| 2011/0002145 A1 | 1/2011 | Halberstadt |
| 2011/0019446 A1 | 1/2011 | Wu et al. |
| 2011/0044076 A1 | 2/2011 | Zhang et al. |
| 2011/0157919 A1 | 6/2011 | Yedevelly et al. |
| 2011/0169463 A1 | 7/2011 | Yang et al. |
| 2011/0305055 A1 | 12/2011 | Hsu et al. |
| 2012/0032708 A1 | 2/2012 | Coleman |
| 2012/0075891 A1 | 3/2012 | Zhang et al. |
| 2012/0300506 A1 | 11/2012 | Lee et al. |
| 2012/0300520 A1 | 11/2012 | Ren et al. |
| 2013/0033236 A1 | 2/2013 | Li et al. |
| 2013/0235620 A1 | 9/2013 | Morris et al. |
| 2013/0258723 A1 | 10/2013 | Fang et al. |
| 2013/0272036 A1 | 10/2013 | Fang |
| 2014/0021786 A1 | 1/2014 | Fang |
| 2014/0204625 A1 | 7/2014 | Liu et al. |
| 2014/0218976 A1 | 8/2014 | Luo et al. |
| 2014/0368254 A1 | 12/2014 | Lee et al. |
| 2014/0376272 A1 | 12/2014 | Miao |
| 2015/0070944 A1 | 3/2015 | Fang |
| 2015/0229223 A1 | 8/2015 | Cao et al. |
| 2015/0249380 A1 | 9/2015 | Hayakawa et al. |
| 2015/0280584 A1 | 10/2015 | Gong et al. |
| 2016/0141961 A1 | 5/2016 | Odell et al. |
| 2016/0149499 A1 | 5/2016 | Fang |
| 2016/0322909 A1 | 11/2016 | Cao et al. |
| 2017/0005578 A1 | 1/2017 | Luo et al. |
| 2017/0063246 A1 | 3/2017 | Kong et al. |
| 2017/0126138 A1 | 5/2017 | Cao et al. |
| 2017/0155322 A1 | 6/2017 | Zhang et al. |
| 2017/0222569 A1 | 8/2017 | Choi et al. |
| 2017/0264287 A1 | 9/2017 | Osanai |
| 2017/0353099 A1 | 12/2017 | Yang et al. |
| 2018/0013352 A1 | 1/2018 | Cao et al. |
| 2018/0034377 A1 | 2/2018 | Cao et al. |
| 2018/0076720 A1 | 3/2018 | Cao et al. |
| 2018/0212527 A1 | 7/2018 | Kong et al. |
| 2018/0248488 A1 * | 8/2018 | Cao .................... H02M 3/33592 |
| 2018/0294735 A1 | 10/2018 | Song et al. |
| 2019/0020282 A1 | 1/2019 | Li et al. |
| 2019/0068073 A1 | 2/2019 | Cao et al. |
| 2019/0393767 A1 | 12/2019 | Hwang et al. |
| 2019/0393790 A1 | 12/2019 | Cao et al. |
| 2020/0036293 A1 | 1/2020 | Kannan et al. |
| 2020/0161985 A1 | 5/2020 | Li et al. |
| 2020/0280259 A1 | 9/2020 | Cao et al. |
| 2020/0280260 A1 | 9/2020 | Cao et al. |
| 2020/0336071 A1 | 10/2020 | Iorio et al. |
| 2020/0343810 A1 | 10/2020 | Xu et al. |
| 2021/0091675 A1 | 3/2021 | Rajesh et al. |
| 2021/0226540 A1 | 7/2021 | Zhao et al. |
| 2021/0376746 A1 | 12/2021 | Cao et al. |
| 2022/0006392 A1 | 1/2022 | Chen et al. |
| 2022/0294355 A1 | 9/2022 | Lin et al. |
| 2022/0329171 A1 | 10/2022 | Zhao et al. |
| 2023/0010393 A1 | 1/2023 | Zhao |
| 2023/0033953 A1 | 2/2023 | Cao |
| 2024/0072678 A1 | 2/2024 | Zhao et al. |

FOREIGN PATENT DOCUMENTS

| | | |
|---|---|---|
| CN | 101188384 A | 5/2008 |
| CN | 101272089 A | 9/2008 |
| CN | 101378232 A | 3/2009 |
| CN | 201238265 Y | 5/2009 |
| CN | 201435677 Y | 3/2010 |
| CN | 101841247 A | 9/2010 |
| CN | 102017376 A | 4/2011 |
| CN | 102104338 A | 6/2011 |
| CN | 102185501 A | 9/2011 |
| CN | 102217181 A | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 102882377 A | 1/2013 |

(56) References Cited

FOREIGN PATENT DOCUMENTS

| | | | |
|---|---|---|---|
| CN | 103296867 A | 9/2013 |
| CN | 103378751 A | 10/2013 |
| CN | 103501112 A | 1/2014 |
| CN | 103728572 A | 4/2014 |
| CN | 103887980 A | 6/2014 |
| CN | 104300793 A | 1/2015 |
| CN | 104393763 A | 3/2015 |
| CN | 105322800 A | 2/2016 |
| CN | 105356727 A | 2/2016 |
| CN | 105846695 A | 8/2016 |
| CN | 106026703 A | 10/2016 |
| CN | 106130349 A | 11/2016 |
| CN | 107104598 A | 8/2017 |
| CN | 206379873 U | 8/2017 |
| CN | 107342691 A | 11/2017 |
| CN | 107579670 A | 1/2018 |
| CN | 107872158 A | 4/2018 |
| CN | 107979289 A | 5/2018 |
| CN | 108566104 A | 9/2018 |
| CN | 108736749 A | 11/2018 |
| CN | 108880296 A | 11/2018 |
| CN | 109274272 A | 1/2019 |
| CN | 109802559 A | 5/2019 |
| CN | 110620514 A | 12/2019 |
| CN | 209913730 U | 1/2020 |
| CN | 110896283 A | 3/2020 |
| CN | 110995013 A | 4/2020 |
| CN | 111146961 A | 5/2020 |
| CN | 111193407 A | 5/2020 |
| CN | 111404403 A | 7/2020 |
| CN | 211296573 U | 8/2020 |
| CN | 111697838 A | 9/2020 |
| CN | 111865095 A | 10/2020 |
| CN | 112688570 A | 4/2021 |
| CN | 112803773 A | 5/2021 |
| EP | 2525480 A1 | 11/2012 |
| JP | 2000-014136 A | 1/2000 |
| JP | 2007-028894 A | 2/2007 |
| JP | 2009-124296 A | 6/2009 |
| JP | 2009-261042 A | 11/2009 |
| JP | 2009-278717 A | 11/2009 |
| JP | 5285602 B2 | 9/2013 |
| JP | 6351787 B2 | 7/2018 |
| TW | 200717978 A | 5/2007 |
| TW | I366335 B | 6/2012 |
| TW | 201234854 A | 8/2012 |
| TW | I401866 B | 7/2013 |
| TW | I436571 B | 5/2014 |
| TW | I448064 B | 8/2014 |
| TW | 201521347 A | 6/2015 |
| TW | I489751 B | 6/2015 |
| TW | 201537882 A | 10/2015 |
| TW | I509971 B | 11/2015 |
| TW | 201707361 A | 2/2017 |
| TW | I625924 B | 6/2018 |
| TW | I635699 B | 9/2018 |
| TW | 201919322 A | 5/2019 |
| TW | 201933752 A | 8/2019 |
| TW | 201937834 A | 9/2019 |
| TW | 202002494 A | 1/2020 |
| TW | 202019066 A | 5/2020 |
| TW | 202110051 A | 3/2021 |
| TW | 202114333 A | 4/2021 |

OTHER PUBLICATIONS

Chinese Patent Office, Office Action issued Dec. 20, 2017, in Application No. 201610345719.8.
Chinese Patent Office, Office Action issued Dec. 30, 2021, in Application No. 202110379198.9.
Chinese Patent Office, Office Action issued Jan. 26, 2014, in Application No. 201210118202.7.
Chinese Patent Office, Office Action issued Jul. 5, 2022, in Application No. 202110865735.0.
Chinese Patent Office, Office Action issued Mar. 1, 2022, in Application No. 202110379198.9.
Chinese Patent Office, Office Action issued Mar. 16, 2023, in Application No. 202010471872.1.
Chinese Patent Office, Office Action issued Mar. 19, 2021, in Application No. 202010063404.0.
Chinese Patent Office, Office Action issued Mar. 29, 2022, in Application No. 202110263198.2.
Chinese Patent Office, Office Action issued May 25, 2016, in Application No. 201410729533.3.
Chinese Patent Office, Office Action issued Nov. 2, 2021, in Application No. 202110263198.2.
Chinese Patent Office, Office Action issued Nov. 9, 2018, in Application No. 201710534527.6.
Chinese Patent Office, Office Action issued Oct. 28, 2015, in Application No. 201410093010.4.
Chinese Patent Office, Office Action issued Sep. 4, 2018, in Application No. 201710102817.3.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.
Taiwan Intellectual Property Office, Office Action issued Apr. 13, 2022, in Application No. 110129676.
Taiwan Intellectual Property Office, Office Action issued Dec. 2, 2016, in Application No. 104101330.
Taiwan Intellectual Property Office, Office Action issued Dec. 27, 2017, in Application No. 106111598.
Taiwan Intellectual Property Office, Office Action issued Feb. 23, 2021, in Application No. 109128639.
Taiwan Intellectual Property Office, Office Action issued Mar. 8, 2021, in Application No. 109110084.
Taiwan Intellectual Property Office, Office Action issued May 3, 2022, in Application No. 110138601.
Taiwan Intellectual Property Office, Office Action issued May 4, 2017, in Application No. 105122491.
Taiwan Intellectual Property Office, Office Action issued Oct. 24, 2018, in Application No. 106140199.
Taiwan Intellectual Property Office, Office Action issued Oct. 9, 2014, in Application No. 101118860.
Taiwan Intellectual Property Office, Office Action mailed Nov. 11, 2022, in Application No. 110142621.
Taiwan Intellectual Property Office, Office Action mailed Oct. 11, 2022, in Application No. 110136342.
United States Patent and Trademark Office, Notice of Allowance mailed Apr. 15, 2021, in U.S. Appl. No. 16/503,916.
United States Patent and Trademark Office, Notice of Allowance mailed Apr. 27, 2023, in U.S. Appl. No. 17/333,844.
United States Patent and Trademark Office, Notice of Allowance mailed Feb. 2, 2023, in U.S. Appl. No. 17/333,844.
United States Patent and Trademark Office, Notice of Allowance mailed Feb. 8, 2022, in U.S. Appl. No. 16/503,916.
United States Patent and Trademark Office, Notice of Allowance mailed Jan. 20, 2023, in U.S. Appl. No. 17/152,418.
United States Patent and Trademark Office, Notice of Allowance mailed Jul. 12, 2022, in U.S. Appl. No. 16/787,869.
United States Patent and Trademark Office, Notice of Allowance mailed Jul. 13, 2022, in U.S. Appl. No. 16/786,372.
United States Patent and Trademark Office, Notice of Allowance mailed Jul. 6, 2022, in U.S. Appl. No. 16/503,916.
United States Patent and Trademark Office, Notice of Allowance mailed Mar. 15, 2023, in U.S. Appl. No. 17/333,844.
United States Patent and Trademark Office, Notice of Allowance mailed Mar. 29, 2023, in U.S. Appl. No. 16/786,372.
United States Patent and Trademark Office, Notice of Allowance mailed May 12, 2023, in U.S. Appl. No. 16/786,372.
United States Patent and Trademark Office, Notice of Allowance mailed May 5, 2023, in U.S. Appl. No. 17/152,418.

(56) References Cited

OTHER PUBLICATIONS

United States Patent and Trademark Office, Notice of Allowance mailed Oct. 19, 2022, in U.S. Appl. No. 16/503,916.
United States Patent and Trademark Office, Notice of Allowance mailed Oct. 3, 2022, in U.S. Appl. No. 16/787,869.
United States Patent and Trademark Office, Office Action mailed Jan. 10, 2020, in U.S. Appl. No. 16/503,916.
United States Patent and Trademark Office, Office Action mailed Sep. 10, 2021, in U.S. Appl. No. 16/786,372.
United States Patent and Trademark Office, Office Action mailed Sep. 18, 2020, in U.S. Appl. No. 16/503,916.
United States Patent and Trademark Office, Office Action mailed Oct. 14, 2022, in U.S. Appl. No. 16/786,372.
United States Patent and Trademark Office, Office Action mailed Oct. 17, 2022, in U.S. Appl. No. 17/333,844.
United States Patent and Trademark Office, Office Action mailed Sep. 10, 2021, in U.S. Appl. No. 16/787,869.
United States Patent and Trademark Office, Notice of Allowance mailed Apr. 29, 2024, in U.S. Appl. No. 17/857,475.
United States Patent and Trademark Office, Notice of Allowance mailed Mar. 18, 2024, in U.S. Appl. No. 17/689,860.
United States Patent and Trademark Office, Office Action mailed Mar. 22, 2024, in U.S. Appl. No. 18/229,596.
Beijing East IP Ltd., Statement attached with a Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.
State Intellectual Property Office of China, Formal Letter of Examination issued Dec. 2, 2015, in Application No. 201210118202.7.
State Intellectual Property Office of China, print-out of bibliographic data from http://cpquery.sipo.gov.cn of Chinese Patent Application No. 201210118202.7, dated Feb. 25, 2016.
United States Patent and Trademark Office, Notice of Allowance mailed Aug. 2, 2024, in U.S. Appl. No. 18/229,596.
United States Patent and Trademark Office, Office Action mailed May 29, 2024, in U.S. Appl. No. 17/714,821.
United States Patent and Trademark Office, Office Action mailed Sep. 11, 2024, in U.S. Appl. No. 17/714,821.
United States Patent and Trademark Office, Notice of Allowance mailed Nov. 27, 2024, in U.S. Appl. No. 18/229,596.
United States Patent and Trademark Office, Notice of Allowance mailed Jan. 29, 2025, in U.S. Appl. No. 18/741,647.

\* cited by examiner

SYSTEMS AND METHODS FOR SYNCHRONOUS RECTIFICATION OF POWER SUPPLY SYSTEMS

1. CROSS-REFERENCES TO RELATED APPLICATIONS

This application is a continuation of U.S. patent application Ser. No. 17/333,844, filed May 28, 2021, which claims priority to Chinese Patent Application No. 202010471872.1, filed May 29, 2020, both of the above applications being incorporated by reference herein for all purposes.

2. BACKGROUND OF THE INVENTION

Certain embodiments of the present invention are directed to circuits. More particularly, some embodiments of the invention provide systems and methods for synchronous rectification. Merely by way of example, some embodiments of the invention have been applied to flyback switching power supply systems. But it would be recognized that the invention has a much broader range of applicability.

With the continuous improvement of power efficiency standards and the increasing popularity of portable electronic devices, synchronous rectification (SR) technology has become more widely used in switching power supply systems. In general, synchronous rectification technology often can effectively increase the power density of switching power supplies, while reducing the size and weight of portable electronic devices, improving power conversion efficiency, and reducing heat generation.

FIG. 1 is a simplified diagram showing a conventional flyback switching power supply system with synchronous rectification. The flyback switching power supply system 100 (e.g., a power converter) includes a transformer 102 (e.g., T1) including a primary winding 104 and a secondary winding 106, a primary-side control circuit 110 (e.g., a pulse-width-modulation control circuit), a primary-side power switch 112 (e.g., a transistor M1), a synchronous rectification (SR) control circuit 120 (e.g., a chip), a synchronous rectification (SR) switch 122 (e.g., a transistor M2), a capacitor 124 (e.g., $C_O$), and a capacitor 126 (e.g., $C_1$).

As shown in FIG. 1, the SR control circuit 120 includes a voltage detector 130, a synchronous rectification (SR) generator 132, a logic controller 134, and a synchronous rectification (SR) driver 136. Additionally, the SR control circuit 120 includes a terminal 140 (e.g., a VD terminal), a terminal 142 (e.g., a GND terminal), a terminal 144 (e.g., a Vcc terminal), a terminal 146 (e.g., a Vout terminal), and a terminal 148 (e.g., a Gate terminal). For example, the SR control circuit 120 is a chip, and each of the terminals 140, 142, 144, 146, and 148 is a pin.

The terminal 140 (e.g., the VD terminal) is connected to the secondary winding 106 and biased to a voltage 150, and the terminal 142 (e.g., the GND terminal) is biased to a ground voltage of the secondary side of the flyback switching power supply system 100. Additionally, the terminal 144 (e.g., the Vcc terminal) is connected to a terminal of the capacitor 126 (e.g., $C_1$), which includes another terminal that is biased to the ground voltage of the secondary side. Moreover, the terminal 146 (e.g., the Vout terminal) is connected to one terminal of the capacitor 124 (e.g., $C_O$) and biased to an output voltage 128 (e.g., $V_O$) of the flyback switching power supply system 100. Another terminal of the capacitor 124 (e.g., $C_O$) is biased to the ground voltage of the secondary side. Also, the terminal 148 (e.g., the Gate terminal) is connected to a gate terminal of the SR switch 122 (e.g., the transistor M2). The SR switch 122 (e.g., the transistor M2) further includes a terminal connected to the secondary winding 106 and the terminal 140 (e.g., the VD terminal), and also includes a terminal that is biased to the ground voltage of the secondary side.

The voltage detector 130 receives the voltage 150 from the secondary winding 106 through the terminal 140 (e.g., the VD terminal) and generates a detection signal 152 based at least in part on the voltage 150. The detection signal 152 is received by the SR generator 132, which in response generates an SR signal 154. The logic controller 134 receives the SR signal 154, and if one or more logic conditions are satisfied, generates a logic signal 156 based at least in part on the SR signal 154. The logic signal 156 is received by the SR driver 136, which in response generates a drive signal 158 and outputs the drive signal 158 to the gate terminal of the SR switch 122 (e.g., the transistor M2) through the terminal 148 (e.g., the Gate terminal).

As shown in FIG. 1, the SR control circuit 120 (e.g., the voltage detector 130) processes one or more received voltages (e.g., the voltage 150 and/or the output voltage 128) with respect to the voltage at the terminal 142 (e.g., the GND terminal), which is biased to the ground voltage of the secondary side of the flyback switching power supply system 100. To control the cost of the flyback switching power supply system 100, the SR control circuit 120 usually directly detects the voltage 150 at the secondary winding 106 in order to determine whether to close the SR switch 122 (e.g., whether to turn on the transistor M2). On the primary side of the flyback switching power supply system 100, the primary winding 104 receives a voltage 164. The primary-side power switch 112 (e.g., the transistor M1) includes a gate terminal, a drain terminal, and a source terminal. The gate terminal receives a drive signal 160 from the primary-side control circuit 110 (e.g., the pulse-width-modulation control circuit), the drain terminal is biased at a voltage 162 (e.g., Vd1), and the source terminal is biased at a ground voltage of the primary side.

In more detail, after the primary-side power switch 112 (e.g., the transistor M1) becomes closed (e.g., turned on), the primary winding 104 of the transformer 102 (e.g., T1) begins to store energy. After a period of time, the primary-side power switch 112 (e.g., the transistor M1) becomes open (e.g., turned off). Subsequently, the drain voltage of the primary-side power switch 112 (e.g., the transistor M1) rises rapidly, and the secondary winding 106 of the transformer 102 (e.g., T1) begins to demagnetize. During the demagnetization process, a demagnetization current flows through the body diode of the SR switch 122 (e.g., the transistor M2) from the terminal of the SR switch 122 (e.g., the transistor M2) that is biased to the ground voltage of the secondary side to the terminal of the SR switch 122 (e.g., the transistor M2) that is connected to the secondary winding 106 and the terminal 140 (e.g., the VD terminal). If the ground voltage of the secondary side is equal to zero volts, the voltage 150 of the drain terminal of the SR switch 122 (e.g., the transistor M2) is equal to $-V_{diode}$, where $V_{diode}$ represents the voltage drop of the body diode of the SR switch 122 (e.g., the transistor M2) and is larger than zero.

The voltage 150 is received by the voltage detector 130 of the SR control circuit 120. If the voltage 130 determines that the voltage 150 is lower than a predetermined SR turn-on threshold, the detection signal 152 is generated by the voltage detector 130 so that the SR switch 122 (e.g., the transistor M2) is closed (e.g., tuned on) if the one or more logic conditions are determined to be satisfied by the logic controller 134 of the SR control circuit 120. When the SR switch 122 (e.g., the transistor M2) is closed (e.g., tuned on), the demagnetization current flows through the SR switch 122 (e.g., the transistor M2) between the terminal of the SR switch 122 (e.g., the transistor M2) that is biased to the ground voltage of the secondary side and the terminal of the SR switch 122 (e.g., the transistor M2) that is connected to the secondary winding 106 and the terminal 140 (e.g., the VD terminal) with low turn-on resistance (e.g., Rdson) in order to reduce the energy loss.

FIG. 2 is a simplified diagram showing another conventional flyback switching power supply system with synchronous rectification. The flyback switching power supply system 200 (e.g., a power converter) includes a transformer 202 (e.g., T1) including a primary winding 204 and a secondary winding 206, a primary-side control circuit 210 (e.g., a pulse-width-modulation control circuit), a primary-side power switch 212 (e.g., a transistor M1), a synchronous rectification (SR) control circuit 220 (e.g., a chip), a synchronous rectification (SR) switch 222 (e.g., a transistor M2), a capacitor 224 (e.g., $C_O$), and a capacitor 226 (e.g., $C_1$).

As shown in FIG. 2, the SR control circuit 220 includes a voltage detector 230, a synchronous rectification (SR) generator 232, a logic controller 234, and a synchronous rectification (SR) driver 236. Additionally, the SR control circuit 220 includes a terminal 240 (e.g., a VD terminal), a terminal 242 (e.g., a GND terminal), a terminal 244 (e.g., a Vcc terminal), and a terminal 248 (e.g., a Gate terminal). For example, the SR control circuit 220 is a chip, and each of the terminals 240, 242, 244, and 248 is a pin.

The terminal 240 (e.g., the VD terminal) is connected to one terminal of the capacitor 224 (e.g., $C_O$) and biased to an output voltage 228 (e.g., $V_O$) of the flyback switching power supply system 200. Another terminal of the capacitor 224 (e.g., $C_O$) is biased to a ground voltage of the secondary side of the flyback switching power supply system 200. Additionally, the terminal 244 (e.g., the Vcc terminal) is connected to a terminal of the capacitor 226 (e.g., $C_1$) and biased at a voltage 245. The capacitor 226 (e.g., $C_1$) includes another terminal that is connected to the terminal 242 (e.g., the GND terminal) and the secondary winding 206. Also, the terminal 248 (e.g., the Gate terminal) is connected to a gate terminal of the SR switch 222 (e.g., the transistor M2). The SR switch 222 (e.g., M2) further includes a terminal connected to the secondary winding 206 and the terminal 242 (e.g., the GND terminal), and also includes a terminal that is biased to the output voltage 228 (e.g., $V_O$) of the flyback switching power supply system 200.

The voltage detector 230 receives the output voltage 228 (e.g., $V_O$) through the terminal 240 (e.g., the VD terminal) and generates a detection signal 252 based at least in part on the output voltage 228 (e.g., $V_O$). The detection signal 252 is received by the SR generator 232, which in response generates an SR signal 254. The logic controller 234 receives the SR signal 254, and if one or more logic conditions are satisfied, generates a logic signal 256 based at least in part on the SR signal 254. The logic signal 256 is received by the SR driver 236, which in response generates a drive signal 258 and outputs the drive signal 258 to the gate terminal of the SR switch 222 (e.g., the transistor M2) through the terminal 248 (e.g., the Gate terminal).

As shown in FIG. 2, the terminal 242 (e.g., the GND terminal) and the terminal of the SR switch 222 (e.g., the transistor M2) that is connected to the secondary winding 206 are both biased to a voltage 260, which changes in magnitude depending on the mode of operation of the flyback switching power supply system 200. The SR control circuit 220 (e.g., the voltage detector 230) processes one or more received voltages (e.g., the output voltage 228 and/or the voltage 245) with respect to the voltage at the terminal 242 (e.g., the GND terminal), which is biased to the voltage 260. On the primary side of the flyback switching power supply system 200, the primary-side power switch 212 (e.g., the transistor M1) includes a gate terminal, a drain terminal, and a source terminal. The gate terminal receives a drive signal 266 from the primary-side control circuit 210 (e.g., the pulse-width-modulation control circuit), the drain terminal is biased at a voltage 262 (e.g., Vd1), and the source terminal is biased at a ground voltage of the primary side.

If the ground voltage at the secondary side is equal to zero volts, when the primary-side power switch 212 (e.g., the transistor M1) is closed, the voltage 260 is determined as follows:

$$V_{260} = -V_{bulk} \times \left(\frac{N_s}{N_p}\right) \quad \text{(Equation 1)}$$

where $V_{260}$ represents the voltage 260, and $V_{bulk}$ represents a voltage 264 that is received by the primary winding 204. Additionally, $N_p$ represents the number of turns of the primary winding 204, and Ns represents the number of turns of the secondary winding 206.

Also, if the ground voltage at the secondary side is equal to zero volts, when the secondary winding 206 undergoes the demagnetization process, the voltage 260 is determined as follows:

$$V_{260} = V_{drop} + V_O \quad \text{(Equation 2)}$$

where $V_{260}$ represents the voltage 260, and $V_O$ represents the output voltage 228. Additionally, $V_{drop}$ represents a voltage drop from the terminal of the SR switch 222 (e.g., M2) that connected to the secondary winding 206 and the terminal 242 (e.g., the GND terminal) to the terminal of the SR switch 222 (e.g., M2) that is biased to the output voltage 228 (e.g., $V_O$) of the flyback switching power supply system 200, wherein $V_{drop}$ is larger than zero.

As shown in FIG. 1 and FIG. 2, the use of synchronous rectification technology often increases the complexity of the switching power supply system and usually adversely affects the reliability and stability of the switching power supply system. Hence it is highly desirable to improve the techniques related to switching power supply systems.

3. BRIEF SUMMARY OF THE INVENTION

Certain embodiments of the present invention are directed to circuits. More particularly, some embodiments of the invention provide systems and methods for synchronous rectification. Merely by way of example, some embodiments of the invention have been applied to flyback switching power supply systems. But it would be recognized that the invention has a much broader range of applicability.

According to certain embodiments, a system for synchronous rectification of a power converter includes: a first system terminal configured to receive an input voltage; and a second system terminal configured to output a drive signal to a first transistor terminal of a transistor, the transistor further including a second transistor terminal and a third transistor terminal, the second transistor terminal being connected to a secondary winding of the power converter, the power converter further including a primary winding coupled to the secondary winding; wherein the system is configured to: determine whether the input voltage becomes lower than a predetermined voltage threshold; and if the input voltage becomes lower than the predetermined voltage threshold, determine whether a time when the input voltage becomes lower than the predetermined voltage threshold is during or not during a demagnetization process of the secondary winding; wherein the system is further configured to, if the time when the input voltage becomes lower than the predetermined voltage threshold is not during any demagnetization process of the secondary winding, generate the drive signal to turn off the transistor.

According to some embodiments, a method for synchronous rectification of a power converter includes: receiving an input voltage; processing information associated with the input voltage; generating a drive signal based on at least information associated with the input voltage; and outputting the drive signal to a transistor terminal of a transistor; wherein the processing information associated with the input voltage includes: determining whether the input voltage becomes lower than a predetermined voltage threshold; and if the input voltage becomes lower than the predetermined voltage threshold, determining whether a time when the input voltage becomes lower than the predetermined voltage threshold is during or not during a demagnetization process of the secondary winding; wherein the generating a drive signal based on at least information associated with the input voltage includes: if the time when the input voltage becomes lower than the predetermined voltage threshold is not during any demagnetization process of the secondary winding, generating the drive signal to turn off the transistor.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for synchronous rectification. Merely by way of example, some embodiments of the invention have been applied to flyback switching power supply systems. But it would be recognized that the invention has a much broader range of applicability.

Figure 1:
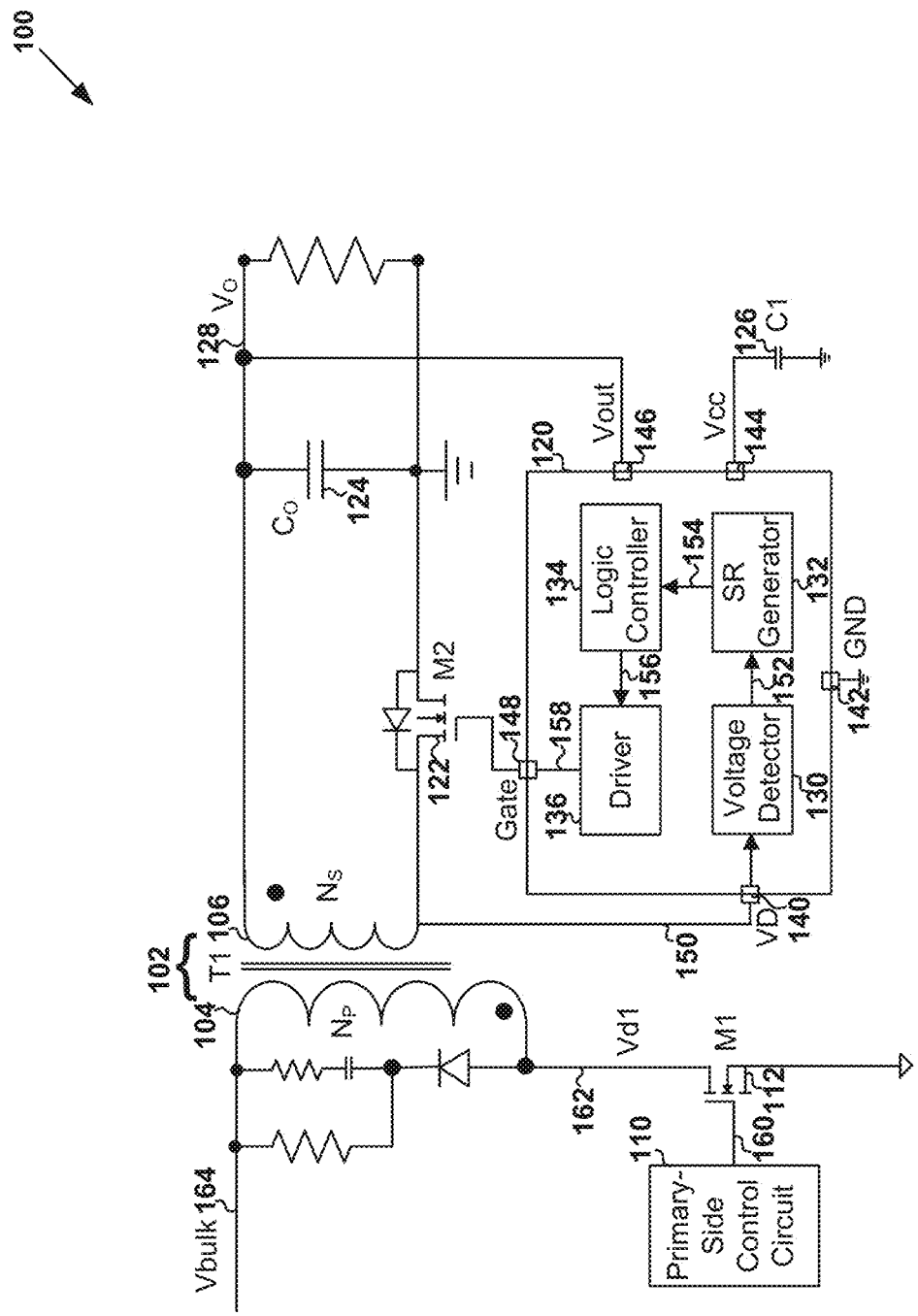
FIG. 1 is a simplified diagram showing a conventional flyback switching power supply system with synchronous rectification.

As shown in FIG. 1, if the pulse-width-modulation control circuit 110 operates under the discontinuous conduction mode (DCM), after the end of the demagnetization process for the transformer 102, the primary winding 104 resonates with the parasitic capacitor of the primary-side power switch 112 according to certain embodiments. For example, the resonance between the primary winding 104 and the parasitic capacitor of the primary-side power switch 112 is coupled from the primary side to the secondary side through the transformer 102 to cause the voltage 150 of the secondary winding 106 to also resonate. As an example, the resonance of the voltage 150 of the secondary winding 106 makes the SR control circuit 120 mistakenly determine the start of another demagnetization process and mistakenly turn on the transistor 122, adversely affecting the reliability and the efficiency of the flyback switching power supply system 100.

Figure 2:
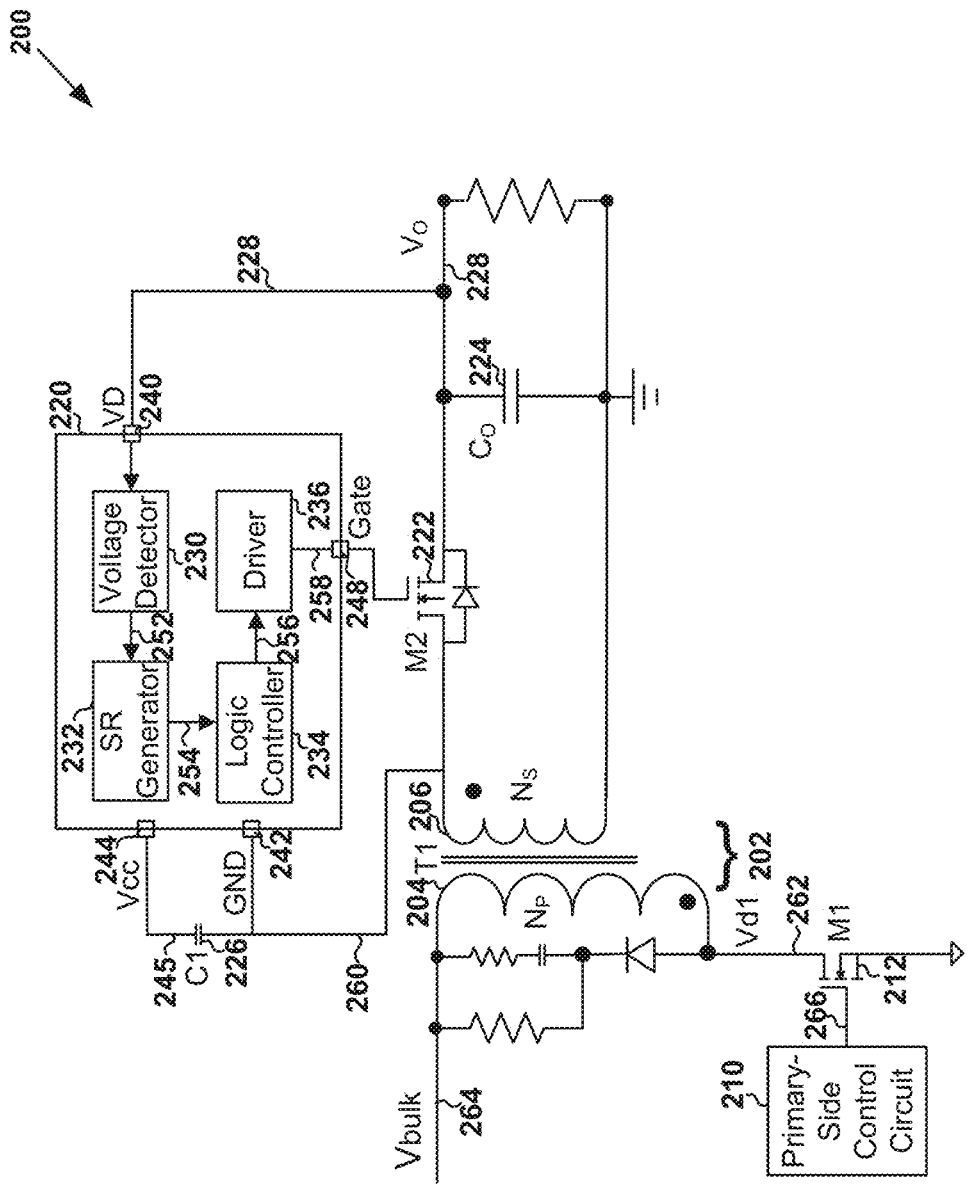
FIG. 2 is a simplified diagram showing another conventional flyback switching power supply system with synchronous rectification.
Figure 3:
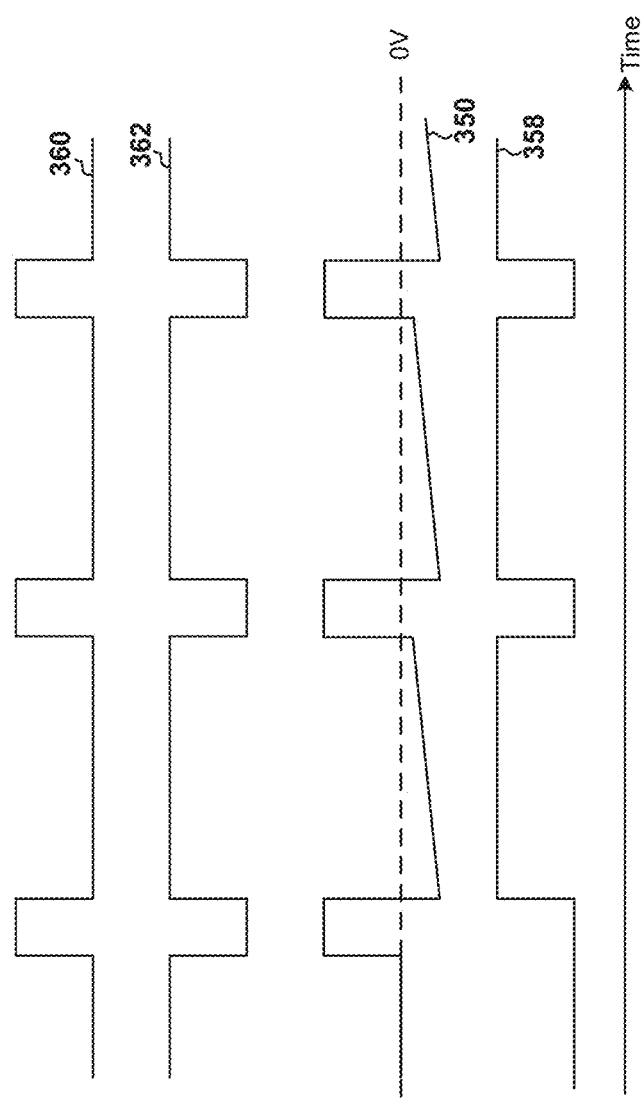
FIG. 3 and FIG. 4 show simplified timing diagrams for the conventional flyback switching power supply system with synchronous rectification as shown in FIG. 1 or FIG. 2 under continuous conduction mode (CCM) and discontinuous conduction mode (DCM) respectively according to certain embodiments.
Figure 4:
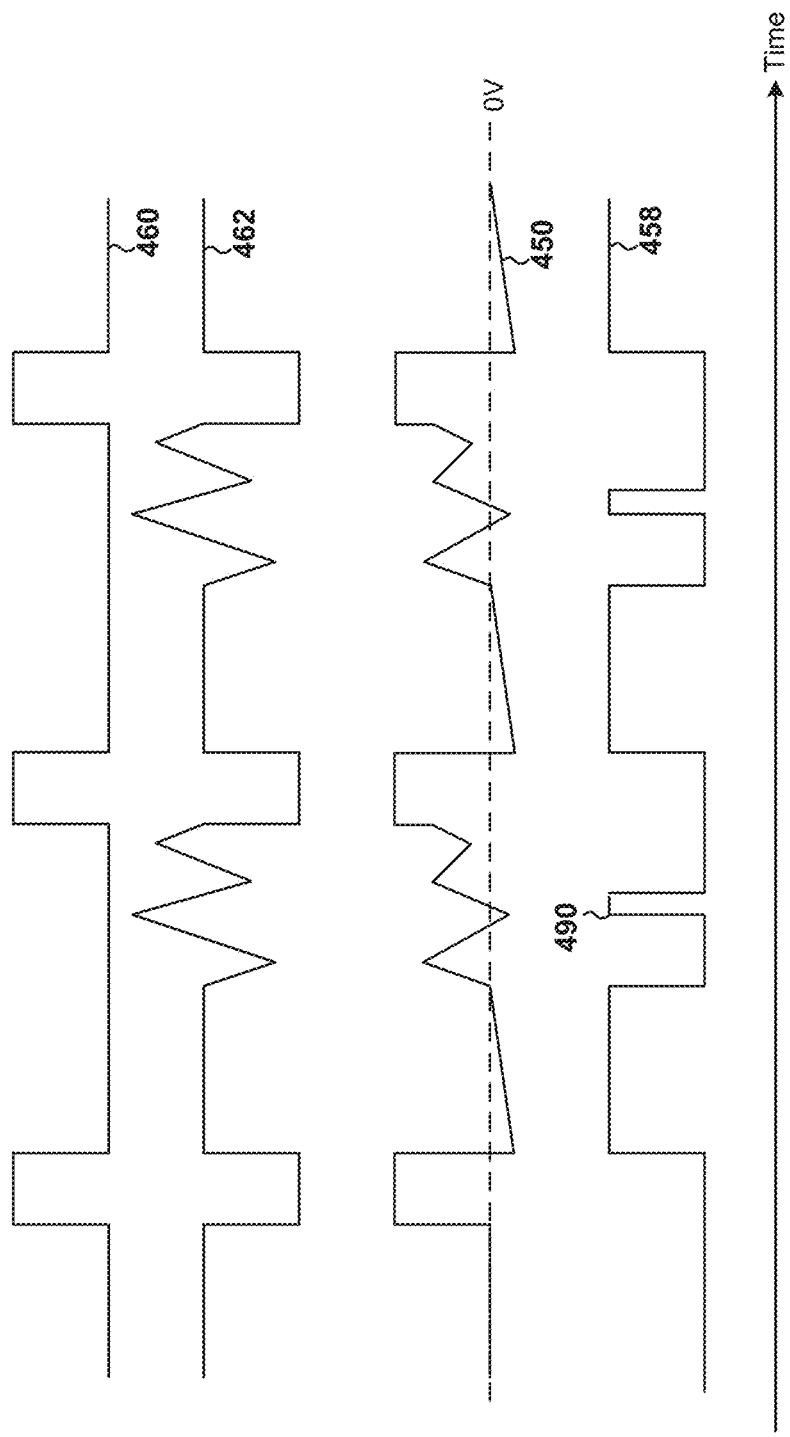

FIG. 3 and FIG. 4 show simplified timing diagrams for the conventional flyback switching power supply system with synchronous rectification as shown in FIG. 1 or FIG. 2 under continuous conduction mode (CCM) and discontinuous conduction mode (DCM) respectively according to certain embodiments. In some examples, FIG. 3 and FIG. 4 show simplified timing diagrams for the conventional flyback switching power supply system 100 with synchronous rectification as shown in FIG. 1. For example, in FIG. 3, the primary-side control circuit 110 operates under continuous conduction mode (CCM). As an example, in FIG. 4, the primary-side control circuit 110 operates under discontinuous conduction mode (DCM).

In certain examples, FIG. 3 and FIG. 4 show simplified timing diagrams for the conventional flyback switching power supply system 100 with synchronous rectification as shown in FIG. 1. For example, in FIG. 3, the primary-side control circuit 110 operates under continuous conduction mode (CCM). The waveform 360 represents the drive signal 160 as a function of time, the waveform 362 represents the voltage 162 (e.g., Vd1) as a function of time, the waveform 350 represents the voltage 150 subtracted by the ground voltage of the secondary side at the terminal 142 (e.g., the GND terminal) as a function of time, and the waveform 358 represents the drive signal 158 as a function of time, if the primary-side control circuit 110 operates under continuous conduction mode (CCM) according to some embodiments. As an example, in FIG. 4, the primary-side control circuit 110 operates under discontinuous conduction mode (DCM). In FIG. 4, the waveform 460 represents the drive signal 160 as a function of time, the waveform 462 represents the voltage 162 (e.g., Vd1) as a function of time, the waveform 450 represents the voltage 150 subtracted by the ground voltage of the secondary side at the terminal 142 (e.g., the GND terminal) as a function of time, and the waveform 458 represents the drive signal 158 as a function of time, if the primary-side control circuit 110 operates under discontinuous conduction mode (DCM) according to certain embodiments.

In some examples, FIG. 3 and FIG. 4 show simplified timing diagrams for the conventional flyback switching power supply system 200 with synchronous rectification as shown in FIG. 2. For example, in FIG. 3, the primary-side control circuit 210 operates under continuous conduction mode (CCM). The waveform 360 represents the drive signal 266 as a function of time, the waveform 362 represents the voltage 262 (e.g., Vd1) as a function of time, the waveform 350 represents the voltage 228 subtracted by the voltage 260 at the terminal 242 (e.g., the GND terminal) as a function of time, and the waveform 358 represents the drive signal 258 as a function of time, if the primary-side control circuit 210 operates under continuous conduction mode (CCM) according to some embodiments. As an example, in FIG. 4, the primary-side control circuit 210 operates under discontinuous conduction mode (DCM). The waveform 460 represents the drive signal 266 as a function of time, the waveform 462 represents the voltage 262 (e.g., Vd1) as a function of time, the waveform 450 represents the voltage 228 subtracted by the voltage 260 at the terminal 242 (e.g., the GND terminal) as a function of time, and the waveform 458 represents the drive signal 258 as a function of time, if the primary-side control circuit 210 operates under discontinuous conduction mode (DCM) according to certain embodiments.

As shown in FIG. 3, under continuous conduction mode (CCM), as shown by the waveforms 360, 362 and 350, during the entire time period when the drive signal 160 or the drive signal 266 is at a logic low level and the primary-side power switch 112 (e.g., the transistor M1) or the primary-side power switch 212 (e.g., the transistor M1) is open (e.g., turned off), the secondary winding 106 or the secondary winding 206 undergoes the demagnetization process, and the voltage 150 subtracted by the ground voltage of the secondary side at the terminal 142 (e.g., the GND terminal) or the voltage 228 subtracted by the voltage 260 at the terminal 242 (e.g., the GND terminal) remains negative according to some embodiments. For example, as shown by the waveform 358, during the entire time period when the drive signal 160 or the drive signal 266 is at the logic low level and the primary-side power switch 112 (e.g., the transistor M1) or the primary-side power switch 212 (e.g., the transistor M1) is open (e.g., turned off), the drive signal 158 or the drive signal 258 remains at a logic high level, and the SR switch 122 (e.g., the transistor M2) or the SR switch 222 (e.g., the transistor M2) remains closed (e.g., turned on) in response to the negative magnitude of the voltage 150 subtracted by the ground voltage of the secondary side at the terminal 142 (e.g., the GND terminal) or in response to the negative magnitude of the voltage 228 subtracted by the voltage 260 at the terminal 242 (e.g., the GND terminal).

As shown in FIG. 4, under discontinuous conduction mode (DCM), as shown by the waveforms 460, 462 and 450, sometime during the time period when the drive signal 160 or the drive signal 266 is at the logic low level and the primary-side power switch 112 (e.g., the transistor M1) or the primary-side power switch 212 (e.g., the transistor M1) is open (e.g., turned off), the demagnetization process of the secondary winding 106 or the secondary winding 206 is completed, and the magnitude of the voltage 150 subtracted by the ground voltage of the secondary side at the terminal 142 (e.g., the GND terminal) or the magnitude of the voltage 228 subtracted by the voltage 260 at the terminal 242 (e.g., the GND terminal) changes from being negative to being equal to zero according to certain embodiments. For example, after the end of the demagnetization process, the primary winding 104 or the primary winding 204 resonates with the parasitic capacitor of the primary-side power switch 112 or the primary-side power switch 212. As an example, the resonance between the primary winding 104 and the parasitic capacitor of the primary-side power switch 112 or the resonance between the primary winding 204 and the parasitic capacitor of the primary-side power switch 212 is coupled from the primary side to the secondary side through the transformer 102 or the transformer 102 to cause the voltage 150 subtracted by the ground voltage of the secondary side at the terminal 142 (e.g., the GND terminal) or to cause the voltage 228 subtracted by the voltage 260 at the terminal 242 (e.g., the GND terminal) to also resonate respectively.

According to some embodiments, in an ideal situation, the resonance waveform of the voltage 150 subtracted by the ground voltage of the secondary side at the terminal 142

(e.g., the GND terminal) or the resonance waveform of the voltage 228 subtracted by the voltage 260 at the terminal 242 (e.g., the GND terminal) is an approximate sine wave that is centered on the output voltage 128 (e.g., $V_O$) or the output voltage 228 (e.g., $V_O$), and has an amplitude equal to the output voltage 128 (e.g., $V_O$) or the output voltage 228 (e.g., $V_O$) respectively, so that the peak magnitude of the voltage 150 subtracted by the ground voltage of the secondary side at the terminal 142 (e.g., the GND terminal) is equal to twice as much as the output voltage 128 (e.g., $V_O$) and the valley magnitude of the voltage 150 subtracted by the ground voltage of the secondary side at the terminal 142 (e.g., the GND terminal) is equal to zero volts, or the peak magnitude of the voltage 228 subtracted by the voltage 260 at the terminal 242 (e.g., the GND terminal) is equal to twice as much as the output voltage 228 (e.g., $V_O$) and the valley magnitude of the voltage 228 subtracted by the voltage 260 at the terminal 242 (e.g., the GND terminal) is equal to zero volts. According to certain embodiments, in reality, as shown by the waveform 450, the valley magnitude of the voltage 150 subtracted by the ground voltage of the secondary side at the terminal 142 (e.g., the GND terminal) or the valley magnitude of the voltage 228 subtracted by the voltage 260 at the terminal 242 (e.g., the GND terminal) is equal to a negative value that is smaller than zero volts.

In some examples, the negative value for the valley magnitude of the voltage 150 subtracted by the ground voltage of the secondary side at the terminal 142 (e.g., the GND terminal) or the negative value for the valley magnitude of the voltage 228 subtracted by the voltage 260 at the terminal 242 (e.g., the GND terminal) is smaller than the corresponding predetermined SR turn-on threshold, so that if the one or more logic conditions are determined to be satisfied by the logic controller 134 of the SR control circuit 120 or if the one or more logic conditions are determined to be satisfied by the logic controller 234 of the SR control circuit 220, the drive signal 158 or the drive signal 258 changes from the logic low level to the logic high level, and the SR switch 122 (e.g., the transistor M2) or the SR switch 222 (e.g., the transistor M2) changes from being open (e.g., turned off) to being closed (e.g., tuned on). As an example, sometime after the voltage 150 subtracted by the ground voltage of the secondary side at the terminal 142 (e.g., the GND terminal) or the voltage 228 subtracted by the voltage 260 at the terminal 242 (e.g., the GND terminal) increases from its corresponding valley magnitude, the drive signal 158 or the drive signal 258 changes from the logic low level to the logic high level, and the SR switch 122 (e.g., the transistor M2) or the SR switch 222 (e.g., the transistor M2) changes from being open (e.g., turned off) to being closed (e.g., tuned on). For example, as shown by the waveform 458, after the demagnetization process of the secondary winding 106 or the demagnetization process of the secondary winding 206 is completed but when the drive signal 160 or the drive signal 266 is still at the logic low level and the primary-side power switch 112 (e.g., the transistor M1) or the primary-side power switch 212 (e.g., the transistor M1) is still open (e.g., turned off), the drive signal 158 or the drive signal 258 experiences a pulse 490, representing a mis-triggering of synchronous rectification by the resonance of the voltage 150 subtracted by the ground voltage of the secondary side at the terminal 142 (e.g., the GND terminal) or by the resonance of the voltage 228 subtracted by the voltage 260 at the terminal 242 (e.g., the GND terminal). For example, the mis-triggering of synchronous rectification by the resonance of the voltage 150 subtracted by the ground voltage of the secondary side at the terminal 142 (e.g., the GND terminal) or by the resonance of the voltage 228 subtracted by the voltage 260 at the terminal 242 (e.g., the GND terminal) causes operation disorder of the flyback switching power supply system 100 or operation disorder of the flyback switching power supply system 200, adversely affecting power efficiency and system reliability of the flyback switching power supply system 100 or the flyback switching power supply system 200.

Figure 5:
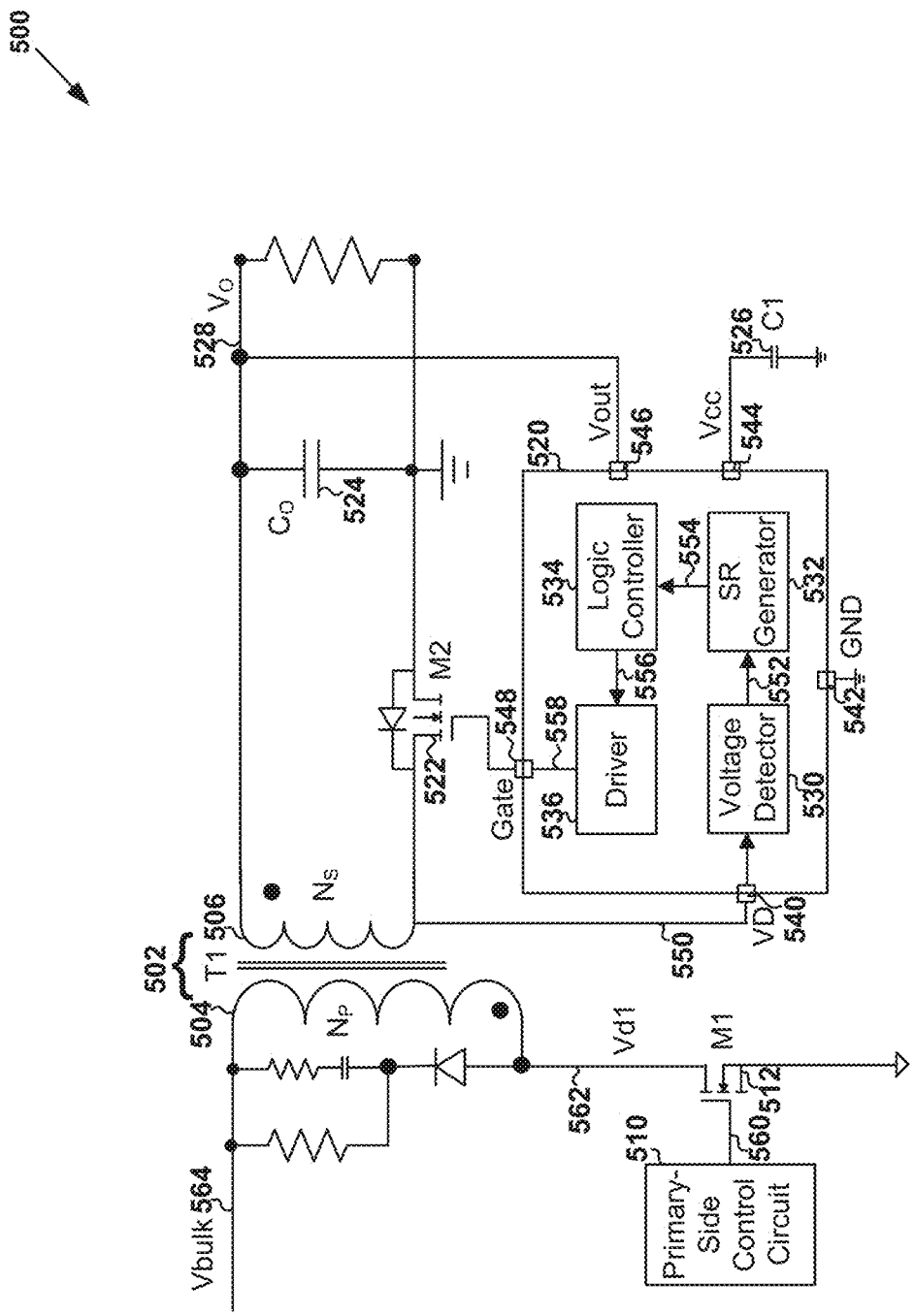
FIG. 5 is a simplified diagram showing a flyback switching power supply system with synchronous rectification according to certain embodiments of the present invention.

FIG. 5 is a simplified diagram showing a flyback switching power supply system with synchronous rectification according to certain embodiments of the present invention. This diagram is merely an example, which should not unduly limit the scope of the claims. One of ordinary skill in the art would recognize many variations, alternatives, and modifications. The flyback switching power supply system 500 (e.g., a power converter) includes a transformer 502 (e.g., T1) including a primary winding 504 and a secondary winding 506, a primary-side control circuit 510 (e.g., a pulse-width-modulation control circuit), a primary-side power switch 512 (e.g., a transistor M1), a synchronous rectification (SR) control circuit 520 (e.g., a chip), a synchronous rectification (SR) switch 522 (e.g., a transistor M2), a capacitor 524 (e.g., $C_O$), and a capacitor 526 (e.g., $C_1$). Although the above has been shown using a selected group of components for the flyback switching power supply system 500, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 5, the SR control circuit 520 includes a voltage detector 530, a synchronous rectification (SR) generator 532, a logic controller 534, and a synchronous rectification (SR) driver 536 according to some embodiments. In certain examples, the SR control circuit 520 includes a terminal 540 (e.g., a VD terminal), a terminal 542 (e.g., a GND terminal), a terminal 544 (e.g., a Vcc terminal), a terminal 546 (e.g., a Vout terminal), and a terminal 548 (e.g., a Gate terminal). As an example, the SR control circuit 520 is a chip, and each of the terminals 540, 542, 544, 546, and 548 is a pin.

For example, the terminal 540 (e.g., the VD terminal) is connected to the secondary winding 506 and biased to a voltage 550, and the terminal 542 (e.g., the GND terminal) is biased to a ground voltage of the secondary side of the flyback switching power supply system 500. As an example, the terminal 544 (e.g., the Vcc terminal) is connected to a terminal of the capacitor 526 (e.g., $C_1$), which includes another terminal that is biased to the ground voltage of the secondary side. For example, the terminal 546 (e.g., the Vout terminal) is connected to one terminal of the capacitor 524 (e.g., $C_O$) and biased to an output voltage 528 (e.g., $V_O$) of the flyback switching power supply system 500. As an example, another terminal of the capacitor 524 (e.g., $C_O$) is biased to the ground voltage of the secondary side. For example, the terminal 548 (e.g., the Gate terminal) is connected to a gate terminal of the SR switch 522 (e.g., the transistor M2). The SR switch 522 (e.g., the transistor M2) further includes a terminal that is connected to the secondary winding 506 and the terminal 540 (e.g., the VD terminal), and also includes a terminal that is biased to the ground voltage of the secondary side.

In some embodiments, the voltage detector 530 receives the voltage 550 from the secondary winding 506 through the terminal 540 (e.g., the VD terminal) and generates a detection signal 552 based at least in part on the voltage 550. For example, the detection signal 552 is received by the SR generator 532, which in response generates an SR signal 554. As an example, the logic controller 534 receives the SR signal 554, and if one or more logic conditions are satisfied, generates a logic signal 556 based at least in part on the SR signal 554. For example, the logic signal 556 is received by the SR driver 536, which in response generates a drive signal 558 and outputs the drive signal 558 to the gate terminal of the SR switch 522 (e.g., the transistor M2) through the terminal 548 (e.g., the Gate terminal).

In certain embodiments, as shown in FIG. 5, the SR control circuit 520 (e.g., the voltage detector 530) processes one or more received voltages (e.g., the voltage 550 and/or the output voltage 528) with respect to the voltage at the terminal 542 (e.g., the GND terminal), which is biased to the ground voltage of the secondary side of the flyback switching power supply system 500. As an example, on the primary side of the flyback switching power supply system 500, the primary winding 504 receives a voltage 564. For example, the primary-side power switch 512 (e.g., the transistor M1) includes a gate terminal, a drain terminal, and a source terminal. As an example, the gate terminal receives a drive signal 560 from the primary-side control circuit 510 (e.g., the pulse-width-modulation control circuit), the drain terminal is biased at a voltage 562 (e.g., Vd1), and the source terminal is biased at a ground voltage of the primary side.

According to some embodiments, the voltage detector 530 is configured to determine whether the voltage 550 becomes lower than a predetermined SR turn-on threshold, and if the voltage 550 becomes lower than the predetermined SR turn-on threshold, whether the time when the voltage 550 becomes lower than the predetermined SR turn-on threshold is during or not during a demagnetization process of the secondary winding 506. For example, if the voltage detector 530 determines that the time when the voltage 550 becomes lower than the predetermined SR turn-on threshold is during a demagnetization process of the secondary winding 506 (e.g., after the start of the demagnetization process but before the end of the demagnetization process), the detection signal 552 is generated by the voltage detector 530 so that the SR switch 522 (e.g., the transistor M2) is closed (e.g., tuned on) if the one or more logic conditions are determined to be satisfied by the logic controller 534 of the SR control circuit 520. As an example, if the voltage detector 530 determines that the time when the voltage 550 becomes lower than the predetermined SR turn-on threshold is not during any demagnetization process of the secondary winding 506 (e.g., after the end of a demagnetization process but before the start of another demagnetization process), the detection signal 552 is generated by the voltage detector 530 so that the SR switch 522 (e.g., the transistor M2) remains open (e.g., tuned off), thus preventing the SR switch 522 (e.g., the transistor M2) from being closed (e.g., turned on) during the resonance of the voltage 550.

Figure 6:
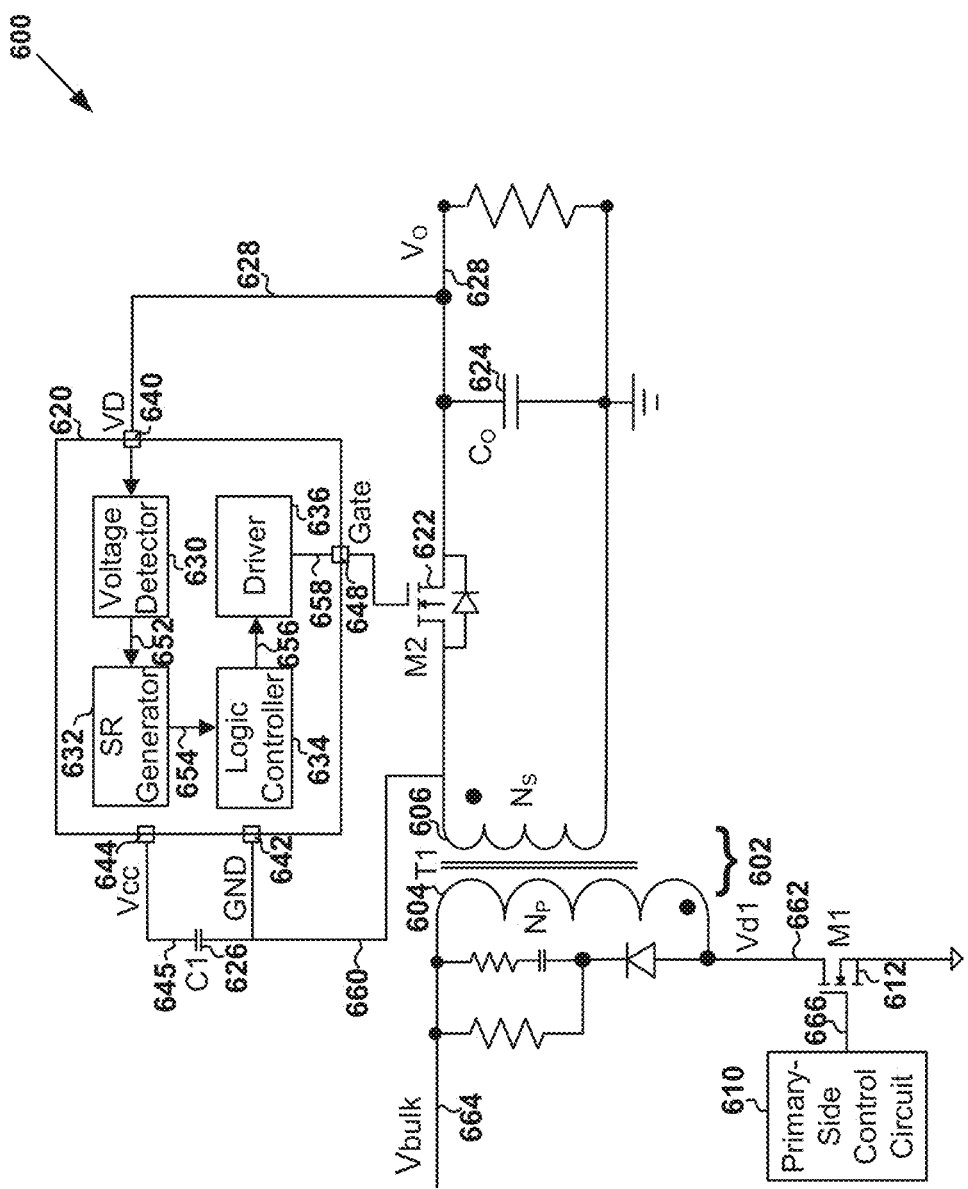
FIG. 6 is a simplified diagram showing a flyback switching power supply system with synchronous rectification according to some embodiments of the present invention.

FIG. 6 is a simplified diagram showing a flyback switching power supply system with synchronous rectification according to some embodiments of the present invention. This diagram is merely an example, which should not unduly limit the scope of the claims. One of ordinary skill in the art would recognize many variations, alternatives, and modifications. The flyback switching power supply system 600 (e.g., a power converter) includes a transformer 602 (e.g., T1) including a primary winding 604 and a secondary winding 606, a primary-side control circuit 610 (e.g., a pulse-width-modulation control circuit), a primary-side power switch 612 (e.g., a transistor M1), a synchronous rectification (SR) control circuit 620 (e.g., a chip), a synchronous rectification (SR) switch 622 (e.g., a transistor M2), a capacitor 624 (e.g., $C_O$), and a capacitor 626 (e.g., $C_1$). Although the above has been shown using a selected group of components for the flyback switching power supply system 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 6, the SR control circuit 620 includes a voltage detector 630, a synchronous rectification (SR) generator 632, a logic controller 634, and a synchronous rectification (SR) driver 636 according to some embodiments. In certain examples, the SR control circuit 620 includes a terminal 640 (e.g., a VD terminal), a terminal 642 (e.g., a GND terminal), a terminal 644 (e.g., a Vcc terminal), and a terminal 648 (e.g., a Gate terminal). As an example, the SR control circuit 620 is a chip, and each of the terminals 640, 642, 644, and 648 is a pin.

For example, the terminal 640 (e.g., the VD terminal) is connected to one terminal of the capacitor 624 (e.g., $C_O$) and biased to an output voltage 628 (e.g., $V_O$) of the flyback switching power supply system 600. As an example, another terminal of the capacitor 624 (e.g., $C_O$) is biased to a ground voltage of the secondary side of the flyback switching power supply system 600. For example, the terminal 644 (e.g., the Vcc terminal) is connected to a terminal of the capacitor 626 (e.g., $C_1$) and biased at a voltage 645. As an example, the capacitor 626 (e.g., $C_1$) includes another terminal that is connected to the terminal 642 (e.g., the GND terminal) and the secondary winding 606. For example, the terminal 648 (e.g., the Gate terminal) is connected to a gate terminal of the SR switch 622 (e.g., the transistor M2). As an example, the SR switch 622 (e.g., M2) further includes a terminal connected to the secondary winding 606 and the terminal 642 (e.g., the GND terminal), and also includes a terminal that is biased to the output voltage 628 (e.g., $V_O$) of the flyback switching power supply system 600.

In some embodiments, the voltage detector 630 receives the output voltage 628 (e.g., $V_O$) through the terminal 640 (e.g., the VD terminal) and generates a detection signal 652 based at least in part on the output voltage 628 (e.g., $V_O$). For example, the detection signal 652 is received by the SR generator 632, which in response generates an SR signal 654. As an example, the logic controller 634 receives the SR signal 654, and if one or more logic conditions are satisfied, generates a logic signal 656 based at least in part on the SR signal 654. For example, the logic signal 656 is received by the SR driver 636, which in response generates a drive signal 658 and outputs the drive signal 658 to the gate terminal of the SR switch 622 (e.g., the transistor M2) through the terminal 648 (e.g., the Gate terminal).

In certain embodiments, the terminal 642 (e.g., the GND terminal) and the terminal of the SR switch 622 (e.g., the transistor M2) that is connected to the secondary winding 606 and the terminal 642 (e.g., the GND terminal) both are biased to a voltage 660, which changes in magnitude depending on the mode of operation of the flyback switching power supply system 600. In some examples, the SR control circuit 620 (e.g., the voltage detector 630) processes one or more received voltages (e.g., the output voltage 628 and/or the voltage 645) with respect to the voltage at the terminal 642 (e.g., the GND terminal), which is biased to the voltage 660. In certain examples, on the primary side of the flyback switching power supply system 600, the primary winding 604 receives a voltage 664. For example, the primary-side power switch 612 (e.g., the transistor M1) includes a gate terminal, a drain terminal, and a source terminal. As an example, the gate terminal receives a drive signal 666 from the primary-side control circuit 610 (e.g., the pulse-width-modulation control circuit), the drain terminal is biased at a voltage 662 (e.g., Vd1), and the source terminal is biased at a ground voltage of the primary side.

According to some embodiments, the voltage detector 630 is configured to determine whether the voltage 628 becomes lower than a predetermined SR turn-on threshold, and if the voltage 628 becomes lower than the predetermined SR turn-on threshold, whether the time when the voltage 628 becomes lower than the predetermined SR turn-on threshold is during or not during a demagnetization process of the secondary winding 606. For example, if the voltage detector 630 determines that the time when the voltage 628 becomes lower than the predetermined SR turn-on threshold is during a demagnetization process of the secondary winding 606 (e.g., after the start of the demagnetization process but before the end of the demagnetization process), the detection signal 652 is generated by the voltage detector 630 so that the SR switch 622 (e.g., the transistor M2) is closed (e.g., tuned on) if the one or more logic conditions are determined to be satisfied by the logic controller 634 of the SR control circuit 620. As an example, if the voltage detector 630 determines that the time when the voltage 628 becomes lower than the predetermined SR turn-on threshold is not during any demagnetization process of the secondary winding 606 (e.g., after the end of a demagnetization process but before the start of another demagnetization process), the detection signal 652 is generated by the voltage detector 630 so that the SR switch 622 (e.g., the transistor M2) remains open (e.g., tuned off), thus preventing the SR switch 622 (e.g., the transistor M2) from being closed (e.g., turned on) during the resonance of the voltage 628.

Figure 7:
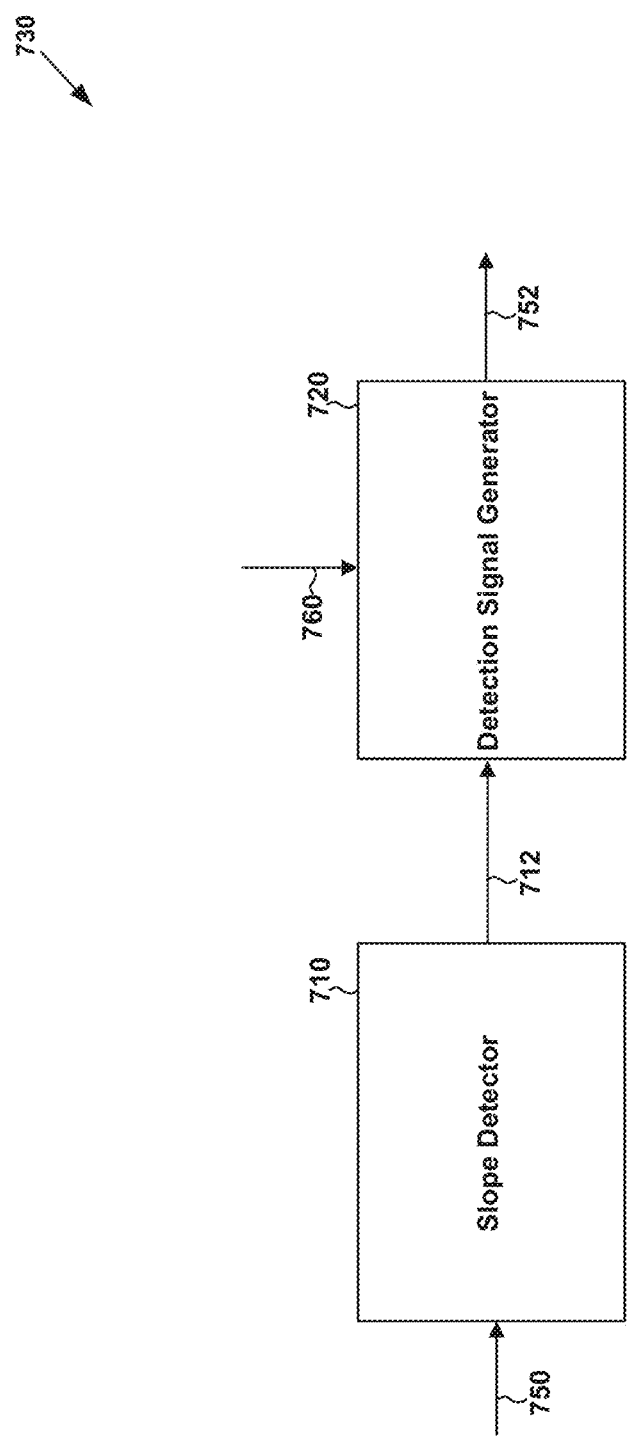
FIG. 7 is a simplified diagram showing one or more components of a voltage detector of an SR control circuit in a flyback switching power supply system according to certain embodiments of the present invention.

FIG. 7 is a simplified diagram showing one or more components of a voltage detector of an SR control circuit in a flyback switching power supply system according to certain embodiments of the present invention. This diagram is merely an example, which should not unduly limit the scope of the claims. One of ordinary skill in the art would recognize many variations, alternatives, and modifications. The voltage detector 730 includes a slope detector 710 and a detection signal generator 720. In some examples, the voltage detector 730 is the voltage detector 530 of the SR control circuit 520 of the flyback switching power supply system 500 as shown in FIG. 5. In certain examples, the voltage detector 730 is the voltage detector 630 of the SR control circuit 620 of the flyback switching power supply system 600 as shown in FIG. 6. Although the above has been shown using a selected group of components for the voltage detector 730, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the slope detector 710 receives a voltage 750 (e.g., the voltage 550 and/or the voltage 628), determines whether the downward slope of the voltage 750 is larger than a predetermined slope threshold, and generates a slope signal 712 that indicates whether the downward slope of the voltage 750 is larger than the predetermined slope threshold. As an example, the downward slope of the voltage 750 is larger than zero, and the predetermined slope threshold is also larger than zero. For example, if the downward slope of the voltage 750 is larger than the predetermined slope threshold, the falling edge that corresponds to the downward slope occurs during a demagnetization process of the secondary winding (e.g., the secondary winding 506 and/or the secondary winding 606). As an example, if the downward slope of the voltage 750 is smaller than the predetermined slope threshold, the falling edge that corresponds to the downward slope occurs not during any demagnetization process of the secondary winding (e.g., the secondary winding 506 and/or the secondary winding 606).

In certain embodiments, the slope signal 712 is received by the detection signal generator 720, which also receives a voltage 760 (e.g., the voltage 550 and/or the voltage 628) and generates a detection signal 752 (e.g., the detection signal 552 and/or the detection signal 652) based at least in part on the slope signal 712 and the voltage 760. For example, the voltage 760 is the same as the voltage 750. In some examples, the detection signal 752 (e.g., the detection signal 552 and/or the detection signal 652) indicates whether or not the voltage 760 becomes lower than a predetermined SR turn-on threshold during a demagnetization process of the secondary winding (e.g., the secondary winding 506 and/or the secondary winding 606). For example, if the voltage 760 becomes lower than the predetermined SR turn-on threshold after the start of the demagnetization process but before the end of the demagnetization process, the SR switch (e.g., the SR switch 522 and/or the SR switch 622) is closed if the one or more logic conditions are determined to be satisfied. As an example, if the voltage 760 does not become lower than the predetermined SR turn-on threshold during any demagnetization process of the secondary winding (e.g., the secondary winding 506 and/or the secondary winding 606), the SR switch (e.g., the SR switch 522 and/or the SR switch 622) remains open.

Figure 8:
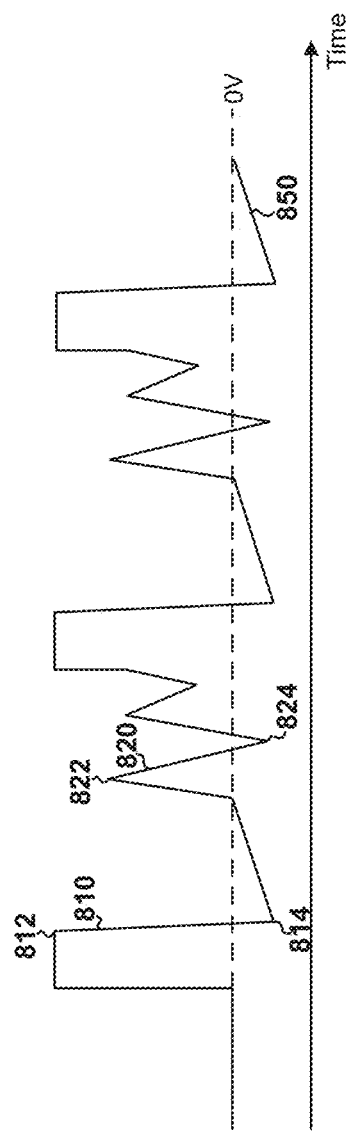
FIG. 8 shows a simplified timing diagram for the flyback switching power supply system that includes the voltage detector as shown in FIG. 5 and FIG. 7 or the flyback switching power supply system that includes the voltage detector as shown in FIG. 6 and FIG. 7 under discontinuous conduction mode (DCM) according to certain embodiments of the present invention.

FIG. 8 shows a simplified timing diagram for the flyback switching power supply system 500 that includes the voltage detector 730 as the voltage detector 530 as shown in FIG. 5 and FIG. 7 or the flyback switching power supply system 600 that includes the voltage detector 730 as the voltage detector 630 as shown in FIG. 6 and FIG. 7 under discontinuous conduction mode (DCM) according to certain embodiments of the present invention. This diagram is merely an example, which should not unduly limit the scope of the claims. One of ordinary skill in the art would recognize many variations, alternatives, and modifications. For example, the waveform 850 represents the voltage 550 subtracted by the ground voltage of the secondary side at the terminal 542 (e.g., the GND terminal) as a function of time, if the primary-side control circuit 510 operates under discontinuous conduction mode (DCM). As an example, the waveform 850 represents the voltage 628 subtracted by the voltage 660 at the terminal 642 (e.g., the GND terminal) as a function of time, if the primary-side control circuit 610 operates under discontinuous conduction mode (DCM).

As shown in FIG. 8, the waveform 850 includes a falling edge 810 of the voltage 550 subtracted by the ground voltage of the secondary side at the terminal 542 (e.g., the GND terminal) or the voltage 628 subtracted by the voltage 660 at the terminal 642 (e.g., the GND terminal), and the waveform 850 also includes a falling edge 820 of the voltage 550 subtracted by the ground voltage of the secondary side at the terminal 542 (e.g., the GND terminal) or the voltage 628 subtracted by the voltage 660 at the terminal 642 (e.g., the GND terminal) according to some embodiments. For example, the falling edge 810 occurs during a demagnetization process of the secondary winding 506 (e.g., occurs after the start of a demagnetization process but before the end of the demagnetization process), and the falling edge 820 occurs not during any demagnetization process of the secondary winding 506 (e.g., occurs after the end of a demagnetization process but before the start of another demagnetization process). As an example, the falling edge 810 occurs during a demagnetization process of the secondary winding 606 (e.g., occurs after the start of a demagnetization process but before the end of the demagnetization process), and the falling edge 820 occurs not during any demagnetization process of the secondary winding 606 (e.g., occurs after the end of a demagnetization process but before the start of another demagnetization process).

In certain embodiments, the voltage detector 730 as the voltage detector 530 determines that the downward slope of the falling edge 810 is larger than a predetermined slope threshold and also determines that the voltage 550 subtracted by the ground voltage of the secondary side at the terminal 542 (e.g., the GND terminal) becomes lower than a predetermined SR turn-on threshold after the start of a demagnetization process but before the end of the demagnetization process, and in response to these two determinations, the SR switch 522 is closed if the one or more logic conditions are satisfied. As an example, the downward slope of the falling edge 810 is larger than zero, and the predetermined slope threshold is also larger than zero. In some embodiments, the voltage detector 730 as the voltage detector 530 determines that the downward slope of the falling edge 820 is smaller than the predetermined slope threshold and also determines that the voltage 550 subtracted by the ground voltage of the secondary side at the terminal 542 (e.g., the GND terminal) does not become lower than the predetermined SR turn-on threshold during any demagnetization process of the secondary winding 506, and in response to these two determinations, the SR switch 522 remains open. As an example, the downward slope of the falling edge 820 is larger than zero, and the predetermined slope threshold is also larger than zero.

According to some embodiments, at the falling edge 810, the demagnetization process of the secondary winding 506 has started and the synchronous rectification (SR) switch 522 (e.g., a transistor M2) is open (e.g., turned off), causing a demagnetization current to flow through the body diode of the SR switch 522 (e.g., the transistor M2) from the terminal that is biased to the ground voltage of the secondary side to the terminal of the SR switch 522 (e.g., the transistor M2) that is connected to the secondary winding 506 and the terminal 540 (e.g., the VD terminal). For example, at the falling edge 810, the demagnetization current flowing through the body diode of the SR switch 522 (e.g., the transistor M2) causes the voltage 550 subtracted by the ground voltage of the secondary side at the terminal 542 (e.g., the GND terminal) to drop from a positive magnitude 812 to a negative magnitude 814 quickly. As an example, it takes less than 100 nanoseconds for the voltage 550 subtracted by the ground voltage of the secondary side at the terminal 542 (e.g., the GND terminal) to drop from the positive magnitude 812 to the negative magnitude 814, and the negative magnitude 814 is smaller than the predetermined SR turn-on threshold.

According to certain embodiments, at the falling edge 820, the demagnetization process of the secondary winding 506 has ended and the resonance of the voltage 550 subtracted by the ground voltage of the secondary side at the terminal 542 (e.g., the GND terminal) has started. In some examples, the period for the resonance of the voltage 550 subtracted by the ground voltage of the secondary side at the terminal 542 (e.g., the GND terminal) depends on the inductance of the transformer 502 and the parasitic capacitance of the primary-side power switch 512 (e.g., a transistor M1). For example, the period for the resonance of the voltage 550 subtracted by the ground voltage of the secondary side at the terminal 542 (e.g., the GND terminal) is equal to about 2 microseconds. In certain examples, the voltage 550 subtracted by the ground voltage of the secondary side at the terminal 542 (e.g., the GND terminal) drops from a positive magnitude 822 to a negative magnitude 824 more slowly than the voltage 550 subtracted by the ground voltage of the secondary side at the terminal 542 (e.g., the GND terminal) drops from the positive magnitude 812 to the negative magnitude 814. As an example, the negative magnitude 824 is smaller than the predetermined SR turn-on threshold.

In some embodiments, the voltage detector 730 as the voltage detector 630 determines that the downward slope of the falling edge 810 is larger than a predetermined slope threshold and also determines that the voltage 628 subtracted by the voltage 660 at the terminal 642 (e.g., the GND terminal) becomes lower than a predetermined SR turn-on threshold after the start of a demagnetization process but before the end of the demagnetization process, and in response to these two determinations, the SR switch 622 is closed if the one or more logic conditions are satisfied. As an example, the downward slope of the falling edge 810 is larger than zero, and the predetermined slope threshold is also larger than zero. In some embodiments, the voltage detector 730 as the voltage detector 630 determines that the downward slope of the falling edge 820 is smaller than the predetermined slope threshold and also determines that the voltage 628 subtracted by the voltage 660 at the terminal 642 (e.g., the GND terminal) does not become lower than the predetermined SR turn-on threshold during any demagnetization process of the secondary winding 606, and in response to these two determinations, the SR switch 622 remains open. As an example, the downward slope of the falling edge 820 is larger than zero, and the predetermined slope threshold is also larger than zero.

According to some embodiments, at the falling edge 810, the demagnetization process of the secondary winding 606 has started and the synchronous rectification (SR) switch 622 (e.g., a transistor M2) is open (e.g., turned off), causing a demagnetization current to flow through the body diode of the SR switch 622 (e.g., the transistor M2). For example, at the falling edge 810, the demagnetization current flowing through the body diode of the SR switch 622 (e.g., the transistor M2) causes the voltage 628 subtracted by the voltage 660 at the terminal 642 (e.g., the GND terminal) to drop from the positive magnitude 812 to the negative magnitude 814 quickly. As an example, it takes less than 100 nanoseconds for the voltage 628 subtracted by the voltage 660 at the terminal 642 (e.g., the GND terminal) to drop from the positive magnitude 812 to the negative magnitude 814, and the negative magnitude 814 is smaller than the predetermined SR turn-on threshold.

According to certain embodiments, at the falling edge 820, the demagnetization process of the secondary winding 606 has ended and the resonance of the voltage 628 subtracted by the voltage 660 at the terminal 642 (e.g., the GND terminal) has started. In some examples, the period for the resonance of the voltage 628 subtracted by the voltage 660 at the terminal 642 (e.g., the GND terminal) depends on the inductance of the transformer 602 and the parasitic capacitance of the primary-side power switch 612 (e.g., a transistor M1). For example, the period for the resonance of the voltage 628 subtracted by the voltage 660 at the terminal 642 (e.g., the GND terminal) is equal to about 2 microseconds. In certain examples, the voltage 628 subtracted by the voltage 660 at the terminal 642 (e.g., the GND terminal) drops from the positive magnitude 822 to the negative magnitude 824 more slowly than the voltage 628 subtracted by the voltage 660 at the terminal 642 (e.g., the GND terminal) drops from the positive magnitude 812 to the negative magnitude 814. As an example, the negative magnitude 824 is smaller than the predetermined SR turn-on threshold.

Figure 9:
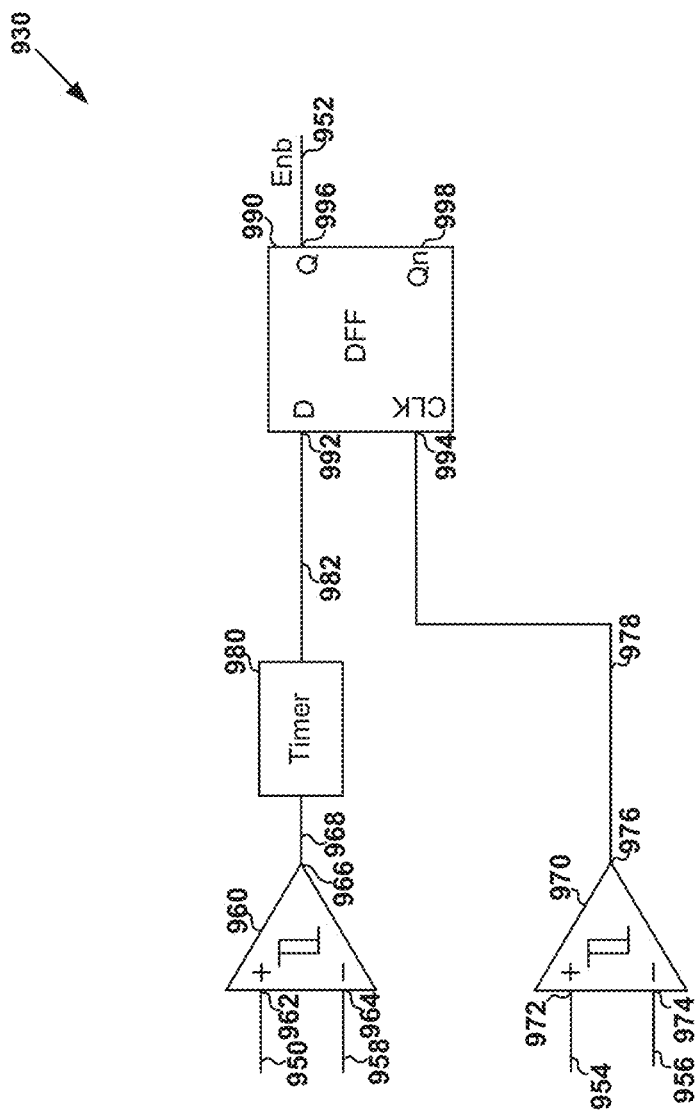
FIG. 9 is a simplified diagram showing one or more components of a voltage detector of an SR control circuit in a flyback switching power supply system according to some embodiments of the present invention.

FIG. 9 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 930 includes comparators 960 and 970, a timer 980, and a flip-flop 990. In some examples, the voltage detector 930 is the voltage detector 530 of the SR control circuit 520 of the flyback switching power supply system 500 as shown in FIG. 5. In certain examples, the voltage detector 930 is the voltage detector 630 of the SR control circuit 620 of the flyback switching power supply system 600 as shown in FIG. 6. Although the above has been shown using a selected group of components for the voltage detector 930, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the comparator 960 includes a non-inverting input terminal 962 (e.g., a positive terminal), an inverting input terminal 964 (e.g., a negative terminal), and an output terminal 966. In some examples, the non-inverting input terminal 962 (e.g., the positive terminal) receives an input voltage 950, and the inverting input terminal 964 (e.g., the negative terminal) receives a threshold voltage 958. For example, the threshold voltage 958 is a predetermined constant. In certain examples, the input voltage 950 is related to the voltage 550 and/or the voltage 628. For example, the input voltage 950 is the voltage 550. As an example, the input voltage 950 is the voltage 628. In some examples, the comparator 960 compares the input voltage 950 and the threshold voltage 958 and outputs a comparison signal 968 at the output terminal 966. For example, if the input voltage 950 is larger than the threshold voltage 958, the comparison signal 968 is at a logic high level. As an example, if the input voltage 950 is smaller than the threshold voltage 958, the comparison signal 968 is at a logic low level. In some embodiments, the timer 980 receives the comparison signal 968 and outputs a timer signal 982. For example, in response to the comparison signal 968 changing from the logic high level to the logic low level, the timer 980 generates the timer signal 982 at a logic high level and the timer 980 starts counting. As an example, a predetermined duration of time after the timer 980 starts counting, the timer 980 changes the timer signal 982 from the logic high level to a logic low level.

According to some embodiments, the comparator 970 includes a non-inverting input terminal 972 (e.g., a positive terminal), an inverting input terminal 974 (e.g., a negative terminal), and an output terminal 976. In some examples, the non-inverting input terminal 972 (e.g., the positive terminal) receives an input voltage 954, and the inverting input terminal 974 (e.g., the negative terminal) receives a threshold voltage 956. For example, the threshold voltage 956 is a predetermined constant. As an example, the threshold voltage 956 is lower than the threshold voltage 958. In certain examples, the input voltage 954 is related to the voltage 550 and/or the voltage 628. For example, the input voltage 954 is the voltage 550, and the threshold voltage 956 is a predetermined SR turn-on threshold for the voltage detector 530. As an example, the input voltage 954 is the voltage 628, and the threshold voltage 956 is a predetermined SR turn-on threshold for the voltage detector 630. In some examples, the comparator 970 compares the input voltage 954 and the threshold voltage 956 and outputs a comparison signal 978 at the output terminal 976. For example, if the input voltage 954 is larger than the threshold voltage 956, the comparison signal 978 is at a logic high level. As an example, if the input voltage 954 is smaller than the threshold voltage 956, the comparison signal 978 is at a logic low level.

According to certain embodiments, the flip-flop 990 includes an input terminal 992 (e.g., D), an input terminal 994 (e.g., CLK), an output terminal 996 (e.g., Q), and an output terminal 998 (e.g., Qn). In some examples, the input terminal 992 (e.g., D) receives the timer signal 982, the input terminal 994 (e.g., CLK) receives the comparison signal 978, and the output terminal 996 (e.g., Q) outputs a detection signal 952 (e.g., Enb). For example, the detection signal 952 (e.g., Enb) is the detection signal 552. As an example, the detection signal 952 (e.g., Enb) is the detection signal 652. In certain examples, in response to the comparison signal 978 changing from the logic high level to the logic low level, the flip-flop 990 generates the detection signal 952 that is the same as the timer signal 982 at the time when the comparison signal 978 changes from the logic high level to the logic low level. For example, when the comparison signal 978 changes from the logic high level to the logic low level, if the timer signal 982 is at the logic high level, the flip-flop 990 generates the detection signal 952 at the logic high level. As an example, when the comparison signal 978 changes from the logic high level to the logic low level, if the timer signal 982 is at the logic low level, the flip-flop 990 generates the detection signal 952 at the logic low level.

In some embodiments, the voltage detector 930 is the voltage detector 530 of the SR control circuit 520 of the flyback switching power supply system 500, and the detection signal 952 (e.g., Enb) is the detection signal 552. For example, if the detection signal 952 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 952 is at the logic low level, the SR switch 522 (e.g., the transistor M2) remains open (e.g., tuned off). In certain embodiments, the voltage detector 930 is the voltage detector 630 of the SR control circuit 620 of the flyback switching power supply system 600, and the detection signal 952 (e.g., Enb) is the detection signal 652. For example, if the detection signal 952 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 952 is at the logic low level, the SR switch 622 (e.g., the transistor M2) remains open (e.g., tuned off).

As discussed above and further emphasized here, FIG. 9 is merely an example, which should not unduly limit the scope of the claims. One of ordinary skill in the art would recognize many variations, alternatives, and modifications. For example, the voltage detector 930 is the voltage detector 530 of the SR control circuit 520 of the flyback switching power supply system 500, the input voltage 950 is the voltage 550, the input voltage 954 is the voltage 550, the threshold voltage 956 is the predetermined SR turn-on threshold for the voltage detector 530, and the detection signal 952 (e.g., Enb) is the detection signal 552. As an example, the voltage detector 930 is the voltage detector 630 of the SR control circuit 620 of the flyback switching power supply system 600, the input voltage 950 is the voltage 628, the input voltage 954 is the voltage 628, the threshold voltage 956 is the predetermined SR turn-on threshold for the voltage detector 630, and the detection signal 952 (e.g., Enb) is the detection signal 652.

Figure 10:
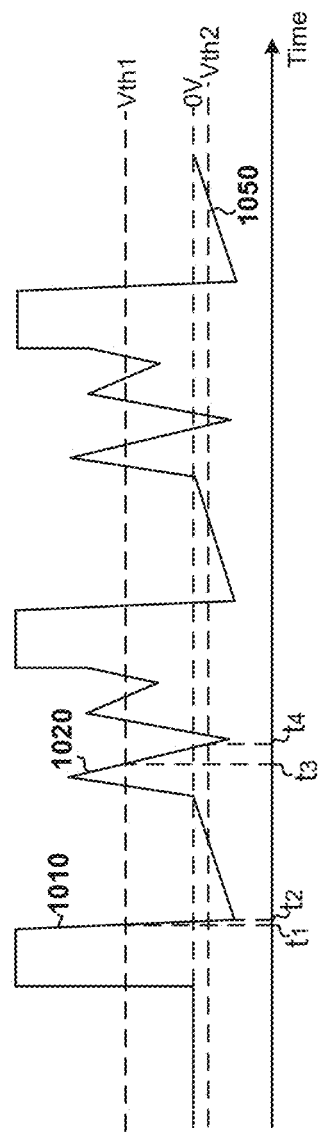
FIG. 10 shows a simplified timing diagram for the flyback switching power supply system that includes the voltage detector as shown in FIG. 5 and FIG. 9 or the flyback switching power supply system that includes the voltage detector as shown in FIG. 6 and FIG. 9 under discontinuous conduction mode (DCM) according to certain embodiments of the present invention.

FIG. 10 shows a simplified timing diagram for the flyback switching power supply system 500 that includes the voltage detector 930 as the voltage detector 530 as shown in FIG. 5 and FIG. 9 or the flyback switching power supply system 600 that includes the voltage detector 930 as the voltage detector 630 as shown in FIG. 6 and FIG. 9 under discontinuous conduction mode (DCM) according to certain embodiments of the present invention. This diagram is merely an example, which should not unduly limit the scope of the claims. One of ordinary skill in the art would recognize many variations, alternatives, and modifications.

In some examples, the waveform 1050 represents the voltage 550 subtracted by the ground voltage of the secondary side at the terminal 542 (e.g., the GND terminal) as a function of time, if the primary-side control circuit 510 operates under discontinuous conduction mode (DCM). As an example, the input voltage 950 is the voltage 550, the input voltage 954 is the voltage 550, the threshold voltage 956 is a predetermined SR turn-on threshold, and the detection signal 952 (e.g., Enb) is the detection signal 552. In certain examples, the waveform 1050 represents the voltage 628 subtracted by the voltage 660 at the terminal 642 (e.g., the GND terminal) as a function of time, if the primary-side control circuit 610 operates under discontinuous conduction mode (DCM). As an example, the input voltage 950 is the voltage 628, the input voltage 954 is the voltage 628, the threshold voltage 956 is a predetermined SR turn-on threshold, and the detection signal 952 (e.g., Enb) is the detection signal 652.

As shown in FIG. 10, the waveform 1050 includes a falling edge 1010 of the voltage 550 subtracted by the ground voltage of the secondary side at the terminal 542 (e.g., the GND terminal) or the voltage 628 subtracted by the voltage 660 at the terminal 642 (e.g., the GND terminal), and the waveform 1050 also includes a falling edge 1020 of the voltage 550 subtracted by the ground voltage of the secondary side at the terminal 542 (e.g., the GND terminal) or the voltage 628 subtracted by the voltage 660 at the terminal 642 (e.g., the GND terminal) according to some embodiments. For example, the falling edge 1010 occurs during a demagnetization process of the secondary winding 506 (e.g., occurs after the start of a demagnetization process but before the end of the demagnetization process), and the falling edge 1020 occurs not during any demagnetization process of the secondary winding 506 (e.g., occurs after the end of a demagnetization process but before the start of another demagnetization process). As an example, the falling edge 1010 occurs during a demagnetization process of the secondary winding 606 (e.g., occurs after the start of a demagnetization process but before the end of the demagnetization process), and the falling edge 1020 occurs not during any demagnetization process of the secondary winding 606 (e.g., occurs after the end of a demagnetization process but before the start of another demagnetization process).

In certain embodiments, for the falling edge 1010, at time $t_1$, the voltage 550 subtracted by the ground voltage of the secondary side at the terminal 542 (e.g., the GND terminal) becomes smaller than the threshold voltage 958 (e.g., $V_{th1}$) and the comparison signal 968 changes from a logic high level to a logic low level. For example, at time $t_1$, in response to the comparison signal 968 changing from the logic high level to the logic low level, the timer 980 generates the timer signal 982 at a logic high level and the timer 980 starts counting. In some embodiments, after the voltage 550 subtracted by the ground voltage of the secondary side at the terminal 542 (e.g., the GND terminal) becomes smaller than the threshold voltage 958 (e.g., $V_{th1}$), the voltage 550 subtracted by the ground voltage of the secondary side at the terminal 542 (e.g., the GND terminal) further decreases and becomes smaller than the threshold voltage 956 (e.g., $V_{th2}$) at time $t_2$. For example, the threshold voltage 958 (e.g., $V_{th1}$) is larger than the threshold voltage 956 (e.g., $V_{th2}$). As an example, the threshold voltage 956 (e.g., $V_{th2}$) is the predetermined SR turn-on threshold that is smaller than zero volts. For example, at time $t_2$, in response to the voltage 550 subtracted by the ground voltage of the secondary side at the terminal 542 (e.g., the GND terminal) becoming smaller than the threshold voltage 956 (e.g., $V_{th2}$), the comparison signal 978 changes from the logic high level to the logic low level.

In some embodiments, at time $t_2$, in response to the comparison signal 978 changing from the logic high level to the logic low level, the flip-flop 990 generates the detection signal 952 that is the same as the timer signal 982 at time $t_2$. For example, the time duration from time $t_1$ to time $t_2$ is short than a predetermined duration of time for the timer 980, so at time $t_2$, the timer signal 982 remains at the logic high level and the detection signal 952 (e.g., Enb) is also generated at the logic high level. As an example, if the detection signal 952 is generated at the logic high level, the SR switch 522 (e.g., the transistor M2) is closed (e.g., tuned on) if the one or more logic conditions are determined to be satisfied by the logic controller 534 of the SR control circuit 520.

According to certain embodiments, for the falling edge 1020, at time $t_3$, the voltage 550 subtracted by the ground voltage of the secondary side at the terminal 542 (e.g., the GND terminal) becomes smaller than the threshold voltage 958 (e.g., $V_{th1}$) and the comparison signal 968 changes from a logic high level to a logic low level. For example, at time $t_3$, in response to the comparison signal 968 changing from the logic high level to the logic low level, the timer 980 generates the timer signal 982 at a logic high level and the timer 980 starts counting. In some embodiments, after the voltage 550 subtracted by the ground voltage of the secondary side at the terminal 542 (e.g., the GND terminal) becomes smaller than the threshold voltage 958 (e.g., $V_{th1}$), the voltage 550 subtracted by the ground voltage of the secondary side at the terminal 542 (e.g., the GND terminal) further decreases and becomes smaller than the threshold voltage 956 (e.g., $V_{th2}$) at time $t_4$. For example, the threshold voltage 956 (e.g., $V_{th2}$) is the predetermined SR turn-on threshold that is smaller than zero volts. As an example, at time $t_4$, in response to the voltage 550 subtracted by the ground voltage of the secondary side at the terminal 542 (e.g., the GND terminal) becoming smaller than the threshold voltage 956 (e.g., $V_{th2}$), the comparison signal 978 changes from the logic high level to the logic low level.

According to some embodiments, at time $t_4$, in response to the comparison signal 978 changing from the logic high level to the logic low level, the flip-flop 990 generates the detection signal 952 that is the same as the timer signal 982 at time $t_4$. For example, the time duration from time $t_3$ to time $t_4$ is longer than the predetermined duration of time for the timer 980, so at time $t_4$, the timer signal 982 is at the logic low level and the detection signal 952 (e.g., Enb) is also generated at the logic low level. As an example, if the detection signal 952 is generated at the logic low level, the SR switch 522 (e.g., the transistor M2) remains open (e.g., tuned off).

As shown in FIG. 10, the time duration from time $t_1$ to time $t_2$ is short than the predetermined duration of time for the timer 980, and the time duration from time $t_3$ to time $t_4$ is longer than the predetermined duration of time for the timer 980 according to certain embodiments. For example, it takes less time for the voltage 550 subtracted by the ground voltage of the secondary side at the terminal 542 (e.g., the GND terminal) to decrease from the threshold voltage 958 (e.g., $V_{th1}$) to the threshold voltage 956 (e.g., $V_{th2}$) along the falling edge 1010 than along the falling edge 1020. As an example, the downward slope of the falling edge 1010 is larger than the downward slope of the falling edge 1020. For example, the downward slope of the falling edge 1010 is larger than zero, and the downward slope of the falling edge 1020 is also larger than zero In certain embodiments, for the falling edge 1010, at time $t_1$, the voltage 628 subtracted by the voltage 660 at the terminal 642 (e.g., the GND terminal) becomes smaller than the threshold voltage 958 (e.g., $V_{th1}$) and the comparison signal 968 changes from a logic high level to a logic low level. For example, at time $t_1$, in response to the comparison signal 968 changing from the logic high level to the logic low level, the timer 980 generates the timer signal 982 at a logic high level and the timer 980 starts counting. In some embodiments, after the voltage 628 subtracted by the voltage 660 at the terminal 642 (e.g., the GND terminal) becomes smaller than the threshold voltage 958 (e.g., $V_{th1}$), the voltage 628 subtracted by the voltage 660 at the terminal 642 (e.g., the GND terminal) further decreases and becomes smaller than the threshold voltage 956 (e.g., $V_{th2}$) at time $t_2$. For example, the threshold voltage 956 (e.g., $V_{th2}$) is the predetermined SR turn-on threshold that is smaller than zero volts. As an example, at time $t_2$, in response to the voltage 628 subtracted by the voltage 660 at the terminal 642 (e.g., the GND terminal) becoming smaller than the threshold voltage 956 (e.g., $V_{th2}$), the comparison signal 978 changes from the logic high level to the logic low level.

In some embodiments, at time $t_2$, in response to the comparison signal 978 changing from the logic high level to the logic low level, the flip-flop 990 generates the detection signal 952 that is the same as the timer signal 982 at time $t_2$. For example, the time duration from time $t_1$ to time $t_2$ is short than a predetermined duration of time for the timer 980, so at time $t_2$, the timer signal 982 remains at the logic high level and the detection signal 952 (e.g., Enb) is also generated at the logic high level. As an example, if the detection signal 952 is generated at the logic high level, the SR switch 622 (e.g., the transistor M2) is closed (e.g., tuned on) if the one or more logic conditions are determined to be satisfied by the logic controller 634 of the SR control circuit 620.

According to certain embodiments, for the falling edge 1020, at time $t_3$, the voltage 628 subtracted by the voltage 660 at the terminal 642 (e.g., the GND terminal) becomes smaller than the threshold voltage 958 (e.g., $V_{th1}$) and the comparison signal 968 changes from a logic high level to a logic low level. For example, at time $t_3$, in response to the comparison signal 968 changing from the logic high level to the logic low level, the timer 980 generates the timer signal 982 at a logic high level and the timer 980 starts counting. In some embodiments, after the voltage 628 subtracted by the voltage 660 at the terminal 642 (e.g., the GND terminal) becomes smaller than the threshold voltage 958 (e.g., $V_{th1}$), the voltage 628 subtracted by the voltage 660 at the terminal 642 (e.g., the GND terminal) further decreases and becomes smaller than the threshold voltage 956 (e.g., $V_{th2}$) at time $t_4$. For example, the threshold voltage 956 (e.g., $V_{th2}$) is the predetermined SR turn-on threshold that is smaller than zero volts. As an example, at time $t_4$, in response to the voltage 628 subtracted by the voltage 660 at the terminal 642 (e.g., the GND terminal) becoming smaller than the threshold voltage 956 (e.g., $V_{th2}$), the comparison signal 978 changes from the logic high level to the logic low level.

According to some embodiments, at time $t_4$, in response to the comparison signal 978 changing from the logic high level to the logic low level, the flip-flop 990 generates the detection signal 952 that is the same as the timer signal 982 at time $t_4$. For example, the time duration from time $t_3$ to time $t_4$ is longer than the predetermined duration of time for the timer 980, so at time $t_4$, the timer signal 982 is at the logic low level and the detection signal 952 (e.g., Enb) is also generated at the logic low level. As an example, if the detection signal 952 is generated at the logic low level, the SR switch 622 (e.g., the transistor M2) remains open (e.g., tuned off).

As shown in FIG. 10, the time duration from time $t_1$ to time $t_2$ is short than the predetermined duration of time for the timer 980, and the time duration from time $t_3$ to time $t_4$ is longer than the predetermined duration of time for the timer 980 according to certain embodiments. For example, it takes less time for the voltage 628 subtracted by the voltage 660 at the terminal 642 (e.g., the GND terminal) to decrease from the threshold voltage 958 (e.g., $V_{th1}$) to the threshold voltage 956 (e.g., $V_{th2}$) along the falling edge 1010 than along the falling edge 1020. As an example, the downward slope of the falling edge 1010 is larger than the downward slope of the falling edge 1020. For example, the downward slope of the falling edge 1010 is larger than the downward slope of the falling edge 1020

Figure 11:
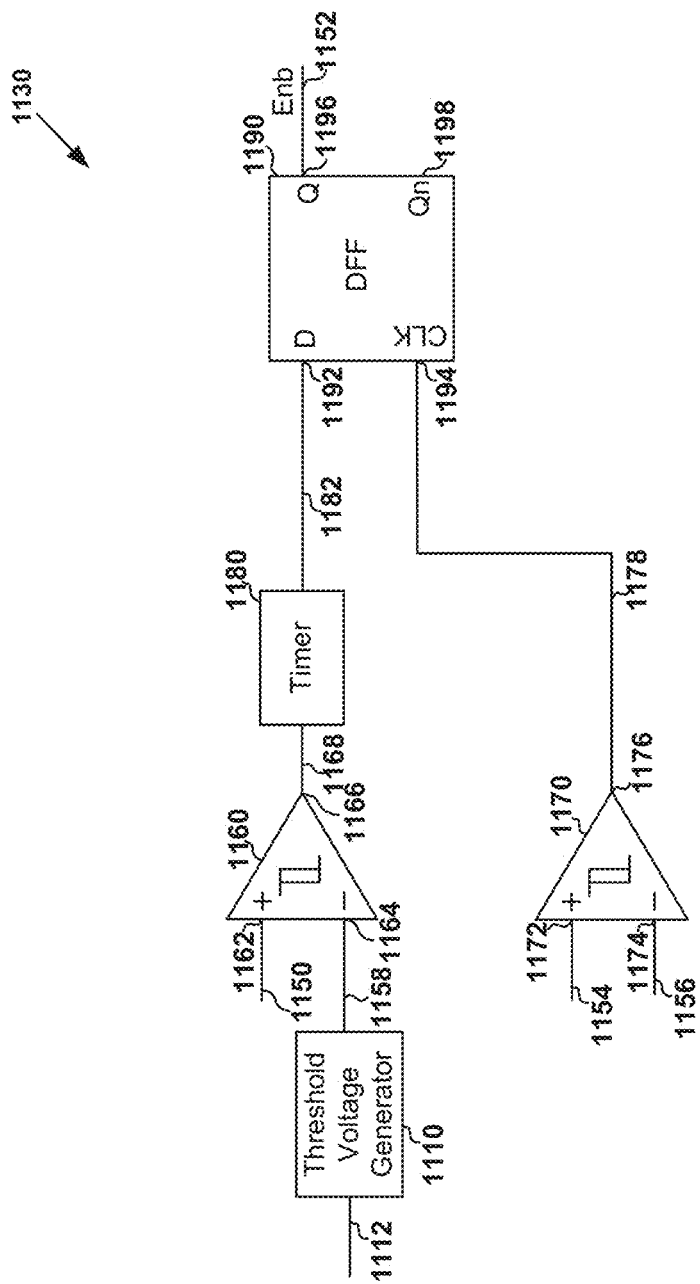
FIG. 11 is a simplified diagram showing one or more components of a voltage detector of an SR control circuit in a flyback switching power supply system according to some embodiments of the present invention.

FIG. 11 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1130 includes comparators 1160 and 1170, a timer 1180, a flip-flop 1190, and a threshold voltage generator 1110. In some examples, the voltage detector 1130 is the voltage detector 530 of the SR control circuit 520 of the flyback switching power supply system 500 as shown in FIG. 5. In certain examples, the voltage detector 1130 is the voltage detector 630 of the SR control circuit 620 of the flyback switching power supply system 600 as shown in FIG. 6. Although the above has been shown using a selected group of components for the voltage detector 1130, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the comparator 1160 includes a non-inverting input terminal 1162 (e.g., a positive terminal), an inverting input terminal 1164 (e.g., a negative terminal), and an output terminal 1166. In some examples, the non-inverting input terminal 1162 (e.g., the positive terminal) receives an input voltage 1150, and the inverting input terminal 1164 (e.g., the negative terminal) receives a threshold voltage 1158 from the threshold voltage generator 1110. In certain examples, the input voltage 1150 is related to the voltage 550 and/or the voltage 628. For example, the input voltage 1150 is the voltage 550. As an example, the input voltage 1150 is the voltage 628. In some examples, the comparator 1160 compares the input voltage 1150 and the threshold voltage 1158 and outputs a comparison signal 1168 at the output terminal 1166. For example, if the input voltage 1150 is larger than the threshold voltage 1158, the comparison signal 1168 is at a logic high level. As an example, if the input voltage 1150 is smaller than the threshold voltage 1158, the comparison signal 1168 is at a logic low level. In some embodiments, the timer 1180 receives the comparison signal 1168 and outputs a timer signal 1182. For example, in response to the comparison signal 1168 changing from the logic high level to the logic low level, the timer 1180 generates the timer signal 1182 at a logic high level and the timer 1180 starts counting. As an example, a predetermined duration of time after the timer 1180 starts counting, the timer 1180 changes the timer signal 1182 from the logic high level to a logic low level.

As shown in FIG. 11, the threshold voltage generator 1110 receives a voltage 1112 and generates the threshold voltage 1158 based at least in part upon the voltage 1112 according to certain embodiments. For example, the threshold voltage 1158 increases with the increase of the voltage 1112, and decreases with the decrease of the voltage 1112. In some examples, the voltage 1112 indicates the magnitude of the output voltage 528 (e.g., $V_O$) of the flyback switching power supply system 500. As an example, the voltage 1112 is the output voltage 528 (e.g., $V_O$) of the flyback switching power supply system 500. For example, with the increase of the output voltage 528 (e.g., $V_O$), the downward slope of the voltage 550 during resonance becomes larger, so by increasing the threshold voltage 1158 with the increase of the output voltage 528 (e.g., $V_O$), the time it takes for the voltage 550 to decrease from the threshold voltage 1158 to a threshold voltage 1156 does not become shorter with the increase of the output voltage 528 (e.g., $V_O$) in order to maintain accuracy of the assessment of the downward slope of the voltage 550 during resonance. For example, the threshold voltage 1156 is smaller than the threshold voltage 1158. In certain examples, the voltage 1112 indicates the magnitude of the output voltage 628 (e.g., $V_O$) of the flyback switching power supply system 600. As an example, the voltage 1112 is the output voltage 628 (e.g., $V_O$) of the flyback switching power supply system 600. For example, with the increase of the output voltage 628 (e.g., $V_O$), the downward slope of the voltage 628 during resonance becomes larger, so by increasing the threshold voltage 1158 with the increase of the output voltage 628 (e.g., $V_O$), the time it takes for the voltage 628 to decrease from the threshold voltage 1158 to the threshold voltage 1156 does not become shorter with the increase of the output voltage 628 (e.g., $V_O$) in order to maintain accuracy of the assessment of the downward slope of the voltage 628 during resonance.

According to some embodiments, the comparator 1170 includes a non-inverting input terminal 1172 (e.g., a positive terminal), an inverting input terminal 1174 (e.g., a negative terminal), and an output terminal 1176. In some examples, the non-inverting input terminal 1172 (e.g., the positive terminal) receives an input voltage 1154, and the inverting input terminal 1174 (e.g., the negative terminal) receives the threshold voltage 1156. For example, the threshold voltage 1156 is a predetermined constant. As an example, the threshold voltage 1156 is lower than the threshold voltage 1158. In certain examples, the input voltage 1154 is related to the voltage 550 and/or the voltage 628. For example, the input voltage 1154 is the voltage 550, and the threshold voltage 1156 is a predetermined SR turn-on threshold for the voltage detector 530. As an example, the input voltage 1154 is the voltage 628, and the threshold voltage 1156 is a predetermined SR turn-on threshold for the voltage detector 630. In some examples, the comparator 1170 compares the input voltage 1154 and the threshold voltage 1156 and outputs a comparison signal 1178 at the output terminal 1176. For example, if the input voltage 1154 is larger than the threshold voltage 1156, the comparison signal 1178 is at a logic high level. As an example, if the input voltage 1154 is smaller than the threshold voltage 1156, the comparison signal 1178 is at a logic low level.

According to certain embodiments, the flip-flop 1190 includes an input terminal 1192 (e.g., D), an input terminal 1194 (e.g., CLK), an output terminal 1196 (e.g., Q), and an output terminal 1198 (e.g., Qn). In some examples, the input terminal 1192 (e.g., D) receives the timer signal 1182, the input terminal 1194 (e.g., CLK) receives the comparison signal 1178, and the output terminal 1196 (e.g., Q) outputs a detection signal 1152 (e.g., Enb). For example, the detection signal 1152 (e.g., Enb) is the detection signal 552. As an example, the detection signal 1152 (e.g., Enb) is the detection signal 652. In certain examples, in response to the comparison signal 1178 changing from the logic high level to the logic low level, the flip-flop 1190 generates the detection signal 1152 that is the same as the timer signal 1182 at the time when the comparison signal 1178 changes from the logic high level to the logic low level. For example, when the comparison signal 1178 changes from the logic high level to the logic low level, if the timer signal 1182 is at the logic high level, the flip-flop 1190 generates the detection signal 1152 at the logic high level. As an example, when the comparison signal 1178 changes from the logic high level to the logic low level, if the timer signal 1182 is at the logic low level, the flip-flop 1190 generates the detection signal 1152 at the logic low level.

In some embodiments, the voltage detector 1130 is the voltage detector 530 of the SR control circuit 520 of the flyback switching power supply system 500, and the detection signal 1152 (e.g., Enb) is the detection signal 552. For example, if the detection signal 1152 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1152 is at the logic low level, the SR switch 522 (e.g., the transistor M2) remains open (e.g., tuned off). In certain embodiments, the voltage detector 1130 is the voltage detector 630 of the SR control circuit 620 of the flyback switching power supply system 600, and the detection signal 1152 (e.g., Enb) is the detection signal 652. For example, if the detection signal 1152 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1152 is at the logic low level, the SR switch 622 (e.g., the transistor M2) remains open (e.g., tuned off).

As discussed above and further emphasized here, FIG. 11 is merely an example, which should not unduly limit the scope of the claims. One of ordinary skill in the art would recognize many variations, alternatives, and modifications. For example, the voltage detector 1130 is the voltage detector 530 of the SR control circuit 520 of the flyback switching power supply system 500, the input voltage 1150 is the voltage 550, the input voltage 1154 is the voltage 550, the threshold voltage 1156 is the predetermined SR turn-on threshold for the voltage detector 530, and the detection signal 1152 (e.g., Enb) is the detection signal 552. As an example, the voltage detector 1130 is the voltage detector 630 of the SR control circuit 620 of the flyback switching power supply system 600, the input voltage 1150 is the voltage 628, the input voltage 1154 is the voltage 628, and the threshold voltage 1156 is the predetermined SR turn-on threshold for the voltage detector 630, and the detection signal 1152 (e.g., Enb) is the detection signal 652.

Figure 12:
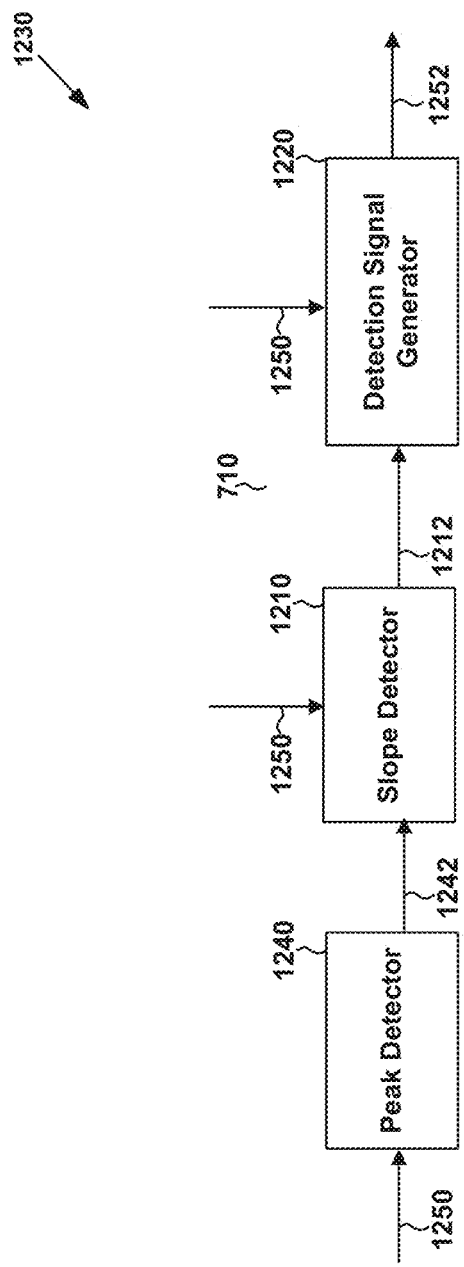
FIG. 12 is a simplified diagram showing one or more components of a voltage detector of an SR control circuit in a flyback switching power supply system according to certain embodiments of the present invention.

FIG. 12 is a simplified diagram showing one or more components of a voltage detector of an SR control circuit in a flyback switching power supply system according to certain embodiments of the present invention. This diagram is merely an example, which should not unduly limit the scope of the claims. One of ordinary skill in the art would recognize many variations, alternatives, and modifications. The voltage detector 1230 includes a peak detector 1240, a slope detector 1210 and a detection signal generator 1220. In some examples, the voltage detector 1230 is the voltage detector 530 of the SR control circuit 520 of the flyback switching power supply system 500 as shown in FIG. 5. In certain examples, the voltage detector 1230 is the voltage detector 630 of the SR control circuit 620 of the flyback switching power supply system 600 as shown in FIG. 6. Although the above has been shown using a selected group of components for the voltage detector 1230, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the peak detector 1240 receives a voltage 1250 (e.g., the voltage 550 and/or the voltage 628), detects a peak magnitude of the voltage 1250, and generates a threshold voltage 1242 based at least in part on the detected peak magnitude of the voltage 1250. For example, the threshold voltage 1242 is equal to the detected peak magnitude of the voltage 1250 (e.g., the detected peak magnitude of the voltage 550 and/or the detected peak magnitude of the voltage 628). As an example, the detected peak magnitude of the voltage 1250 (e.g., the detected peak magnitude of the voltage 550 and/or the detected peak magnitude of the voltage 628) increases with the increase of the output voltage (e.g., the output voltage 528 and/or the output voltage 628) of the flyback switching power supply system, and the threshold voltage 1242 also increases with the increase of the output voltage (e.g., the output voltage 528 and/or the output voltage 628) of the flyback switching power supply system. For example, the detected peak magnitude of the voltage 1250 (e.g., the detected peak magnitude of the voltage 550 and/or the detected peak magnitude of the voltage 628) decreases with the decrease of the output voltage (e.g., the output voltage 528 and/or the output voltage 628) of the flyback switching power supply system, and the threshold voltage 1242 also decreases with the decrease of the output voltage (e.g., the output voltage 528 and/or the output voltage 628) of the flyback switching power supply system.

In certain embodiments, the slope detector 1210 receives the voltage 1250 (e.g., the voltage 550 and/or the voltage 628) and the threshold voltage 1242, determines whether the downward slope of the voltage 1250 is larger than a predetermined slope threshold based at least in part on the threshold voltage 1242, and generates a slope signal 1212 that indicates whether the downward slope of the voltage 1250 is larger than the predetermined slope threshold. For example, if the downward slope of the voltage 1250 is larger than the predetermined slope threshold, the falling edge that corresponds to the downward slope occurs during a demagnetization process of the secondary winding (e.g., the secondary winding 506 and/or the secondary winding 606). As an example, if the downward slope of the voltage 1250 is smaller than the predetermined slope threshold, the falling edge that corresponds to the downward slope occurs not during any demagnetization process of the secondary winding (e.g., the secondary winding 506 and/or the secondary winding 606).

In certain embodiments, the slope signal 1212 is received by the detection signal generator 1220, which also receives the voltage 1250 (e.g., the voltage 550 and/or the voltage 628) and generates a detection signal 1252 (e.g., the detection signal 552 and/or the detection signal 652) based at least in part on the slope signal 1212 and the voltage 1250. In some examples, the detection signal 1252 (e.g., the detection signal 552 and/or the detection signal 652) indicates whether or not the voltage 1250 becomes lower than a predetermined SR turn-on threshold during a demagnetization process of the secondary winding (e.g., the secondary winding 506 and/or the secondary winding 606). For example, if the voltage 1250 becomes lower than the predetermined SR turn-on threshold after the start of the demagnetization process but before the end of the demagnetization process, the SR switch (e.g., the SR switch 522 and/or the SR switch 622) is closed if the one or more logic conditions are determined to be satisfied. As an example, if the voltage 1250 does not become lower than the predetermined SR turn-on threshold during any demagnetization process of the secondary winding (e.g., the secondary winding 506 and/or the secondary winding 606), the SR switch (e.g., the SR switch 522 and/or the SR switch 622) remains open.

As discussed above and further emphasized here, FIG. 12 is merely an example, which should not unduly limit the scope of the claims. One of ordinary skill in the art would recognize many variations, alternatives, and modifications. For example, the voltage 1250 is directly proportional to the voltage 550 through a voltage divider. As an example, the voltage 1250 is directly proportional to the voltage 628 through a voltage divider.

Figure 13:
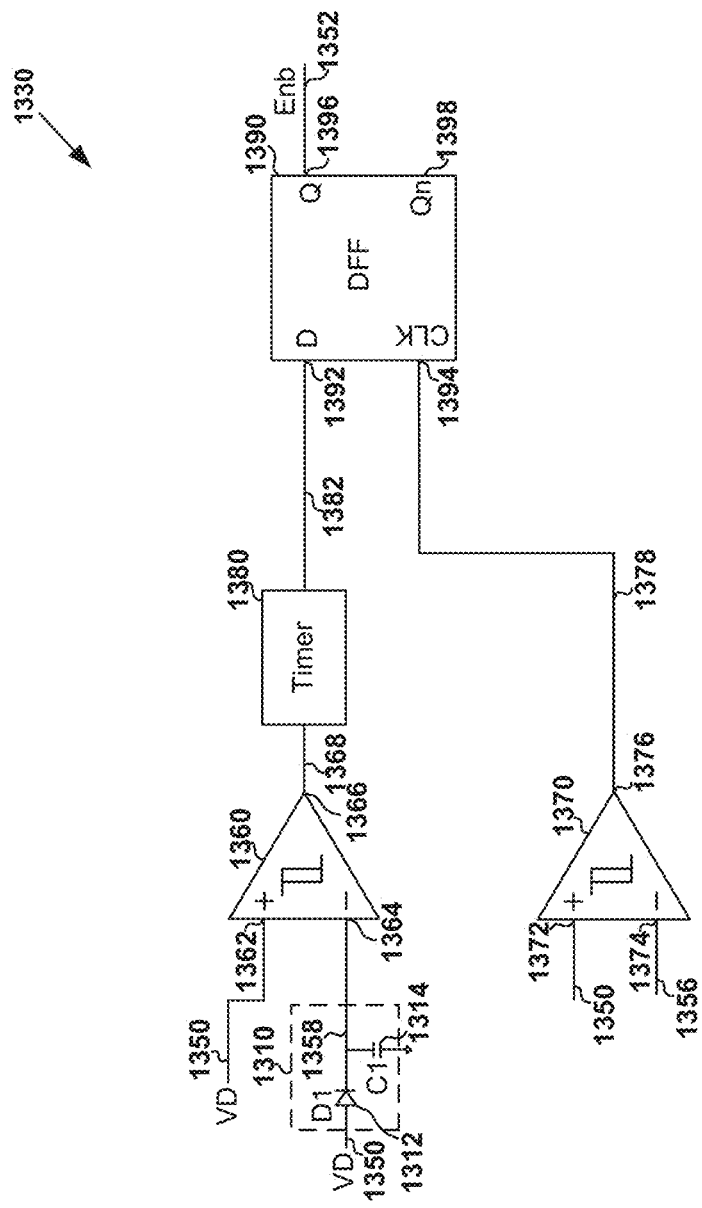
FIG. 13 is a simplified diagram showing one or more components of a voltage detector of an SR control circuit in a flyback switching power supply system according to some embodiments of the present invention.

FIG. 13 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1330 includes comparators 1360 and 1370, a timer 1380, a flip-flop 1390, and a peak detector 1310. For example, the peak detector 1310 includes a diode 1312 and a capacitor 1314. In some examples, the voltage detector 1330 is the voltage detector 530 of the SR control circuit 520 of the flyback switching power supply system 500 as shown in FIG. 5. In certain examples, the voltage detector 1330 is the voltage detector 630 of the SR control circuit 620 of the flyback switching power supply system 600 as shown in FIG. 6. Although the above has been shown using a selected group of components for the voltage detector 1330, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the peak detector 1310 receives an input voltage 1350 and generates a threshold voltage 1358 based at least in part on the input voltage 1350. For example, the input voltage 1350 is the voltage 550. As an example, the input voltage 1350 is the voltage 628. In some examples, the diode 1312 of the peak detector 1310 includes an anode and a cathode. For example, the anode of the diode 1312 receives the input voltage 1350. As an example, the cathode of the diode 1312 is connected to a terminal of the capacitor 1314 and biased to the threshold voltage 1358, which is outputted to the comparator 1360. For example, the capacitor 1314 includes another terminal biased to a ground voltage (e.g., the ground voltage of the secondary side of the flyback switching power supply system 500 and/or the ground voltage of the secondary side of the flyback switching power supply system 600).

In certain examples, when the input voltage 1350 (e.g., the voltage 550 and/or the voltage 628) rises, the input voltage 1350 charges the capacitor 1314 through the diode 1312, causing the voltage at the cathode of the diode 1312 to rise. For example, when the input voltage 1350 reaches an input peak magnitude, the voltage at the cathode of the diode 1312 also reaches a cathode peak magnitude. For example, the cathode peak magnitude is determined as follows:

$$V_{cp} = V_{ip} - V_{diode} \quad \text{(Equation 3)}$$

where $V_{cp}$ represents the cathode peak magnitude, and $V_{ip}$ represents the input peak magnitude. Additionally, $V_{diode}$ represents the forward voltage of the diode 1312. As an example, when the input voltage 1350 drops from the input peak magnitude, the voltage at the cathode of the diode 1312 remains at the cathode peak magnitude and is used as the threshold voltage 1358.

In certain embodiments, the comparator 1360 includes a non-inverting input terminal 1362 (e.g., a positive terminal), an inverting input terminal 1364 (e.g., a negative terminal), and an output terminal 1366. In some examples, the non-inverting input terminal 1362 (e.g., the positive terminal) receives the input voltage 1350, and the inverting input terminal 1364 (e.g., the negative terminal) receives the threshold voltage 1358 from the peak detector 1310. In some examples, the comparator 1360 compares the input voltage 1350 and the threshold voltage 1358 and outputs a comparison signal 1368 at the output terminal 1366. For example, if the input voltage 1350 is larger than the threshold voltage 1358, the comparison signal 1368 is at a logic high level. As an example, if the input voltage 1350 is smaller than the threshold voltage 1358, the comparison signal 1368 is at a logic low level. In some embodiments, the timer 1380 receives the comparison signal 1368 and outputs a timer signal 1382. For example, in response to the comparison signal 1368 changing from the logic high level to the logic low level, the timer 1380 generates the timer signal 1382 at a logic high level and the timer 1380 starts counting. As an example, a predetermined duration of time after the timer 1380 starts counting, the timer 1380 changes the timer signal 1382 from the logic high level to a logic low level.

According to some embodiments, the comparator 1370 includes a non-inverting input terminal 1372 (e.g., a positive terminal), an inverting input terminal 1374 (e.g., a negative terminal), and an output terminal 1376. In some examples, the non-inverting input terminal 1372 (e.g., the positive terminal) receives the input voltage 1350, and the inverting input terminal 1374 (e.g., the negative terminal) receives a threshold voltage 1356. In certain examples, the threshold voltage 1356 is a predetermined constant. As an example, the threshold voltage 1356 is lower than the threshold voltage 1358. For example, the input voltage 1350 is the voltage 550, and the threshold voltage 1356 is a predetermined SR turn-on threshold for the voltage detector 530. As an example, the input voltage 1350 is the voltage 628, and the threshold voltage 1356 is a predetermined SR turn-on threshold for the voltage detector 630. In some examples, the comparator 1370 compares the input voltage 1350 and the threshold voltage 1356 and outputs a comparison signal 1378 at the output terminal 1376. For example, if the input voltage 1350 is larger than the threshold voltage 1356, the comparison signal 1378 is at a logic high level. As an example, if the input voltage 1350 is smaller than the threshold voltage 1356, the comparison signal 1378 is at a logic low level.

According to certain embodiments, the flip-flop 1390 includes an input terminal 1392 (e.g., D), an input terminal 1394 (e.g., CLK), an output terminal 1396 (e.g., Q), and an output terminal 1398 (e.g., Qn). In some examples, the input terminal 1392 (e.g., D) receives the timer signal 1382, the input terminal 1394 (e.g., CLK) receives the comparison signal 1378, and the output terminal 1396 (e.g., Q) outputs a detection signal 1352 (e.g., Enb). For example, the detection signal 1352 (e.g., Enb) is the detection signal 552. As an example, the detection signal 1352 (e.g., Enb) is the detection signal 652. In certain examples, in response to the comparison signal 1378 changing from the logic high level to the logic low level, the flip-flop 1390 generates the detection signal 1352 that is the same as the timer signal 1382 at the time when the comparison signal 1378 changes from the logic high level to the logic low level. For example, when the comparison signal 1378 changes from the logic high level to the logic low level, if the timer signal 1382 is at the logic high level, the flip-flop 1390 generates the detection signal 1352 at the logic high level. As an example, when the comparison signal 1378 changes from the logic high level to the logic low level, if the timer signal 1382 is at the logic low level, the flip-flop 1390 generates the detection signal 1352 at the logic low level.

In some embodiments, the voltage detector 1330 is the voltage detector 530 of the SR control circuit 520 of the flyback switching power supply system 500, the input voltage 1350 is the voltage 550, the threshold voltage 1356 is the predetermined SR turn-on threshold for the voltage detector 530, and the detection signal 1352 (e.g., Enb) is the detection signal 552. For example, if the detection signal 1352 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1352 is at the logic low level, the SR switch 522 (e.g., the transistor M2) remains open (e.g., tuned off).

In certain embodiments, the voltage detector 1330 is the voltage detector 630 of the SR control circuit 620 of the flyback switching power supply system 600, the input voltage 1350 is the voltage 628, the threshold voltage 1356 is the predetermined SR turn-on threshold for the voltage detector 630, and the detection signal 1352 (e.g., Enb) is the detection signal 652. For example, if the detection signal 1352 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1352 is at the logic low level, the SR switch 622 (e.g., the transistor M2) remains open (e.g., tuned off).

Figure 14:
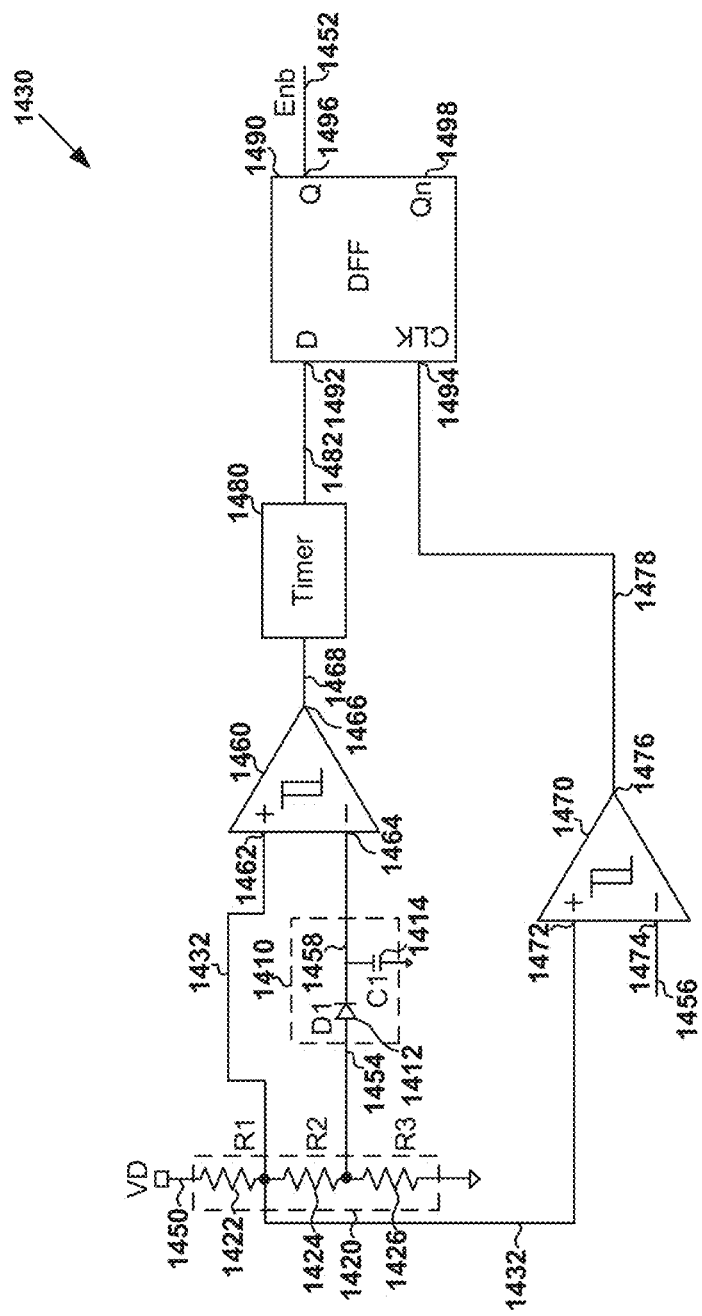
FIG. 14 is a simplified diagram showing one or more components of a voltage detector of an SR control circuit in a flyback switching power supply system according to certain embodiments of the present invention.

FIG. 14 is a simplified diagram showing one or more components of a voltage detector of an SR control circuit in a flyback switching power supply system according to certain embodiments of the present invention. This diagram is merely an example, which should not unduly limit the scope of the claims. One of ordinary skill in the art would recognize many variations, alternatives, and modifications. The voltage detector 1430 includes comparators 1460 and 1470, a timer 1480, a flip-flop 1490, a peak detector 1410, and a voltage divider 1420. For example, the peak detector 1410 includes a diode 1412 and a capacitor 1414. As an example, the voltage divider 1420 includes resistors 1422, 1424, and 1426. In some examples, the voltage detector 1430 is the voltage detector 530 of the SR control circuit 520 of the flyback switching power supply system 500 as shown in FIG. 5. In certain examples, the voltage detector 1430 is the voltage detector 630 of the SR control circuit 620 of the flyback switching power supply system 600 as shown in FIG. 6. Although the above has been shown using a selected group of components for the voltage detector 1430, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the voltage divider 1420 receives an input voltage 1450 and generates voltages 1454 and 1432 based at least in part on the input voltage 1450. For example, the input voltage 1450 is the voltage 550. As an example, the input voltage 1450 is the voltage 628. In certain examples, the voltage 1454 is directly proportional to the input voltage 1450, and the voltage 1432 is also directly proportional to the input voltage 1450 as follows:

$$V_{1454}=k_1 \times V_{1450} \qquad \text{(Equation 4)}$$

$$V_{1432}=k_2 \times V_{1450} \qquad \text{(Equation 5)}$$

where $V_{1454}$ represents the voltage 1454, and $V_{1432}$ represents the voltage 1432. Additionally, $k_1$ is a constant, and $k_2$ is also a constant. Moreover, $V_{1450}$ represents the input voltage 1450. For example, $k_1$ and $k_2$ are different, and the voltages 1454 and 1432 are different. As an example, $k_1$ and $k_2$ are equal, and the voltages 1454 and 1432 are the same. For example, the voltage 1454 is directly proportional to the voltage 1432.

In some examples, one terminal of the resistor 1422 is configured to receive the input voltage 1450, and another terminal of the resistor 1422 is connected to one terminal of the resistor 1424 and configured to output the voltage 1432. For example, the resistor 1424 includes another terminal that is connected to one terminal of the resistor 1426 and configured to output the voltage 1454. As an example, the resistor 1426 includes another terminal that is biased to a ground voltage (e.g., the ground voltage of the secondary side of the flyback switching power supply system 500 and/or the ground voltage of the secondary side of the flyback switching power supply system 600).

According to certain embodiments, the peak detector 1410 receives the voltage 1454 from the voltage divider 1420 and generates a threshold voltage 1458 based at least in part on the voltage 1454. In some examples, the diode 1412 of the peak detector 1410 includes an anode and a cathode. For example, the anode of the diode 1412 receives the voltage 1454. As an example, the cathode of the diode 1412 is connected to a terminal of the capacitor 1414 and biased to the threshold voltage 1458, which is outputted to the comparator 1460. For example, the capacitor 1414 includes another terminal biased to a ground voltage (e.g., the ground voltage of the secondary side of the flyback switching power supply system 500 and/or the ground voltage of the secondary side of the flyback switching power supply system 600). In certain examples, the voltage 1454 rises when the input voltage 1450 rises, the voltage 1454 reaches a divided peak magnitude when the input voltage 1450 reaches an input peak magnitude, and the voltage 1454 drops from the divided peak magnitude when the input voltage 1450 drops from the input peak magnitude. For example, the voltage 1454 charges the capacitor 1414 through the diode 1412, causing the voltage at the cathode of the diode 1412 to rise.

In some embodiments, when the voltage 1454 reaches the divided peak magnitude, the voltage at the cathode of the diode 1412 also reaches a cathode peak magnitude. For example, the cathode peak magnitude is determined as follows:

$$V_{cp}=V_{dp}-V_{diode} \qquad \text{(Equation 6)}$$

where $V_{cp}$ represents the cathode peak magnitude, and $V_{dp}$ represents the divided peak magnitude. Additionally, $V_{diode}$ represents the forward voltage of the diode 1412. As an example, the cathode peak magnitude is also determined as follows:

$$V_{cp}=k_1 \times V_{ip}-V_{diode} \qquad \text{(Equation 7)}$$

where $V_{cp}$ represents the cathode peak magnitude, and $V_{ip}$ represents the input peak magnitude. Additionally, $k_1$ is a constant, and $V_{diode}$ represents the forward voltage of the diode 1412. For example, when the input voltage 1450 drops from the input peak magnitude, the voltage at the cathode of the diode 1412 remains at the cathode peak magnitude and is used as the threshold voltage 1458.

In certain embodiments, the comparator 1460 includes a non-inverting input terminal 1462 (e.g., a positive terminal), an inverting input terminal 1464 (e.g., a negative terminal), and an output terminal 1466. In some examples, the non-inverting input terminal 1462 (e.g., the positive terminal) receives the voltage 1432, and the inverting input terminal 1464 (e.g., the negative terminal) receives the threshold voltage 1458 from the peak detector 1410. In some examples, the comparator 1460 compares the voltage 1432 and the threshold voltage 1458 and outputs a comparison signal 1468 at the output terminal 1466. For example, if the voltage 1432 is larger than the threshold voltage 1458, the comparison signal 1468 is at a logic high level. As an example, if the voltage 1432 is smaller than the threshold voltage 1458, the comparison signal 1468 is at a logic low level.

According to some embodiments, the timer 1480 receives the comparison signal 1468 and outputs a timer signal 1482. For example, in response to the comparison signal 1468 changing from the logic high level to the logic low level, the timer 1480 generates the timer signal 1482 at a logic high level and the timer 1480 starts counting. As an example, a predetermined duration of time after the timer 1480 starts counting, the timer 1480 changes the timer signal 1482 from the logic high level to a logic low level.

According to certain embodiments, the comparator 1470 includes a non-inverting input terminal 1472 (e.g., a positive terminal), an inverting input terminal 1474 (e.g., a negative terminal), and an output terminal 1476. In some examples, the non-inverting input terminal 1472 (e.g., the positive terminal) receives the voltage 1432 from the voltage divider 1420, and the inverting input terminal 1474 (e.g., the negative terminal) receives a threshold voltage 1456. In certain examples, the threshold voltage 1456 is a predetermined constant. As an example, the threshold voltage 1456 is lower than the threshold voltage 1458. For example, the threshold voltage 1456 is a predetermined SR turn-on threshold for the voltage detector 530. As an example, the threshold voltage 1456 is a predetermined SR turn-on threshold for the voltage detector 630. In some examples, the comparator 1470 compares the voltage 1432 and the threshold voltage 1456 and outputs a comparison signal 1478 at the output terminal 1476. For example, if the voltage 1432 is larger than the threshold voltage 1456, the comparison signal 1478 is at a logic high level. As an example, if the voltage 1432 is smaller than the threshold voltage 1456, the comparison signal 1478 is at a logic low level.

In some embodiments, the flip-flop 1490 includes an input terminal 1492 (e.g., D), an input terminal 1494 (e.g., CLK), an output terminal 1496 (e.g., Q), and an output terminal 1498 (e.g., Qn). In some examples, the input terminal 1492 (e.g., D) receives the timer signal 1482, the input terminal 1494 (e.g., CLK) receives the comparison signal 1478, and the output terminal 1496 (e.g., Q) outputs a detection signal 1452 (e.g., Enb). For example, the detection signal 1452 (e.g., Enb) is the detection signal 552. As an example, the detection signal 1452 (e.g., Enb) is the detection signal 652. In certain examples, in response to the comparison signal 1478 changing from the logic high level to the logic low level, the flip-flop 1490 generates the detection signal 1452 that is the same as the timer signal 1482 at the time when the comparison signal 1478 changes from the logic high level to the logic low level. For example, when the comparison signal 1478 changes from the logic high level to the logic low level, if the timer signal 1482 is at the logic high level, the flip-flop 1490 generates the detection signal 1452 at the logic high level. As an example, when the comparison signal 1478 changes from the logic high level to the logic low level, if the timer signal 1482 is at the logic low level, the flip-flop 1490 generates the detection signal 1452 at the logic low level.

In certain embodiments, the voltage detector 1430 is the voltage detector 530 of the SR control circuit 520 of the flyback switching power supply system 500, the input voltage 1450 is the voltage 550, the threshold voltage 1456 is the predetermined SR turn-on threshold for the voltage detector 530, and the detection signal 1452 (e.g., Enb) is the detection signal 552. For example, if the detection signal 1452 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1452 is at the logic low level, the SR switch 522 (e.g., the transistor M2) remains open (e.g., tuned off).

In some embodiments, the voltage detector 1430 is the voltage detector 630 of the SR control circuit 620 of the flyback switching power supply system 600, the input voltage 1450 is the voltage 628, the threshold voltage 1456 is the predetermined SR turn-on threshold for the voltage detector 630, and the detection signal 1452 (e.g., Enb) is the detection signal 652. For example, if the detection signal 1452 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1452 is at the logic low level, the SR switch 622 (e.g., the transistor M2) remains open (e.g., tuned off).

As shown in FIG. 5, the peak magnitude of the voltage 550 when the primary-side power switch 512 is turned on can vary significantly depending on other components of the flyback switching power supply system 500, and the peak magnitude of the voltage 550 during the resonance of the voltage 550 can also vary significantly depending on other components of the flyback switching power supply system 500 according to certain embodiments. In some examples, when the primary-side power switch 512 is turned on, the peak magnitude of the voltage 550 is determined as follows:

$$V_{550\_p} = V_{bulk\_p} \times \left(\frac{N_s}{N_p}\right) + V_O \quad \text{(Equation 8)}$$

where $V_{550\_p}$ represents the peak magnitude of the voltage 550, and $V_{bulk\_p}$ represents the peak magnitude of the voltage 564. Additionally, $N_p$ represents the number of turns of the primary winding 504, and Ns represents the number of turns of the secondary winding 506. Also, $V_O$ represents the output voltage 528 of the flyback switching power supply system 500. For example, as shown in Equation 8, when the primary-side power switch 512 is turned on, the peak magnitude of the voltage 550 can reach over 100 volts.

In certain examples, during the resonance of the voltage 550, the peak magnitude of the voltage 550 is determined as follows:

$$V_{550\_p} = 2 \times V_O \quad \text{(Equation 9)}$$

where $V_{550\_p}$ represents the peak magnitude of the voltage 550, and $V_O$ represents the output voltage 528 of the flyback switching power supply system 500. For example, as shown in Equation 9, during the resonance of the voltage 550, the peak magnitude of the voltage 550 depends on the output voltage 528. According to some embodiments, as shown in FIG. 14, the voltage divider 1420 is used to reduce the magnitude of the voltage 1432 that is received by the comparator 1470 and to reduce the magnitude of the voltage 1454 that is received by the comparator 1460.

Figure 15:
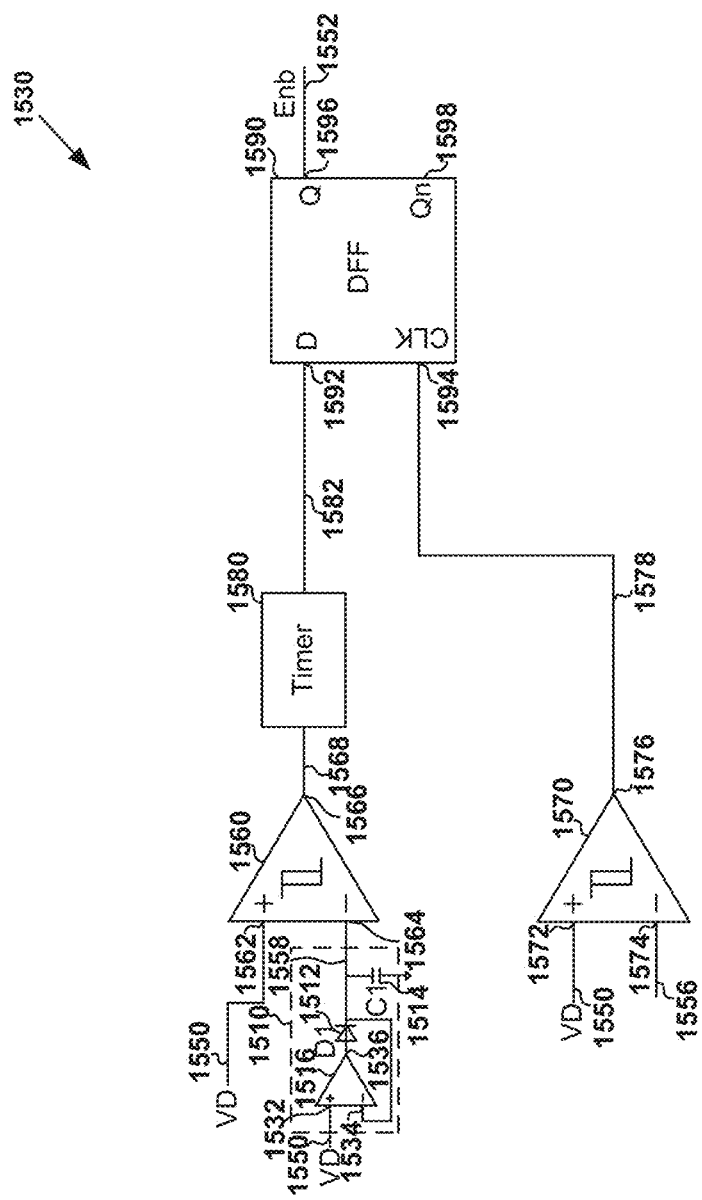
FIG. 15 is a simplified diagram showing one or more components of a voltage detector of an SR control circuit in a flyback switching power supply system according to some embodiments of the present invention.

FIG. 15 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1530 includes comparators 1560 and 1570, a timer 1580, a flip-flop 1590, and a peak detector 1510. For example, the peak detector 1510 includes a diode 1512, a capacitor 1514, and an operational amplifier 1516. In some examples, the voltage detector 1530 is the voltage detector 530 of the SR control circuit 520 of the flyback switching power supply system 500 as shown in FIG. 5. In certain examples, the voltage detector 1530 is the voltage detector 630 of the SR control circuit 620 of the flyback switching power supply system 600 as shown in FIG. 6. Although the above has been shown using a selected group of components for the voltage detector 1530, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the peak detector 1510 receives an input voltage 1550 and generates a threshold voltage 1558 based at least in part on the input voltage 1550. For example, the input voltage 1550 is the voltage 550. As an example, the input voltage 1550 is the voltage 628. In some examples, the operational amplifier 1516 includes a non-inverting input terminal 1532 (e.g., a positive terminal), an inverting input terminal 1534 (e.g., a negative terminal), and an output terminal 1536. For example, the non-inverting input terminal 1532 (e.g., a positive terminal) receives the input voltage 1550. In certain examples, the diode 1512 includes an anode and a cathode. For example, the anode of the diode 1512 is connected to the output terminal 1536 of the operational amplifier 1516. As an example, the cathode of the diode 1512 is connected to the inverting input terminal 1534 (e.g., a negative terminal) of the operational amplifier 1516, and is also connected to a terminal of the capacitor 1514 and biased to the threshold voltage 1558, which is outputted to the comparator 1560. For example, the capacitor 1514 includes another terminal biased to a ground voltage (e.g., the ground voltage of the secondary side of the flyback switching power supply system 500 and/or the ground voltage of the secondary side of the flyback switching power supply system 600).

In certain examples, when the input voltage 1550 (e.g., the voltage 550 and/or the voltage 628) rises, the input voltage 1550 charges the capacitor 1514 through the operational amplifier 1516 and the diode 1512, causing the voltage at the cathode of the diode 1512 to rise. For example, when the input voltage 1550 reaches an input peak magnitude, the voltage at the cathode of the diode 1512 also reaches a cathode peak magnitude. As an example, the cathode peak magnitude is determined as follows:

$$V_{cp} = V_{ip} \quad \text{(Equation 10)}$$

where $V_{cp}$ represents the cathode peak magnitude, and $V_{ip}$ represents the input peak magnitude. For example, the cathode peak magnitude (e.g., $V_{cp}$) is not reduced by the forward voltage of the diode 1512. As an example, when the input voltage 1550 drops from the input peak magnitude, the voltage at the cathode of the diode 1512 remains at the cathode peak magnitude and is used as the threshold voltage 1558.

In certain embodiments, the comparator 1560 includes a non-inverting input terminal 1562 (e.g., a positive terminal), an inverting input terminal 1564 (e.g., a negative terminal), and an output terminal 1566. In some examples, the non-inverting input terminal 1562 (e.g., the positive terminal) receives the input voltage 1550, and the inverting input terminal 1564 (e.g., the negative terminal) receives the threshold voltage 1558 from the peak detector 1510. In some examples, the comparator 1560 compares the input voltage 1550 and the threshold voltage 1558 and outputs a comparison signal 1568 at the output terminal 1566. For example, if the input voltage 1550 is larger than the threshold voltage 1558, the comparison signal 1568 is at a logic high level. As an example, if the input voltage 1550 is smaller than the threshold voltage 1558, the comparison signal 1568 is at a logic low level. In some embodiments, the timer 1580 receives the comparison signal 1568 and outputs a timer signal 1582. For example, in response to the comparison signal 1568 changing from the logic high level to the logic low level, the timer 1580 generates the timer signal 1582 at a logic high level and the timer 1580 starts counting. As an example, a predetermined duration of time after the timer 1580 starts counting, the timer 1580 changes the timer signal 1582 from the logic high level to a logic low level.

According to some embodiments, the comparator 1570 includes a non-inverting input terminal 1572 (e.g., a positive terminal), an inverting input terminal 1574 (e.g., a negative terminal), and an output terminal 1576. In some examples, the non-inverting input terminal 1572 (e.g., the positive terminal) receives the input voltage 1550, and the inverting input terminal 1574 (e.g., the negative terminal) receives a threshold voltage 1556. In certain examples, the threshold voltage 1556 is a predetermined constant. As an example, the threshold voltage 1556 is lower than the threshold voltage 1558. For example, the input voltage 1550 is the voltage 550, and the threshold voltage 1556 is a predetermined SR turn-on threshold for the voltage detector 530. As an example, the input voltage 1550 is the voltage 628, and the threshold voltage 1556 is a predetermined SR turn-on threshold for the voltage detector 630. In some examples, the comparator 1570 compares the input voltage 1550 and the threshold voltage 1556 and outputs a comparison signal 1578 at the output terminal 1576. For example, if the input voltage 1550 is larger than the threshold voltage 1556, the comparison signal 1578 is at a logic high level. As an example, if the input voltage 1550 is smaller than the threshold voltage 1556, the comparison signal 1578 is at a logic low level.

According to certain embodiments, the flip-flop 1590 includes an input terminal 1592 (e.g., D), an input terminal 1594 (e.g., CLK), an output terminal 1596 (e.g., Q), and an output terminal 1598 (e.g., Qn). In some examples, the input terminal 1592 (e.g., D) receives the timer signal 1582, the input terminal 1594 (e.g., CLK) receives the comparison signal 1578, and the output terminal 1596 (e.g., Q) outputs a detection signal 1552 (e.g., Enb). For example, the detection signal 1552 (e.g., Enb) is the detection signal 552. As an example, the detection signal 1552 (e.g., Enb) is the detection signal 652. In certain examples, in response to the comparison signal 1578 changing from the logic high level to the logic low level, the flip-flop 1590 generates the detection signal 1552 that is the same as the timer signal 1582 at the time when the comparison signal 1578 changes from the logic high level to the logic low level. For example, when the comparison signal 1578 changes from the logic high level to the logic low level, if the timer signal 1582 is at the logic high level, the flip-flop 1590 generates the detection signal 1552 at the logic high level. As an example, when the comparison signal 1578 changes from the logic high level to the logic low level, if the timer signal 1582 is at the logic low level, the flip-flop 1590 generates the detection signal 1552 at the logic low level.

In some embodiments, the voltage detector 1530 is the voltage detector 530 of the SR control circuit 520 of the flyback switching power supply system 500, the input voltage 1550 is the voltage 550, the threshold voltage 1556 is the predetermined SR turn-on threshold for the voltage detector 530, and the detection signal 1552 (e.g., Enb) is the detection signal 552. For example, if the detection signal 1552 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1552 is at the logic low level, the SR switch 522 (e.g., the transistor M2) remains open (e.g., tuned off).

In certain embodiments, the voltage detector 1530 is the voltage detector 630 of the SR control circuit 620 of the flyback switching power supply system 600, the input voltage 1550 is the voltage 628, the threshold voltage 1556 is the predetermined SR turn-on threshold for the voltage detector 630, and the detection signal 1552 (e.g., Enb) is the detection signal 652. For example, if the detection signal 1552 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1552 is at the logic low level, the SR switch 622 (e.g., the transistor M2) remains open (e.g., tuned off).

Figure 16:
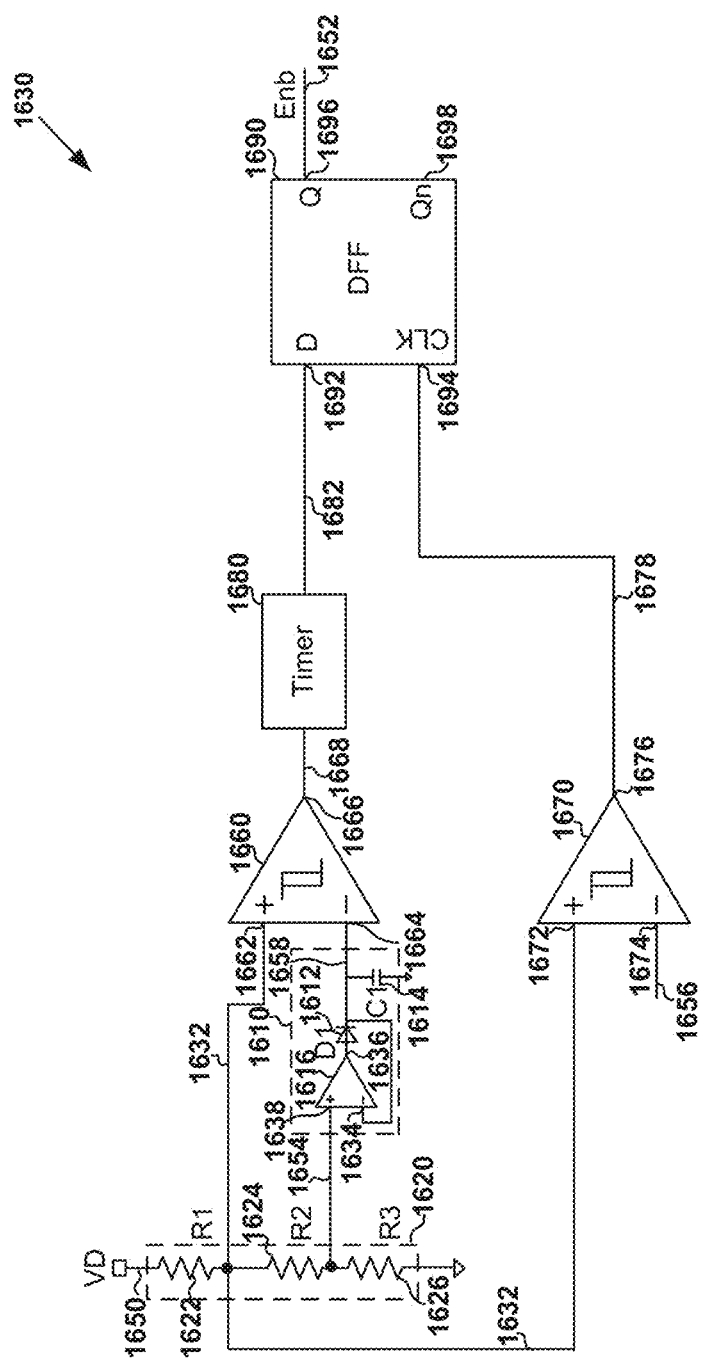
FIG. 16 is a simplified diagram showing one or more components of a voltage detector of an SR control circuit in a flyback switching power supply system according to certain embodiments of the present invention.

FIG. 16 is a simplified diagram showing one or more components of a voltage detector of an SR control circuit in a flyback switching power supply system according to certain embodiments of the present invention. This diagram is merely an example, which should not unduly limit the scope of the claims. One of ordinary skill in the art would recognize many variations, alternatives, and modifications. The voltage detector 1630 includes comparators 1660 and 1670, a timer 1680, a flip-flop 1690, a peak detector 1610, and a voltage divider 1620. As an example, the voltage divider 1620 includes resistors 1622, 1624, and 1626. For example, the peak detector 1610 includes a diode 1612, a capacitor 1614, and an operational amplifier 1616. In some examples, the voltage detector 1630 is the voltage detector 530 of the SR control circuit 520 of the flyback switching power supply system 500 as shown in FIG. 5. In certain examples, the voltage detector 1630 is the voltage detector 630 of the SR control circuit 620 of the flyback switching power supply system 600 as shown in FIG. 6. Although the above has been shown using a selected group of components for the voltage detector 1630, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the voltage divider 1620 receives an input voltage 1650 and generates voltages 1654 and 1632 based at least in part on the input voltage 1650. For example, the input voltage 1650 is the voltage 550. As an example, the input voltage 1650 is the voltage 628. In certain examples, the voltage 1654 is directly proportional to the input voltage 1650, and the voltage 1632 is also directly proportional to the input voltage 1650 as follows:

$$V_{1654} = k_1 \times V_{1650} \quad \text{(Equation 11)}$$

$$V_{1632} = 2 \times V_{1650} \quad \text{(Equation 12)}$$

where $V_{1654}$ represents the voltage 1654, and $V_{1632}$ represents the voltage 1632. Additionally, $k_1$ is a constant, and $k_2$ is also a constant. Moreover, $V_{1650}$ represents the input voltage 1650. For example, $k_1$ and $k_2$ are different, and the voltages 1654 and 1632 are different. As an example, $k_1$ and $k_2$ are equal, and the voltages 1654 and 1632 are the same. For example, the voltage 1654 is directly proportional to the voltage 1632.

In some examples, one terminal of the resistor 1622 is configured to receive the input voltage 1650, and another terminal of the resistor 1622 is connected to one terminal of the resistor 1624 and configured to output the voltage 1632. For example, the resistor 1624 includes another terminal that is connected to one terminal of the resistor 1626 and configured to output the voltage 1654. As an example, the resistor 1626 includes another terminal that is biased to a ground voltage (e.g., the ground voltage of the secondary side of the flyback switching power supply system 500 and/or the ground voltage of the secondary side of the flyback switching power supply system 600).

According to certain embodiments, the peak detector 1610 receives the voltage 1654 from the voltage divider 1620 and generates a threshold voltage 1658 based at least in part on the voltage 1654. In some examples, the operational amplifier 1616 includes a non-inverting input terminal 1638 (e.g., a positive terminal), an inverting input terminal 1634 (e.g., a negative terminal), and an output terminal 1636. For example, the non-inverting input terminal 1638 (e.g., a positive terminal) receives the input voltage 1650. In certain examples, the diode 1612 includes an anode and a cathode. For example, the anode of the diode 1612 is connected to the output terminal 1636 of the operational amplifier 1616. As an example, the cathode of the diode 1612 is connected to the inverting input terminal 1634 (e.g., a negative terminal) of the operational amplifier 1616, and is also connected to a terminal of the capacitor 1614 and biased to the threshold voltage 1658, which is outputted to the comparator 1660. For example, the capacitor 1614 includes another terminal biased to a ground voltage (e.g., the ground voltage of the secondary side of the flyback switching power supply system 500 and/or the ground voltage of the secondary side of the flyback switching power supply system 600). In certain examples, the voltage 1654 rises when the input voltage 1650 rises, the voltage 1654 reaches a divided peak magnitude when the input voltage 1650 reaches an input peak magnitude, and the voltage 1654 drops from the divided peak magnitude when the input voltage 1650 drops from the input peak magnitude. For example, the voltage 1654 charges the capacitor 1614 through the operational amplifier 1616 and the diode 1612, causing the voltage at the cathode of the diode 1612 to rise.

In some embodiments, when the voltage 1654 reaches the divided peak magnitude, the voltage at the cathode of the diode 1612 also reaches a cathode peak magnitude. For example, the cathode peak magnitude is determined as follows:

$$V_{cp} = V_{dp} \quad \text{(Equation 13)}$$

where $V_{cp}$ represents the cathode peak magnitude, and $V_{dp}$ represents the divided peak magnitude. As an example, the cathode peak magnitude is also determined as follows:

$$V_{cp} = k_1 \times V_{ip} \quad \text{(Equation 14)}$$

where $V_{cp}$ represents the cathode peak magnitude, and $V_{ip}$ represents the input peak magnitude. Additionally, $k_1$ is a constant. For example, the cathode peak magnitude (e.g., $V_{cp}$) is not reduced by the forward voltage of the diode 1612. As an example, when the input voltage 1650 drops from the input peak magnitude, the voltage at the cathode of the diode 1612 remains at the cathode peak magnitude and is used as the threshold voltage 1658.

In certain embodiments, the comparator 1660 includes a non-inverting input terminal 1662 (e.g., a positive terminal), an inverting input terminal 1664 (e.g., a negative terminal), and an output terminal 1666. In some examples, the non-inverting input terminal 1662 (e.g., the positive terminal) receives the voltage 1632 from the voltage divider 1620, and the inverting input terminal 1664 (e.g., the negative terminal) receives the threshold voltage 1658 from the peak detector 1610. In some examples, the comparator 1660 compares the voltage 1632 and the threshold voltage 1658 and outputs a comparison signal 1668 at the output terminal 1666. For example, if the voltage 1632 is larger than the threshold voltage 1658, the comparison signal 1668 is at a logic high level. As an example, if the voltage 1632 is smaller than the threshold voltage 1658, the comparison signal 1668 is at a logic low level. In some embodiments, the timer 1680 receives the comparison signal 1668 and outputs a timer signal 1682. For example, in response to the comparison signal 1668 changing from the logic high level to the logic low level, the timer 1680 generates the timer signal 1682 at a logic high level and the timer 1680 starts counting. As an example, a predetermined duration of time after the timer 1680 starts counting, the timer 1680 changes the timer signal 1682 from the logic high level to a logic low level.

According to some embodiments, the comparator 1670 includes a non-inverting input terminal 1672 (e.g., a positive terminal), an inverting input terminal 1674 (e.g., a negative terminal), and an output terminal 1676. In some examples, the non-inverting input terminal 1672 (e.g., the positive terminal) receives the voltage 1632 from the voltage divider 1620, and the inverting input terminal 1674 (e.g., the negative terminal) receives a threshold voltage 1656. In certain examples, the threshold voltage 1656 is a predetermined constant. As an example, the threshold voltage 1656 is lower than the threshold voltage 1658. For example, the threshold voltage 1656 is a predetermined SR turn-on threshold for the voltage detector 530. As an example, the threshold voltage 1656 is a predetermined SR turn-on threshold for the voltage detector 630. In some examples, the comparator 1670 compares the voltage 1632 and the threshold voltage 1656 and outputs a comparison signal 1678 at the output terminal 1676. For example, if the voltage 1632 is larger than the threshold voltage 1656, the comparison signal 1678 is at a logic high level. As an example, if the voltage 1632 is smaller than the threshold voltage 1656, the comparison signal 1678 is at a logic low level.

According to certain embodiments, the flip-flop 1690 includes an input terminal 1692 (e.g., D), an input terminal 1694 (e.g., CLK), an output terminal 1696 (e.g., Q), and an output terminal 1698 (e.g., Qn). In some examples, the input terminal 1692 (e.g., D) receives the timer signal 1682, the input terminal 1694 (e.g., CLK) receives the comparison signal 1678, and the output terminal 1696 (e.g., Q) outputs a detection signal 1652 (e.g., Enb). For example, the detection signal 1652 (e.g., Enb) is the detection signal 552. As an example, the detection signal 1652 (e.g., Enb) is the detection signal 652. In certain examples, in response to the comparison signal 1678 changing from the logic high level to the logic low level, the flip-flop 1690 generates the detection signal 1652 that is the same as the timer signal 1682 at the time when the comparison signal 1678 changes from the logic high level to the logic low level. For example, when the comparison signal 1678 changes from the logic high level to the logic low level, if the timer signal 1682 is at the logic high level, the flip-flop 1690 generates the detection signal 1652 at the logic high level. As an example, when the comparison signal 1678 changes from the logic high level to the logic low level, if the timer signal 1682 is at the logic low level, the flip-flop 1690 generates the detection signal 1652 at the logic low level.

In some embodiments, the voltage detector 1630 is the voltage detector 530 of the SR control circuit 520 of the flyback switching power supply system 500, the input voltage 1650 is the voltage 550, the threshold voltage 1656 is the predetermined SR turn-on threshold for the voltage detector 530, and the detection signal 1652 (e.g., Enb) is the detection signal 552. For example, if the detection signal 1652 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1652 is at the logic low level, the SR switch 522 (e.g., the transistor M2) remains open (e.g., tuned off).

In certain embodiments, the voltage detector 1630 is the voltage detector 630 of the SR control circuit 620 of the flyback switching power supply system 600, the input voltage 1650 is the voltage 628, the threshold voltage 1656 is the predetermined SR turn-on threshold for the voltage detector 630, and the detection signal 1652 (e.g., Enb) is the detection signal 652. For example, if the detection signal 1652 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1652 is at the logic low level, the SR switch 622 (e.g., the transistor M2) remains open (e.g., tuned off).

Figure 17:
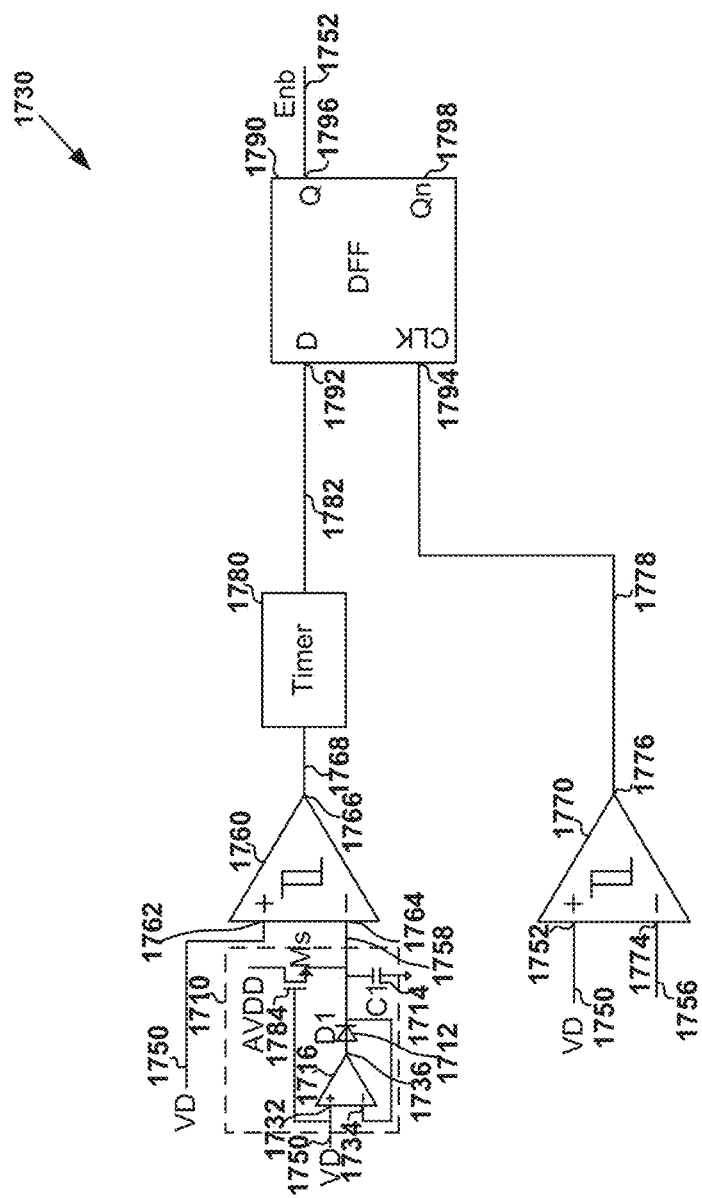
FIG. 17 is a simplified diagram showing one or more components of a voltage detector of an SR control circuit in a flyback switching power supply system according to some embodiments of the present invention.

FIG. 17 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1730 includes comparators 1760 and 1770, a timer 1780, a flip-flop 1790, a peak detector 1710, and a transistor 1784. For example, the peak detector 1710 includes a diode 1712, a capacitor 1714, and an operational amplifier 1716. In some examples, the voltage detector 1730 is the voltage detector 530 of the SR control circuit 520 of the flyback switching power supply system 500 as shown in FIG. 5. In certain examples, the voltage detector 1730 is the voltage detector 630 of the SR control circuit 620 of the flyback switching power supply system 600 as shown in FIG. 6. Although the above has been shown using a selected group of components for the voltage detector 1730, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the peak detector 1710 receives an input voltage 1750 and generates a threshold voltage 1758 based at least in part on the input voltage 1750. For example, the input voltage 1750 is the voltage 550. As an example, the input voltage 1750 is the voltage 628. In some examples, the operational amplifier 1716 includes a non-inverting input terminal 1732 (e.g., a positive terminal), an inverting input terminal 1734 (e.g., a negative terminal), and an output terminal 1736. For example, the non-inverting input terminal 1732 (e.g., a positive terminal) receives the input voltage 1750. In certain examples, the diode 1712 includes an anode and a cathode. For example, the anode of the diode 1712 is connected to the output terminal 1736 of the operational amplifier 1716. As an example, the cathode of the diode 1712 is connected to the inverting input terminal 1734 (e.g., a negative terminal) of the operational amplifier 1716, is connected to a source terminal of the transistor 1784, and is connected to a terminal of the capacitor 1714. For example, the capacitor 1714 includes another terminal biased to a ground voltage (e.g., the ground voltage of the secondary side of the flyback switching power supply system 500 and/or the ground voltage of the secondary side of the flyback switching power supply system 600). As an example, the cathode of the diode 1712 is biased to the threshold voltage 1758, which is outputted to the comparator 1760.

According to some embodiments, the transistor 1784 also includes a gate terminal and a drain terminal. In certain examples, the gate terminal of the transistor 1784 is connected to the non-inverting input terminal 1732 (e.g., a positive terminal) of the operational amplifier 1716, and the gate terminal of the transistor 1784 also receives the input voltage 1750. In some examples, the drain terminal of the transistor 1784 receives a supply voltage (e.g., AVDD). For example, the supply voltage (e.g., AVDD) is a supply voltage for the synchronous rectification (SR) control circuit 520 (e.g., a chip) of the flyback switching power supply system 500. As an example, the supply voltage (e.g., AVDD) is a supply voltage for the synchronous rectification (SR) control circuit 620 (e.g., a chip) of the flyback switching power supply system 600.

According to certain embodiments, when the input voltage 1750 (e.g., the voltage 550 and/or the voltage 628) rises, the input voltage 1750 charges the capacitor 1714 through the operational amplifier 1716, the diode 1712, and the transistor 1784, causing the voltage at the cathode of the diode 1712 to rise. For example, the transistor 1784 improves the speed at which the voltage at the cathode of the diode 1712 rises with the input voltage 1750 (e.g., the voltage 550 and/or the voltage 628) without increasing energy consumption. In some examples, when the input voltage 1750 reaches an input peak magnitude, the voltage at the cathode of the diode 1712 also reaches a cathode peak magnitude. As an example, the cathode peak magnitude is determined as follows:

$$V_{cp}=V_{ip} \quad \text{(Equation 15)}$$

where $V_{cp}$ represents the cathode peak magnitude, and $V_{ip}$ represents the input peak magnitude. For example, the cathode peak magnitude (e.g., $V_{cp}$) is not reduced by the forward voltage of the diode 1712. In certain examples, when the input voltage 1750 drops from the input peak magnitude, the voltage at the cathode of the diode 1712 remains at the cathode peak magnitude and is used as the threshold voltage 1758.

In some embodiments, the comparator 1760 includes a non-inverting input terminal 1762 (e.g., a positive terminal), an inverting input terminal 1764 (e.g., a negative terminal), and an output terminal 1766. In certain examples, the non-inverting input terminal 1762 (e.g., the positive terminal) receives the input voltage 1750, and the inverting input terminal 1764 (e.g., the negative terminal) receives the threshold voltage 1758 from the peak detector 1710. In some examples, the comparator 1760 compares the input voltage 1750 and the threshold voltage 1758 and outputs a comparison signal 1768 at the output terminal 1766. For example, if the input voltage 1750 is larger than the threshold voltage 1758, the comparison signal 1768 is at a logic high level. As an example, if the input voltage 1750 is smaller than the threshold voltage 1758, the comparison signal 1768 is at a logic low level. In some embodiments, the timer 1780 receives the comparison signal 1768 and outputs a timer signal 1782. For example, in response to the comparison signal 1768 changing from the logic high level to the logic low level, the timer 1780 generates the timer signal 1782 at a logic high level and the timer 1780 starts counting. As an example, a predetermined duration of time after the timer 1780 starts counting, the timer 1780 changes the timer signal 1782 from the logic high level to a logic low level.

In certain embodiments, the comparator 1770 includes a non-inverting input terminal 1772 (e.g., a positive terminal), an inverting input terminal 1774 (e.g., a negative terminal), and an output terminal 1776. In some examples, the non-inverting input terminal 1772 (e.g., the positive terminal) receives the input voltage 1750, and the inverting input terminal 1774 (e.g., the negative terminal) receives a threshold voltage 1756. In certain examples, the threshold voltage 1756 is a predetermined constant. As an example, the threshold voltage 1756 is lower than the threshold voltage 1758. For example, the input voltage 1750 is the voltage 550, and the threshold voltage 1756 is a predetermined SR turn-on threshold for the voltage detector 530. As an example, the input voltage 1750 is the voltage 628, and the threshold voltage 1756 is a predetermined SR turn-on threshold for the voltage detector 630. In some examples, the comparator 1770 compares the input voltage 1750 and the threshold voltage 1756 and outputs a comparison signal 1778 at the output terminal 1776. For example, if the input voltage 1750 is larger than the threshold voltage 1756, the comparison signal 1778 is at a logic high level. As an example, if the input voltage 1750 is smaller than the threshold voltage 1756, the comparison signal 1778 is at a logic low level.

According to some embodiments, the flip-flop 1790 includes an input terminal 1792 (e.g., D), an input terminal 1794 (e.g., CLK), an output terminal 1796 (e.g., Q), and an output terminal 1798 (e.g., Qn). In certain examples, the input terminal 1792 (e.g., D) receives the timer signal 1782, the input terminal 1794 (e.g., CLK) receives the comparison signal 1778, and the output terminal 1796 (e.g., Q) outputs a detection signal 1752 (e.g., Enb). For example, the detection signal 1752 (e.g., Enb) is the detection signal 552. As an example, the detection signal 1752 (e.g., Enb) is the detection signal 652. In some examples, in response to the comparison signal 1778 changing from the logic high level to the logic low level, the flip-flop 1790 generates the detection signal 1752 that is the same as the timer signal 1782 at the time when the comparison signal 1778 changes from the logic high level to the logic low level. For example, when the comparison signal 1778 changes from the logic high level to the logic low level, if the timer signal 1782 is at the logic high level, the flip-flop 1790 generates the detection signal 1752 at the logic high level. As an example, when the comparison signal 1778 changes from the logic high level to the logic low level, if the timer signal 1782 is at the logic low level, the flip-flop 1790 generates the detection signal 1752 at the logic low level.

In some embodiments, the voltage detector 1730 is the voltage detector 530 of the SR control circuit 520 of the flyback switching power supply system 500, the input voltage 1750 is the voltage 550, the threshold voltage 1756 is the predetermined SR turn-on threshold for the voltage detector 530, and the detection signal 1752 (e.g., Enb) is the detection signal 552. For example, if the detection signal 1752 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1752 is at the logic low level, the SR switch 522 (e.g., the transistor M2) remains open (e.g., tuned off).

In certain embodiments, the voltage detector 1730 is the voltage detector 630 of the SR control circuit 620 of the flyback switching power supply system 600, the input voltage 1750 is the voltage 628, the threshold voltage 1756 is the predetermined SR turn-on threshold for the voltage detector 630, and the detection signal 1752 (e.g., Enb) is the detection signal 652. For example, if the detection signal 1752 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1752 is at the logic low level, the SR switch 622 (e.g., the transistor M2) remains open (e.g., tuned off).

Figure 18:
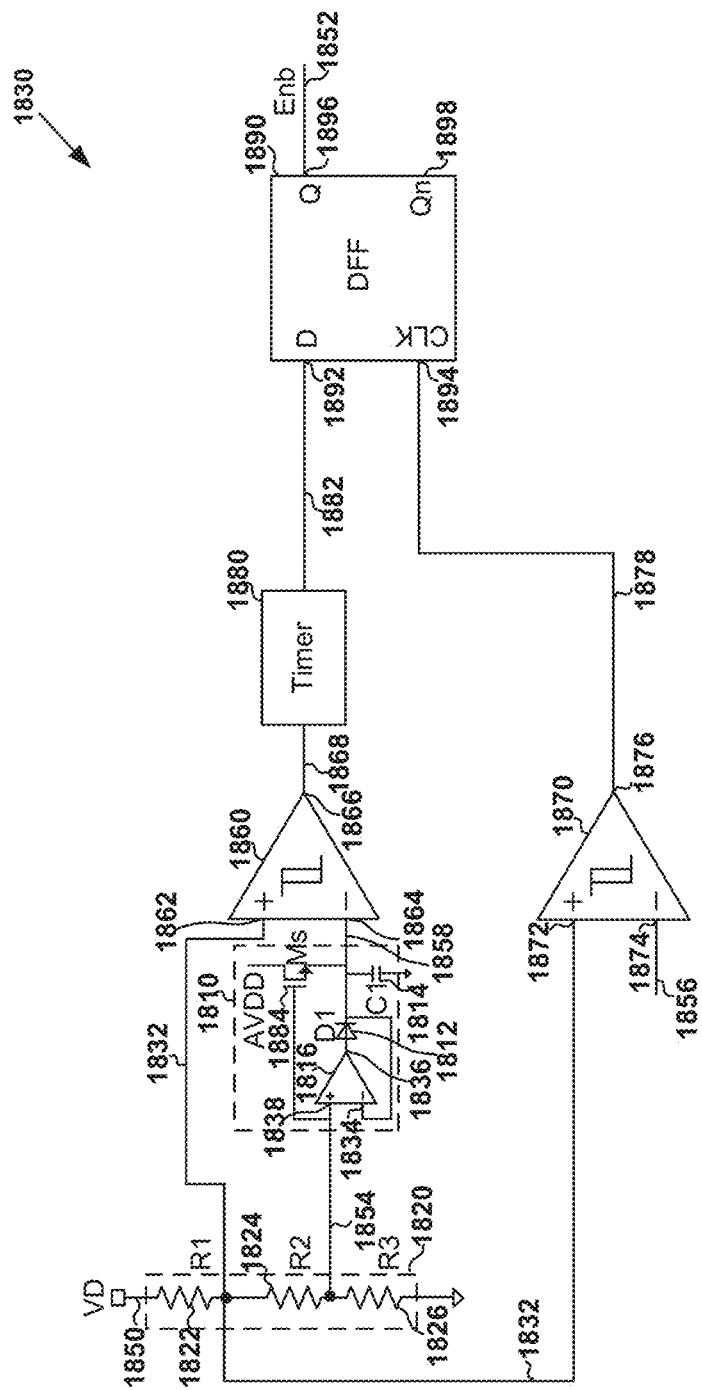
FIG. 18 is a simplified diagram showing one or more components of a voltage detector of an SR control circuit in a flyback switching power supply system according to some embodiments of the present invention.

FIG. 18 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1830 includes comparators 1860 and 1870, a timer 1880, a flip-flop 1890, a peak detector 1810, a transistor 1884, and a voltage divider 1820. As an example, the voltage divider 1820 includes resistors 1822, 1824, and 1826. For example, the peak detector 1810 includes a diode 1812, a capacitor 1814, and an operational amplifier 1816. In some examples, the voltage detector 1830 is the voltage detector 530 of the SR control circuit 520 of the flyback switching power supply system 500 as shown in FIG. 5. In certain examples, the voltage detector 1830 is the voltage detector 630 of the SR control circuit 620 of the flyback switching power supply system 600 as shown in FIG. 6. Although the above has been shown using a selected group of components for the voltage detector 1830, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the voltage divider 1820 receives an input voltage 1850 and generates voltages 1854 and 1832 based at least in part on the input voltage 1850. For example, the input voltage 1850 is the voltage 550. As an example, the input voltage 1850 is the voltage 628. In certain examples, the voltage 1854 is directly proportional to the input voltage 1850, and the voltage 1832 is also directly proportional to the input voltage 1850 as follows:

$$V_{1854}=k_1 \times V_{1850} \qquad \text{(Equation 16)}$$

$$V_{1832}=k_2 \times V_{1850} \qquad \text{(Equation 17)}$$

where $V_{1854}$ represents the voltage 1854, and $V_{1832}$ represents the voltage 1832. Additionally, $k_1$ is a constant, and $k_2$ is also a constant. Moreover, $V_{1850}$ represents the input voltage 1850. For example, $k_1$ and $k_2$ are different, and the voltages 1854 and 1832 are different. As an example, $k_1$ and $k_2$ are equal, and the voltages 1854 and 1832 are the same. For example, the voltage 1854 is directly proportional to the voltage 1832.

In some examples, one terminal of the resistor 1822 is configured to receive the input voltage 1850, and another terminal of the resistor 1822 is connected to one terminal of the resistor 1824 and configured to output the voltage 1832. For example, the resistor 1824 includes another terminal that is connected to one terminal of the resistor 1826 and configured to output the voltage 1854. As an example, the resistor 1826 includes another terminal that is biased to a ground voltage (e.g., the ground voltage of the secondary side of the flyback switching power supply system 500 and/or the ground voltage of the secondary side of the flyback switching power supply system 600).

According to certain embodiments, the peak detector 1810 receives the voltage 1854 and generates a threshold voltage 1858 based at least in part on the voltage 1854. In some examples, the operational amplifier 1816 includes a non-inverting input terminal 1838 (e.g., a positive terminal), an inverting input terminal 1834 (e.g., a negative terminal), and an output terminal 1836. For example, the non-inverting input terminal 1838 (e.g., a positive terminal) receives the voltage 1854. In certain examples, the diode 1812 includes an anode and a cathode. For example, the anode of the diode 1812 is connected to the output terminal 1836 of the operational amplifier 1816. As an example, the cathode of the diode 1812 is connected to the inverting input terminal 1834 (e.g., a negative terminal) of the operational amplifier 1816, is connected to a source terminal of the transistor 1884, and is connected to a terminal of the capacitor 1814. For example, the capacitor 1814 includes another terminal biased to a ground voltage (e.g., the ground voltage of the secondary side of the flyback switching power supply system 500 and/or the ground voltage of the secondary side of the flyback switching power supply system 600). As an example, the cathode of the diode 1812 is biased to the threshold voltage 1858, which is outputted to the comparator 1860.

According to some embodiments, the transistor 1884 also includes a gate terminal and a drain terminal. In certain examples, the gate terminal of the transistor 1884 is connected to the non-inverting input terminal 1838 (e.g., a positive terminal) of the operational amplifier 1816, and the gate terminal of the transistor 1884 also receives the voltage 1854. In some examples, the drain terminal of the transistor 1884 receives a supply voltage (e.g., AVDD). For example, the supply voltage (e.g., AVDD) is a supply voltage for the synchronous rectification (SR) control circuit 520 (e.g., a chip) of the flyback switching power supply system 500. As an example, the supply voltage (e.g., AVDD) is a supply voltage for the synchronous rectification (SR) control circuit 620 (e.g., a chip) of the flyback switching power supply system 600. In certain examples, the voltage 1854 rises when the input voltage 1850 rises, the voltage 1854 reaches a divided peak magnitude when the input voltage 1850 reaches an input peak magnitude, and the voltage 1854 drops from the divided peak magnitude when the input voltage 1850 drops from the input peak magnitude. For example, the voltage 1854 charges the capacitor 1814 through the operational amplifier 1616, the diode 1612, and the transistor 1884, causing the voltage at the cathode of the diode 1812 to rise.

In certain embodiments, when the voltage 1854 reaches the divided peak magnitude, the voltage at the cathode of the diode 1812 also reaches a cathode peak magnitude. For example, the cathode peak magnitude is determined as follows:

$$V_{cp}=V_{dp} \qquad \text{(Equation 18)}$$

where $V_{cp}$ represents the cathode peak magnitude, and $V_{dp}$ represents the divided peak magnitude. As an example, the cathode peak magnitude is also determined as follows:

$$V_{cp}=k_1 \times V_{ip} \qquad \text{(Equation 19)}$$

where $V_{cp}$ represents the cathode peak magnitude, and $V_{ip}$ represents the input peak magnitude. Additionally, $k_1$ is a constant. For example, the cathode peak magnitude (e.g., $V_{cp}$) is not reduced by the forward voltage of the diode 1812. As an example, when the input voltage 1850 drops from the input peak magnitude, the voltage at the cathode of the diode 1812 remains at the cathode peak magnitude and is used as the threshold voltage 1858.

In some embodiments, the comparator 1860 includes a non-inverting input terminal 1862 (e.g., a positive terminal), an inverting input terminal 1864 (e.g., a negative terminal), and an output terminal 1866. In certain examples, the non-inverting input terminal 1862 (e.g., the positive terminal) receives the voltage 1832, and the inverting input terminal 1864 (e.g., the negative terminal) receives the threshold voltage 1858 from the peak detector 1810. In some examples, the comparator 1860 compares the voltage 1832 and the threshold voltage 1858 and outputs a comparison signal 1868 at the output terminal 1866.

For example, if the voltage 1832 is larger than the threshold voltage 1858, the comparison signal 1868 is at a logic high level. As an example, if the voltage 1832 is smaller than the threshold voltage 1858, the comparison signal 1868 is at a logic low level. In some embodiments, the timer 1880 receives the comparison signal 1868 and outputs a timer signal 1882. For example, in response to the comparison signal 1868 changing from the logic high level to the logic low level, the timer 1880 generates the timer signal 1882 at a logic high level and the timer 1880 starts counting. As an example, a predetermined duration of time after the timer 1880 starts counting, the timer 1880 changes the timer signal 1882 from the logic high level to a logic low level.

In certain embodiments, the comparator 1870 includes a non-inverting input terminal 1872 (e.g., a positive terminal), an inverting input terminal 1874 (e.g., a negative terminal), and an output terminal 1876. In some examples, the non-inverting input terminal 1872 (e.g., the positive terminal) receives the voltage 1832, and the inverting input terminal 1874 (e.g., the negative terminal) receives a threshold voltage 1856. In certain examples, the threshold voltage 1856 is a predetermined constant. As an example, the threshold voltage 1856 is lower than the threshold voltage 1858. For example, the threshold voltage 1856 is a predetermined SR turn-on threshold for the voltage detector 530. As an example, the threshold voltage 1856 is a predetermined SR turn-on threshold for the voltage detector 630. In some examples, the comparator 1870 compares the voltage 1832 and the threshold voltage 1856 and outputs a comparison signal 1878 at the output terminal 1876. For example, if the voltage 1832 is larger than the threshold voltage 1856, the comparison signal 1878 is at a logic high level. As an example, if the voltage 1832 is smaller than the threshold voltage 1856, the comparison signal 1878 is at a logic low level.

According to some embodiments, the flip-flop 1890 includes an input terminal 1892 (e.g., D), an input terminal 1894 (e.g., CLK), an output terminal 1896 (e.g., Q), and an output terminal 1898 (e.g., Qn). In certain examples, the input terminal 1892 (e.g., D) receives the timer signal 1882, the input terminal 1894 (e.g., CLK) receives the comparison signal 1878, and the output terminal 1896 (e.g., Q) outputs a detection signal 1852 (e.g., Enb). For example, the detection signal 1852 (e.g., Enb) is the detection signal 552. As an example, the detection signal 1852 (e.g., Enb) is the detection signal 652. In some examples, in response to the comparison signal 1878 changing from the logic high level to the logic low level, the flip-flop 1890 generates the detection signal 1852 that is the same as the timer signal 1882 at the time when the comparison signal 1878 changes from the logic high level to the logic low level. For example, when the comparison signal 1878 changes from the logic high level to the logic low level, if the timer signal 1882 is at the logic high level, the flip-flop 1890 generates the detection signal 1852 at the logic high level. As an example, when the comparison signal 1878 changes from the logic high level to the logic low level, if the timer signal 1882 is at the logic low level, the flip-flop 1890 generates the detection signal 1852 at the logic low level.

In some embodiments, the voltage detector 1830 is the voltage detector 530 of the SR control circuit 520 of the flyback switching power supply system 500, the input voltage 1850 is the voltage 550, the threshold voltage 1856 is the predetermined SR turn-on threshold for the voltage detector 530, and the detection signal 1852 (e.g., Enb) is the detection signal 552. For example, if the detection signal 1852 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1852 is at the logic low level, the SR switch 522 (e.g., the transistor M2) remains open (e.g., tuned off).

In certain embodiments, the voltage detector 1830 is the voltage detector 630 of the SR control circuit 620 of the flyback switching power supply system 600, the input voltage 1850 is the voltage 628, the threshold voltage 1856 is the predetermined SR turn-on threshold for the voltage detector 630, and the detection signal 1852 (e.g., Enb) is the detection signal 652. For example, if the detection signal 1852 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1852 is at the logic low level, the SR switch 622 (e.g., the transistor M2) remains open (e.g., tuned off).

Figure 19:
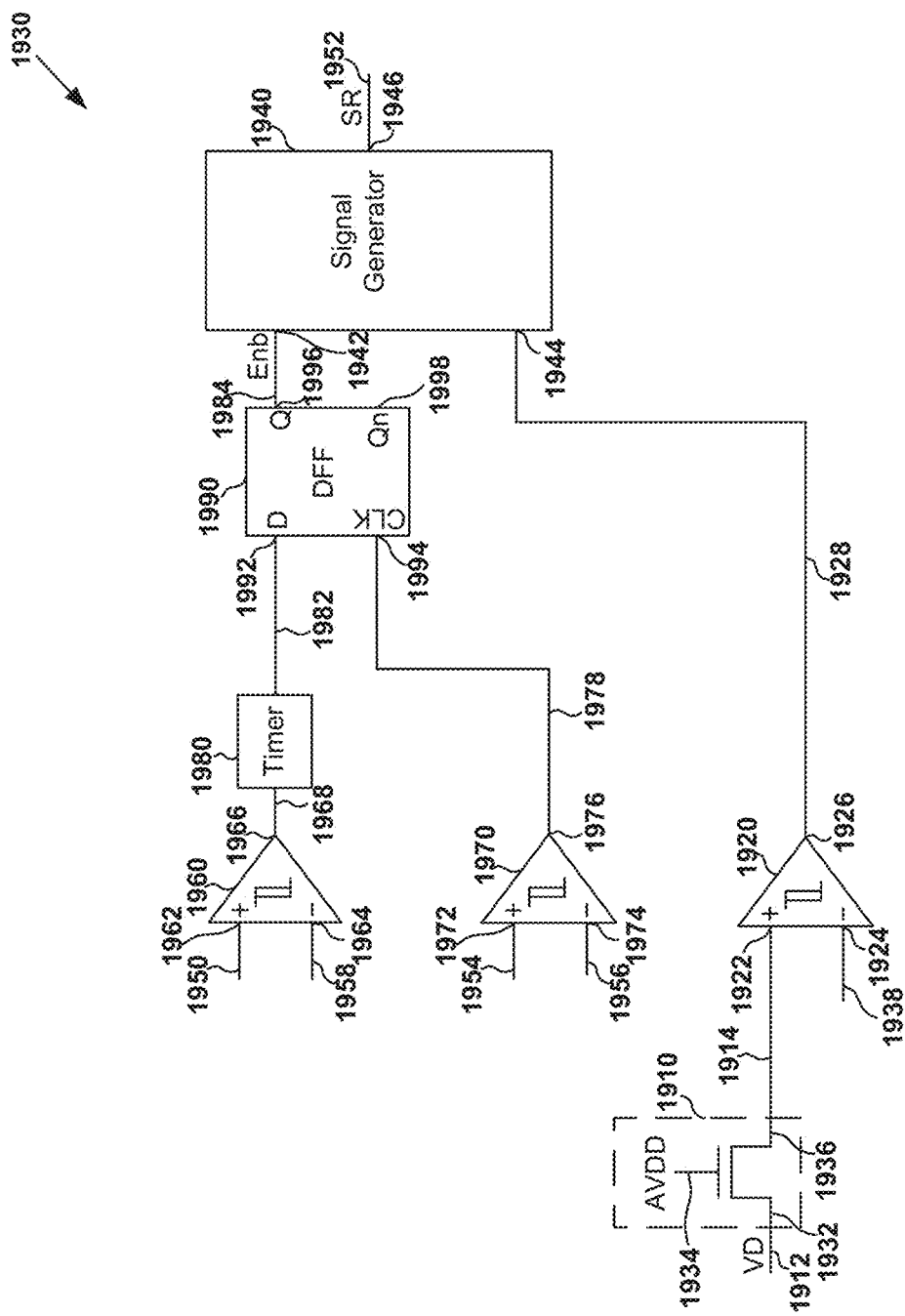
FIG. 19 is a simplified diagram showing one or more components of a voltage detector of an SR control circuit in a flyback switching power supply system according to some embodiments of the present invention.

FIG. 19 is a simplified diagram showing one or more components of a voltage detector of an SR control circuit in a flyback switching power supply system according to some embodiments of the present invention. This diagram is merely an example, which should not unduly limit the scope of the claims. One of ordinary skill in the art would recognize many variations, alternatives, and modifications. The voltage detector 1930 includes comparators 1960 and 1970, a timer 1980, a flip-flop 1990, a transistor 1910, a comparator 1920, and a signal generator 1940. In some examples, the voltage detector 1930 is the voltage detector 530 of the SR control circuit 520 of the flyback switching power supply system 500 as shown in FIG. 5. In certain examples, the voltage detector 1930 is the voltage detector 630 of the SR control circuit 620 of the flyback switching power supply system 600 as shown in FIG. 6. Although the above has been shown using a selected group of components for the voltage detector 1930, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the comparator 1960 includes a non-inverting input terminal 1962 (e.g., a positive terminal), an inverting input terminal 1964 (e.g., a negative terminal), and an output terminal 1966. In some examples, the non-inverting input terminal 1962 (e.g., the positive terminal) receives an input voltage 1950, and the inverting input terminal 1964 (e.g., the negative terminal) receives a threshold voltage 1958. For example, the threshold voltage 1958 is a predetermined constant. In certain examples, the input voltage 1950 is related to the voltage 550 and/or the voltage 628. For example, the input voltage 1950 is the voltage 550. As an example, the input voltage 1950 is the voltage 628. In some examples, the comparator 1960 compares the input voltage 1950 and the threshold voltage 1958 and outputs a comparison signal 1968 at the output terminal 1966. For example, if the input voltage 1950 is larger than the threshold voltage 1958, the comparison signal 1968 is at a logic high level. As an example, if the input voltage 1950 is smaller than the threshold voltage 1958, the comparison signal 1968 is at a logic low level. In some embodiments, the timer 1980 receives the comparison signal 1968 and outputs a timer signal 1982. For example, in response to the comparison signal 1968 changing from the logic high level to the logic low level, the timer 1980 generates the timer signal 1982 at a logic high level and the timer 1980 starts counting. As an example, a predetermined duration of time after the timer 1980 starts counting, the timer 1980 changes the timer signal 1982 from the logic high level to a logic low level.

According to some embodiments, the comparator 1970 includes a non-inverting input terminal 1972 (e.g., a positive terminal), an inverting input terminal 1974 (e.g., a negative terminal), and an output terminal 1976. In some examples, the non-inverting input terminal 1972 (e.g., the positive terminal) receives an input voltage 1954, and the inverting input terminal 1974 (e.g., the negative terminal) receives a threshold voltage 1956. For example, the threshold voltage 1956 is a predetermined constant. As an example, the threshold voltage 1956 is lower than the threshold voltage 1958. For example, the threshold voltage 1956 is not equal to the predetermined SR turn-on threshold (e.g., a predetermined SR turn-on threshold for the voltage detector 530 and/or a predetermined SR turn-on threshold for the voltage detector 630). In certain examples, the input voltage 1954 is related to the voltage 550 and/or the voltage 628. For example, the input voltage 1954 is the voltage 550. As an example, the input voltage 1954 is the voltage 628. In some examples, the comparator 1970 compares the input voltage 1954 and the threshold voltage 1956 and outputs a comparison signal 1978 at the output terminal 1976. For example, if the input voltage 1954 is larger than the threshold voltage 1956, the comparison signal 1978 is at a logic high level. As an example, if the input voltage 1954 is smaller than the threshold voltage 1956, the comparison signal 1978 is at a logic low level.

According to certain embodiments, the flip-flop 1990 includes an input terminal 1992 (e.g., D), an input terminal 1994 (e.g., CLK), an output terminal 1996 (e.g., Q), and an output terminal 1998 (e.g., Qn). In some examples, the input terminal 1992 (e.g., D) receives the timer signal 1982, the input terminal 1994 (e.g., CLK) receives the comparison signal 1978, and the output terminal 1996 (e.g., Q) outputs a signal 1984 (e.g., Enb). In certain examples, in response to the comparison signal 1978 changing from the logic high level to the logic low level, the flip-flop 1990 generates the signal 1984 that is the same as the timer signal 1982 at the time when the comparison signal 1978 changes from the logic high level to the logic low level. For example, when the comparison signal 1978 changes from the logic high level to the logic low level, if the timer signal 1982 is at the logic high level, the flip-flop 1990 generates the signal 1984 at the logic high level. As an example, when the comparison signal 1978 changes from the logic high level to the logic low level, if the timer signal 1982 is at the logic low level, the flip-flop 1990 generates the signal 1984 at the logic low level.

As shown in FIG. 19, the transistor 1910 includes terminals 1932, 1934, and 1936 according to some embodiments. In certain embodiments, the terminal 1932 of the transistor 1910 receives an input voltage 1912. In some examples, the input voltage 1912 is related to the voltage 550 and/or the voltage 628. For example, the input voltage 1912 is the voltage 550. As an example, the input voltage 1912 is the voltage 628. In some embodiments, the terminal 1934 of the transistor 1910 receives a supply voltage (e.g., AVDD). For example, the supply voltage (e.g., AVDD) is a supply voltage for the synchronous rectification (SR) control circuit 520 (e.g., a chip) of the flyback switching power supply system 500. As an example, the supply voltage (e.g., AVDD) is a supply voltage for the synchronous rectification (SR) control circuit 620 (e.g., a chip) of the flyback switching power supply system 600.

According to certain embodiments, the comparator 1920 includes a non-inverting input terminal 1922 (e.g., a positive terminal), an inverting input terminal 1924 (e.g., a negative terminal), and an output terminal 1926. In some examples, the non-inverting input terminal 1922 (e.g., a positive terminal) is connected to the terminal 1936 of the transistor 1910 and is biased to a voltage 1914 that is generated by the transistor 1910. For example, when the transistor 1910 is turned on, the voltage 1914 is equal to the input voltage 1912. In certain examples, the inverting input terminal 1924 (e.g., the negative terminal) receives a threshold voltage 1938. For example, the threshold voltage 1938 is a predetermined constant. As an example, the threshold voltage 1938 is not equal to the threshold voltage 1956 and is not equal to the threshold voltage 1958. In certain examples, the voltage 1914 is related to the voltage 550 and/or the voltage 628. For example, the voltage 1914 is equal to the voltage 550, and the threshold voltage 1938 is a predetermined SR turn-on threshold for the voltage detector 530. As an example, the voltage 1914 is equal to the voltage 628, and the threshold voltage 1938 is a predetermined SR turn-on threshold for the voltage detector 630. In some examples, the comparator 1920 compares the voltage 1914 and the threshold voltage 1938 and outputs a comparison signal 1928 at the output terminal 1926. For example, if the voltage 1914 is larger than the threshold voltage 1938, the comparison signal 1928 is at a logic high level. As an example, if the voltage 1914 is smaller than the threshold voltage 1938, the comparison signal 1928 is at a logic low level.

In some embodiments, the signal generator 1940 includes an input terminal 1942, an input terminal 1944, and an output terminal 1946. In certain examples, the input terminal 1942 receives the signal 1984, the input terminal 1944 receives the comparison signal 1928, and the output terminal 1946 outputs a detection signal 1952 (e.g., SR). For example, the detection signal 1952 is the detection signal 552. As an example, the detection signal 1952 is the detection signal 652. In certain examples, if the signal 1984 is at a logic low level, the signal generator 1940 generates the detection signal 1952 at the logic low level. For example, if the signal 1984 is at a logic high level and the comparison signal 1928 is also at the logic high level, the signal generator 1940 generates the detection signal 1952 at the logic low level. As an example, if the signal 1984 is at the logic high level but the comparison signal 1928 is at the logic low level, the signal generator 1940 generates the detection signal 1952 at the logic high level.

In certain embodiments, the voltage detector 1930 is the voltage detector 530 of the SR control circuit 520 of the flyback switching power supply system 500, and the detection signal 1952 is the detection signal 552. For example, if the detection signal 1952 is at the logic high level, the SR switch 522 (e.g., the transistor M2) is closed (e.g., tuned on) if the one or more logic conditions are determined to be satisfied by the logic controller 534 of the SR control circuit 520. As an example, if the detection signal 1952 is at the logic low level, the SR switch 522 (e.g., the transistor M2) remains open (e.g., tuned off). In some embodiments, the voltage detector 1930 is the voltage detector 630 of the SR control circuit 620 of the flyback switching power supply system 600, and the detection signal 1952 is the detection signal 652. For example, if the detection signal 1952 is at the logic high level, the SR switch 622 (e.g., the transistor M2) is closed (e.g., tuned on) if the one or more logic conditions are determined to be satisfied by the logic controller 634 of the SR control circuit 620. As an example, if the detection signal 1952 is at the logic low level, the SR switch 622 (e.g., the transistor M2) remains open (e.g., tuned off).

As discussed above and further emphasized here, FIG. 19 is merely an example, which should not unduly limit the scope of the claims. One of ordinary skill in the art would recognize many variations, alternatives, and modifications. For example, the voltage detector 1930 is the voltage detector 530 of the SR control circuit 520 of the flyback switching power supply system 500, the input voltage 1950 is the voltage 550, the input voltage 1954 is the voltage 550, the input voltage 1912 is the voltage 550, the threshold voltage 1938 is the predetermined SR turn-on threshold for the voltage detector 530, and the detection signal 1952 (e.g., SR) is the detection signal 552. As an example, the voltage detector 1930 is the voltage detector 630 of the SR control circuit 620 of the flyback switching power supply system 600, the input voltage 1950 is the voltage 628, the input voltage 1954 is the voltage 628, the input voltage 1912 is the voltage 628, the threshold voltage 1938 is the predetermined SR turn-on threshold for the voltage detector 630, and the detection signal 1952 (e.g., SR) is the detection signal 652. In some examples, the transistor 1910 is removed from the voltage detector 1930, and the non-inverting input terminal 1922 (e.g., a positive terminal) of the comparator 1920 directly receives the input voltage 1912. In certain examples, each input voltage of the input voltages 1950, 1954, and 1912 is the voltage 550, or each input voltage of the input voltages 1950, 1954, and 1912 is the voltage 628. In some examples, the voltage detector 1930 also includes a threshold voltage generator, and the threshold voltage 1958 is the same as the threshold voltage 1158, the threshold voltage 1358, the threshold voltage 1558, or the threshold voltage 1758. In certain examples, the voltage detector 1930 also includes a voltage divider that generates the input voltage 1950, the input voltage 1954, and the input voltage 1912. In some examples, the voltage detector 1930 also includes a voltage divider that generates the input voltage 1950, the input voltage 1954, and the input voltage 1912, the voltage detector 1930 also includes a threshold voltage generator that receives a voltage from the voltage divider, and the threshold voltage 1958 is the same as the threshold voltage 1458, the threshold voltage 1658, or the threshold voltage 1858.

Figure 20:
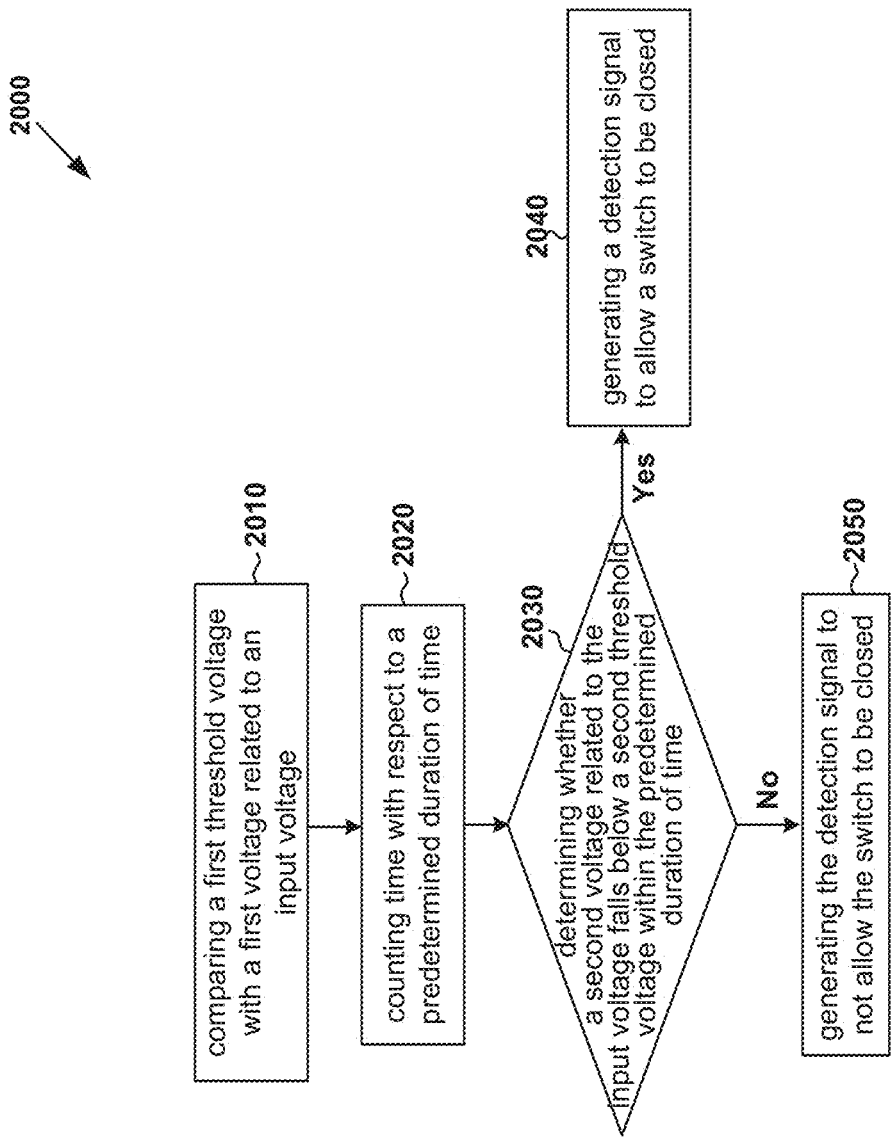
FIG. 20 is a simplified diagram showing a method for generating the detection signal by a voltage detector as shown in FIG. 5, FIG. 6, FIG. 7, FIG. 9, FIG. 11, FIG. 12, FIG. 13, FIG. 14, FIG. 15, FIG. 16, FIG. 17, and/or FIG. 18 according to certain embodiments of the present invention.

FIG. 20 is a simplified diagram showing a method for generating the detection signal by a voltage detector as shown in FIG. 5, FIG. 6, FIG. 7, FIG. 9, FIG. 11, FIG. 12, FIG. 13, FIG. 14, FIG. 15, FIG. 16, FIG. 17, and/or FIG. 18 according to certain embodiments of the present invention. This diagram is merely an example, which should not unduly limit the scope of the claims. One of ordinary skill in the art would recognize many variations, alternatives, and modifications. The method 2000 includes a process 2010 for comparing a first threshold voltage with a first voltage related to an input voltage, a process 2020 for counting time with respect to a predetermined duration of time, a process 2030 for determining whether a second voltage related to the input voltage falls below a second threshold voltage within the predetermined duration of time, a process 2040 for generating a detection signal to allow a switch to be closed, and a process 2050 for generating the detection signal to not allow the switch to be closed. For example, the method 2000 is performed by the voltage detector 530 of the flyback switching power supply system 500 and/or by the voltage detector 630 of the flyback switching power supply system 600. As an example, the method 2000 is performed by the voltage detector 730, the voltage detector 930, the voltage detector 1130, the voltage detector 1230, the voltage detector 1330, the voltage detector 1430, the voltage detector 1530, the voltage detector 1630, the voltage detector 1730, and/or the voltage detector 1830. Although the above has been shown using a selected group of processes for the method 2000, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 2010, a first threshold voltage is compared with a first voltage related to an input voltage according to some embodiments. In certain examples, the first threshold voltage is the threshold voltage 958, the first voltage is the input voltage 950, and the input voltage is also the input voltage 950. In some examples, the first threshold voltage is the threshold voltage 1158, the first voltage is the input voltage 1150, and the input voltage is also the input voltage 1150. In certain examples, the first threshold voltage is the threshold voltage 1358, the first voltage is the input voltage 1350, and the input voltage is also the input voltage 1350. In some examples, the first threshold voltage is the threshold voltage 1558, the first voltage is the input voltage 1550, and the input voltage is also the input voltage 1550. In certain examples, the first threshold voltage is the threshold voltage 1758, the first voltage is the input voltage 1750, and the input voltage is also the input voltage 1750. In some embodiments, the first threshold voltage is the threshold voltage 1458, the first voltage is the voltage 1432, and the input voltage is the input voltage 1450. In certain embodiments, the first threshold voltage is the threshold voltage 1658, the first voltage is the voltage 1632, and the input voltage is the input voltage 1650. In some embodiments, the first threshold voltage is the threshold voltage 1858, the first voltage is the voltage 1832, and the input voltage is the input voltage 1850. For example, if the first voltage related to the input voltage becomes lower than the first threshold voltage, the process 2020 is performed. As an example, if the first voltage related to the input voltage remains higher than the first threshold voltage, the process 2010 is repeated.

At the process 2020, the time starts to be counted towards to a predetermined duration of time according to certain embodiments. In some examples, the time starts to be counted towards to the predetermined duration of time by the timer 980 in response to the comparison signal 968. In certain examples, the time starts to be counted towards to the predetermined duration of time by the timer 1180 in response to the comparison signal 1168. In some examples, the time starts to be counted towards to the predetermined duration of time by the timer 1380 in response to the comparison signal 1368. In certain examples, the time starts to be counted towards to the predetermined duration of time by the timer 1580 in response to the comparison signal 1568. In some examples, the time starts to be counted towards to the predetermined duration of time by the timer 1780 in response to the comparison signal 1768. In certain embodiments, the time starts to be counted towards to the predetermined duration of time by the timer 1480 in response to the comparison signal 1468. In some embodiments, the time starts to be counted towards to the predetermined duration of time by the timer 1680 in response to the comparison signal 1668. In certain embodiments, the time starts to be counted towards to the predetermined duration of time by the timer 1880 in response to the comparison signal 1868.

At the process 2030, whether a second voltage related to the input voltage falls below a second threshold voltage (e.g., a predetermined SR turn-on threshold) within the predetermined duration of time is determined according to some embodiments. For example, the process 2030 is performed by the comparator 970 and the timer 980, by the comparator 1170 and the timer 1180, by the comparator 1370 and the timer 1380, by the comparator 1570 and the timer 1580, and/or by the comparator 1770 and the timer 1780. As an example, the process 2030 is performed by the comparator 1470 and the timer 1480, by the comparator 1670 and the timer 1680, and/or by the comparator 1870 and the timer 1880. In certain examples, the second threshold voltage is the threshold voltage 956, the second voltage is the input voltage 954, and the input voltage is also the input voltage 954. In some examples, the second threshold voltage is the threshold voltage 1156, the second voltage is the input voltage 1154, and the input voltage is also the input voltage 1154. In certain examples, the second threshold voltage is the threshold voltage 1356, the second voltage is the input voltage 1354, and the input voltage is also the input voltage 1354. In some examples, the second threshold voltage is the threshold voltage 1556, the second voltage is the input voltage 1554, and the input voltage is also the input voltage 1554. In certain examples, the second threshold voltage is the threshold voltage 1756, the second voltage is the input voltage 1754, and the input voltage is also the input voltage 1754. In some embodiments, the second threshold voltage is the threshold voltage 1456, the second voltage is the voltage 1432, and the input voltage is the input voltage 1450. In certain embodiments, the second threshold voltage is the threshold voltage 1656, the second voltage is the voltage 1632, and the input voltage is the input voltage 1650. In some embodiments, the second threshold voltage is the threshold voltage 1856, the second voltage is the voltage 1832, and the input voltage is the input voltage 1850. For example, if the second voltage related to the input voltage is determined to fall below the second threshold voltage within the predetermined duration of time, the process 2040 is performed. As an example, if the second voltage related to the input voltage is determined to not fall below the second threshold voltage within the predetermined duration of time, the process 2050 is performed.

At the process 2040, the detection signal is generated to allow a switch to be closed according to certain embodiments. In some examples, the detection signal 952 is generated by the flip-flop 990 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In certain examples, the detection signal 1152 is generated by the flip-flop 1190 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In some examples, the detection signal 1352 is generated by the flip-flop 1390 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In certain examples, the detection signal 1552 is generated by the flip-flop 1590 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In some examples, the detection signal 1752 is generated by the flip-flop 1790 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In certain embodiments, the detection signal 1452 is generated by the flip-flop 1490 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In some embodiments, the detection signal 1652 is generated by the flip-flop 1690 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634). In certain embodiments, the detection signal 1852 is generated by the flip-flop 1890 so that the switch (e.g., the SR switch 522 and/or the SR switch 622) is closed (e.g., tuned on) if the one or more logic conditions are determined to be satisfied by a logic controller (e.g., the logic controller 534 and/or the logic controller 634).

At the process 2050, the detection signal is generated to not allow the switch to be closed according to some embodiments. In certain examples, the detection signal 952 is generated by the flip-flop 990 so that the switch (e.g., the SR switch 522 and/or the SR switch 622) remains open (e.g., tuned off). In some examples, the detection signal 1152 is generated by the flip-flop 1190 so that the switch (e.g., the SR switch 522 and/or the SR switch 622) remains open (e.g., tuned off). In certain examples, the detection signal 1352 is generated by the flip-flop 1390 so that the switch (e.g., the SR switch 522 and/or the SR switch 622) remains open (e.g., tuned off). In some examples, the detection signal 1552 is generated by the flip-flop 1590 so that the switch (e.g., the SR switch 522 and/or the SR switch 622) remains open (e.g., tuned off). In certain examples, the detection signal 1752 is generated by the flip-flop 1790 so that the switch (e.g., the SR switch 522 and/or the SR switch 622) remains open (e.g., tuned off). In some embodiments, the detection signal 1452 is generated by the flip-flop 1490 so that the switch (e.g., the SR switch 522 and/or the SR switch 622) remains open (e.g., tuned off). In certain embodiments, the detection signal 1652 is generated by the flip-flop 1690 so that the switch (e.g., the SR switch 522 and/or the SR switch 622) remains open (e.g., tuned off). In some embodiments, the detection signal 1852 is generated by the flip-flop 1890 so that the switch (e.g., the SR switch 522 and/or the SR switch 622) remains open (e.g., tuned off).

As discussed above and further emphasized here, FIG. 20 is merely an example, which should not unduly limit the scope of the claims. One of ordinary skill in the art would recognize many variations, alternatives, and modifications. In some embodiments, the second threshold voltage is not equal to the predetermined SR turn-on threshold, and the method 2000 further includes a process performed by a voltage detector 1930 as shown in FIG. 19 for comparing the predetermined SR turn-on threshold with the first voltage related to the input voltage. For example, if the first voltage related to the input voltage is determined to fall below the predetermined SR turn-on threshold and the second voltage related to the input voltage is determined to fall below the second threshold voltage within the predetermined duration of time, the process 2040 is performed. As an example, if the first voltage related to the input voltage is determined to not fall below the predetermined SR turn-on threshold or if the second voltage related to the input voltage is determined to not fall below the second threshold voltage within the predetermined duration of time, the process 2050 is performed.

Some embodiments of the present invention provide synchronous rectification (SR) control systems and methods that can prevent the resonance from being mistaken for the secondary-side demagnetization. For example, the SR control systems and methods detect the downward slope, thereby preventing the SR switch from being turned on by mistake during resonance and also preventing the switching power supply system from working disorderly. As an example, the SR control systems and methods achieve accurate and reliable conduction of the SR switch, thus improving the reliability of the switching power supply system.

According to certain embodiments, a system for synchronous rectification of a power converter includes: a first system terminal configured to receive an input voltage; and a second system terminal configured to output a drive signal to a first transistor terminal of a transistor, the transistor further including a second transistor terminal and a third transistor terminal, the second transistor terminal being connected to a secondary winding of the power converter, the power converter further including a primary winding coupled to the secondary winding; wherein the system is configured to: determine whether the input voltage becomes lower than a predetermined voltage threshold; and if the input voltage becomes lower than the predetermined voltage threshold, determine whether a time when the input voltage becomes lower than the predetermined voltage threshold is during or not during a demagnetization process of the secondary winding; wherein the system is further configured to, if the time when the input voltage becomes lower than the predetermined voltage threshold is not during any demagnetization process of the secondary winding, generate the drive signal to turn off the transistor. For example, the system is implemented according to at least FIG. 5, FIG. 6, FIG. 7, FIG. 9, FIG. 11, FIG. 12, FIG. 13, FIG. 14, FIG. 15, FIG. 16, FIG. 17, FIG. 18, and/or FIG. 19.

As an example, the system is further configured to, if the time when the input voltage becomes lower than the predetermined voltage threshold is during a demagnetization process of the secondary winding, allow the drive signal to turn on the transistor. For example, the system is further configured to, if the time when the input voltage becomes lower than the predetermined voltage threshold is during a demagnetization process of the secondary winding, generate the drive signal to turn on the transistor if one or more logic conditions are satisfied.

As an example, the system further includes: a voltage detector configured to process information associated with the input voltage and generate a detection signal based on at least information associated with the input voltage; and a driver configured to process information associated with the detection signal and generate the drive signal based on at least information associated with the detection signal. For example, the voltage detector is further configured to: determine whether a downward slope of the input voltage is larger than a predetermined slope threshold; and determine whether the input voltage becomes smaller than the predetermined voltage threshold. As an example, the voltage detector is further configured to, if the downward slope of the input voltage is larger than the predetermined slope threshold and the input voltage becomes smaller than the predetermined voltage threshold, determine that the time when the input voltage becomes lower than the predetermined voltage threshold is during a demagnetization process of the secondary winding. For example, the voltage detector is further configured to, if the downward slope of the input voltage is smaller than the predetermined slope threshold and the input voltage becomes smaller than the predetermined voltage threshold, determine that the time when the input voltage becomes lower than the predetermined voltage threshold is not during any demagnetization process of the secondary winding.

As an example, the voltage detector includes: a first comparator configured to receive a first comparator threshold and a first comparator voltage directly proportional to the input voltage and generate a first comparison signal based at least in part on the first comparator threshold and the first comparator voltage; a timer configured to receive the first comparison signal and generate a timer signal based at least in part on the first comparison signal and a predetermined duration of time; a second comparator configured to receive the predetermined voltage threshold and a second comparator voltage directly proportional to the input voltage and generate a second comparison signal based at least in part on the predetermined voltage threshold and the second comparator voltage; and a flip-flop configured to receive the timer signal and the second comparison signal and generate the detection signal based at least in part on the timer signal and the second comparison signal; wherein the first comparator threshold is higher than the predetermined voltage threshold.

For example, the first comparator voltage and the second comparator voltage are the same. As an example, the first comparator voltage is equal to the input voltage; and the second comparator voltage is equal to the input voltage. For example, the timer is further configured to, if the first comparison signal indicates that the first comparator voltage becomes smaller than the first comparator threshold at a first time, generate the timer signal at a first logic level from the first time until a second time; wherein a time duration from the first time to the second time is equal to the predetermined duration of time. As an example, the timer is further configured to, if the first comparison signal indicates that the first comparator voltage becomes smaller than the first comparator threshold at the first time, change the timer signal from the first logic level to a second logic level at the second time. For example, the flip-flop is further configured to, if the second comparison signal indicates that the second comparator voltage becomes smaller than the predetermined voltage threshold at a third time, generate the detection signal to be the same as the timer signal at the third time. As an example, the flip-flop is further configured to, if the third time is after the first time but before the second time, the detection signal is at the first logic level. For example, the flip-flop is further configured to, if the third time is after the second time, the detection signal is at the second logic level. As an example, the system is further configured to: if the detection signal is at the first logic level, determine that the time when the input voltage becomes lower than the predetermined voltage threshold is during a demagnetization process of the secondary winding; and if the detection signal is at the second logic level, determine that the time when the input voltage becomes lower than the predetermined voltage threshold is not during any demagnetization process of the secondary winding.

For example, the voltage detector includes: a voltage divider configured to receive the input voltage and generate one or more divider voltages; wherein: the first comparator voltage is one voltage of the one or more divider voltages; and the second comparator voltage is one voltage of the one or more divider voltages. As an example, the voltage detector includes: a threshold voltage generator configured to receive a generator voltage indicating a magnitude of an output voltage of the power converter and generate the first comparator threshold based at least in part on the generator voltage; wherein: the first comparator threshold increases with the increasing generator voltage; and the first comparator threshold decreases with the decreasing generator voltage. For example, the generator voltage is the output voltage of the power converter.

As an example, the voltage detector includes: a peak detector configured to receive a first detector voltage indicating a magnitude of the first comparator voltage, detect a peak magnitude of the first detector voltage, and generate a second detector voltage representing the detected peak magnitude; wherein the first comparator is further configured to receive the second detector voltage as the first comparator threshold. For example, the first detector voltage is the same as the first comparator voltage. As an example, the first detector voltage is directly proportional to the first comparator voltage.

For example, the voltage detector includes: a first comparator configured to receive a first comparator threshold and a first comparator voltage directly proportional to the input voltage and generate a first comparison signal based at least in part on the first comparator threshold and the first comparator voltage; a timer configured to receive the first comparison signal and generate a timer signal based at least in part on the first comparison signal and a predetermined duration of time; and a second comparator configured to receive a second comparator threshold and a second comparator voltage directly proportional to the input voltage and generate a second comparison signal based at least in part on the second comparator threshold and the second comparator voltage; a flip-flop configured to receive the timer signal and the second comparison signal and generate a flip-flop signal based at least in part on the timer signal and the second comparison signal; a third comparator configured to receive the predetermined voltage threshold and a third comparator voltage directly proportional to the input voltage and generate a third comparison signal based at least in part on the predetermined voltage threshold and the third comparator voltage; and a signal generator configured to receive the flip-flop signal and the third comparison signal and generate the detection signal based at least in part on the flip-flop signal and the third comparison signal; wherein: the first comparator threshold is higher than the second comparator threshold; the predetermined voltage threshold is different from the first comparator threshold; and the predetermined voltage threshold is different from the second comparator threshold.

As an example, the timer is further configured to, if the first comparison signal indicates that the first comparator voltage becomes smaller than the first comparator threshold at a first time, generate the timer signal at a first logic level from the first time until a second time; wherein a time duration from the first time to the second time is equal to the predetermined duration of time. For example, the timer is further configured to, if the first comparison signal indicates that the first comparator voltage becomes smaller than the first comparator threshold at the first time, change the timer signal from the first logic level to a second logic level at the second time. As an example, the flip-flop is further configured to, if the second comparison signal indicates that the second comparator voltage becomes smaller than the second comparator threshold at a third time, generate the flip-flop signal to be the same as the timer signal at the third time. For example, the flip-flop is further configured to, if the third time is after the first time but before the second time, the flip-flop signal is at the first logic level. As an example, the flip-flop is further configured to, if the third time is after the second time, the flip-flop signal is at the second logic level. For example, the signal generator is further configured to, if the flip-flop signal is at the first logic level and the third comparison signal indicates that the third comparator voltage is smaller than the predetermined voltage threshold, generate the detection signal indicating that the time when the input voltage becomes lower than the predetermined voltage threshold is during a demagnetization process of the secondary winding.

According to some embodiments, a method for synchronous rectification of a power converter includes: receiving an input voltage; processing information associated with the input voltage; generating a drive signal based on at least information associated with the input voltage; and outputting the drive signal to a transistor terminal of a transistor; wherein the processing information associated with the input voltage includes: determining whether the input voltage becomes lower than a predetermined voltage threshold; and if the input voltage becomes lower than the predetermined voltage threshold, determining whether a time when the input voltage becomes lower than the predetermined voltage threshold is during or not during a demagnetization process of the secondary winding; wherein the generating a drive signal based on at least information associated with the input voltage includes: if the time when the input voltage becomes lower than the predetermined voltage threshold is not during any demagnetization process of the secondary winding, generating the drive signal to turn off the transistor. For example, the method is implemented according to at least FIG. 5, FIG. 6, FIG. 7, FIG. 9, FIG. 11, FIG. 12, FIG. 13, FIG. 14, FIG. 15, FIG. 16, FIG. 17, FIG. 18, and/or FIG. 19.

As an example, the generating a drive signal based on at least information associated with the input voltage further includes: if the time when the input voltage becomes lower than the predetermined voltage threshold is during a demagnetization process of the secondary winding, allowing the drive signal to turn on the transistor. For example, the generating a drive signal based on at least information associated with the input voltage further includes: if the time when the input voltage becomes lower than the predetermined voltage threshold is during a demagnetization process of the secondary winding, generating the drive signal to turn on the transistor if one or more logic conditions are satisfied. As an example, the processing information associated with the input voltage further includes: determining whether a downward slope of the input voltage is larger than a predetermined slope threshold; and determining whether the input voltage becomes smaller than the predetermined voltage threshold. For example, the processing information associated with the input voltage further includes: if the downward slope of the input voltage is larger than the predetermined slope threshold and the input voltage becomes smaller than the predetermined voltage threshold, determining that the time when the input voltage becomes lower than the predetermined voltage threshold is during a demagnetization process of the secondary winding. As an example, the processing information associated with the input voltage further includes: if the downward slope of the input voltage is smaller than the predetermined slope threshold and the input voltage becomes smaller than the predetermined voltage threshold, determining that the time when the input voltage becomes lower than the predetermined voltage threshold is not during any demagnetization process of the secondary winding.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for synchronous rectification of a power converter, the power converter including a primary winding and a secondary winding, the system comprising:
   a first system terminal configured to receive an input voltage; and
   a second system terminal configured to output a drive signal to a transistor coupled to the secondary winding;
   wherein the system is configured to:
      determine whether the input voltage becomes lower than a predetermined voltage threshold; and
      if the input voltage becomes lower than the predetermined voltage threshold, determine whether a time when the input voltage becomes lower than the predetermined voltage threshold is during or not during any demagnetization process of the secondary winding.

2. The system of claim 1 is further configured to, if the time when the input voltage becomes lower than the predetermined voltage threshold is during a demagnetization process of the secondary winding, allow the drive signal to turn on the transistor.

3. The system of claim 2 is further configured to, if the time when the input voltage becomes lower than the predetermined voltage threshold is during the demagnetization process of the secondary winding, generate the drive signal to turn on the transistor if one or more logic conditions are satisfied.

4. The system of claim 1, and further comprising:
   a voltage detector configured to process information associated with the input voltage and generate a detection signal based on at least the information associated with the input voltage; and
   a driver configured to process information associated with the detection signal and generate the drive signal based on at least the information associated with the detection signal.

5. The system of claim 4 wherein the voltage detector is further configured to:
   determine whether a downward slope of the input voltage is larger than a predetermined slope threshold; and
   determine whether the input voltage becomes smaller than the predetermined voltage threshold.

6. The system of claim 5 wherein the voltage detector is further configured to, if the downward slope of the input voltage is larger than the predetermined slope threshold and the input voltage becomes smaller than the predetermined voltage threshold, determine that the time when the input voltage becomes lower than the predetermined voltage threshold is during a demagnetization process of the secondary winding.

7. The system of claim 5 wherein the voltage detector is further configured to, if the downward slope of the input voltage is smaller than the predetermined slope threshold and the input voltage becomes smaller than the predetermined voltage threshold, determine that the time when the input voltage becomes lower than the predetermined voltage threshold is not during any demagnetization process of the secondary winding.

8. The system of claim 4 wherein the voltage detector includes:
   a first comparator configured to receive a first comparator threshold and a first comparator voltage directly proportional to the input voltage and generate a first comparison signal based at least in part on the first comparator threshold and the first comparator voltage;
   a timer configured to receive the first comparison signal and generate a timer signal based at least in part on the first comparison signal and a predetermined duration of time;
   a second comparator configured to receive the predetermined voltage threshold and a second comparator voltage directly proportional to the input voltage and generate a second comparison signal based at least in part on the predetermined voltage threshold and the second comparator voltage; and
   a flip-flop configured to receive the timer signal and the second comparison signal and generate the detection signal based at least in part on the timer signal and the second comparison signal;
   wherein the first comparator threshold is higher than the predetermined voltage threshold.

9. The system of claim 8 wherein the first comparator voltage and the second comparator voltage are the same.

10. The system of claim 9 wherein:
    the first comparator voltage is equal to the input voltage; and
    the second comparator voltage is equal to the input voltage.

11. The system of claim 8 wherein:
    the timer is further configured to, if the first comparison signal indicates that the first comparator voltage becomes smaller than the first comparator threshold at a first time, generate the timer signal at a first logic level from the first time until a second time;

wherein a time duration from the first time to the second time is equal to the predetermined duration of time.

12. The system of claim 11 wherein the timer is further configured to, if the first comparison signal indicates that the first comparator voltage becomes smaller than the first comparator threshold at the first time, change the timer signal from the first logic level to a second logic level at the second time.

13. The system of claim 12 wherein the flip-flop is further configured to, if the second comparison signal indicates that the second comparator voltage becomes smaller than the predetermined voltage threshold at a third time, generate the detection signal to be the same as the timer signal at the third time.

14. The system of claim 13 wherein the flip-flop is further configured to, if the third time is after the first time but before the second time, generate the detection signal to be the first logic level.

15. The system of claim 14 wherein the flip-flop is further configured to, if the third time is after the second time, generate the detection signal to be the second logic level.

16. The system of claim 15 is further configured to:
if the detection signal is at the first logic level, determine that the time when the input voltage becomes lower than the predetermined voltage threshold is during a demagnetization process of the secondary winding; and
if the detection signal is at the second logic level, determine that the time when the input voltage becomes lower than the predetermined voltage threshold is not during any demagnetization process of the secondary winding.

17. The system of claim 4 wherein the voltage detector includes:
a voltage divider configured to receive the input voltage and generate one or more divider voltages;
wherein:
a first comparator voltage is one voltage of the one or more divider voltages; and
a second comparator voltage is one voltage of the one or more divider voltages.

18. The system of claim 4 wherein the voltage detector includes:
a threshold voltage generator configured to receive a generator voltage indicating a magnitude of an output voltage of the power converter and generate the first comparator threshold based at least in part on the generator voltage;
wherein:
a first comparator threshold increases with an increasing generator voltage; and
a first comparator threshold decreases with a decreasing generator voltage.

19. The system of claim 18 wherein the generator voltage is the output voltage of the power converter.

20. The system of claim 4 wherein the voltage detector includes:
a peak detector configured to receive a first detector voltage indicating a magnitude of the first comparator voltage, detect a peak magnitude of the first detector voltage, and generate a second detector voltage representing the detected peak magnitude;
wherein a first comparator is configured to receive the second detector voltage as the first comparator threshold.

21. The system of claim 20 wherein the first detector voltage is the same as the first comparator voltage.

22. The system of claim 21 wherein the first detector voltage is directly proportional to the first comparator voltage.

23. The system of claim 4 wherein the voltage detector includes:
a first comparator configured to receive a first comparator threshold and a first comparator voltage directly proportional to the input voltage and generate a first comparison signal based at least in part on the first comparator threshold and the first comparator voltage;
a timer configured to receive the first comparison signal and generate a timer signal based at least in part on the first comparison signal and a predetermined duration of time;
a second comparator configured to receive a second comparator threshold and a second comparator voltage directly proportional to the input voltage and generate a second comparison signal based at least in part on the second comparator threshold and the second comparator voltage;
a flip-flop configured to receive the timer signal and the second comparison signal and generate a flip-flop signal based at least in part on the timer signal and the second comparison signal;
a third comparator configured to receive the predetermined voltage threshold and a third comparator voltage directly proportional to the input voltage and generate a third comparison signal based at least in part on the predetermined voltage threshold and the third comparator voltage; and
a signal generator configured to receive the flip-flop signal and the third comparison signal and generate the detection signal based at least in part on the flip-flop signal and the third comparison signal;
wherein:
the first comparator threshold is higher than the second comparator threshold;
the predetermined voltage threshold is different from the first comparator threshold; and
the predetermined voltage threshold is different from the second comparator threshold.

24. The system of claim 23 wherein:
the timer is further configured to, if the first comparison signal indicates that the first comparator voltage becomes smaller than the first comparator threshold at a first time, generate the timer signal at a first logic level from the first time until a second time;
wherein a time duration from the first time to the second time is equal to the predetermined duration of time.

25. The system of claim 24 wherein the timer is further configured to, if the first comparison signal indicates that the first comparator voltage becomes smaller than the first comparator threshold at the first time, change the timer signal from the first logic level to a second logic level at the second time.

26. The system of claim 25 wherein the flip-flop is further configured to, if the second comparison signal indicates that the second comparator voltage becomes smaller than the second comparator threshold at a third time, generate the flip-flop signal to be the same as the timer signal at the third time.

27. The system of claim 26 wherein the flip-flop is further configured to, if the third time is after the first time but before the second time, generate the flip-flop signal to be the first logic level.

28. The system of claim 27 wherein the flip-flop is further configured to, if the third time is after the second time, generate the flip-flop signal to be the second logic level.

29. The system of claim 28 wherein the signal generator is further configured to, if the flip-flop signal is at the first logic level and the third comparison signal indicates that the third comparator voltage is smaller than the predetermined voltage threshold, generate the detection signal indicating that the time when the input voltage becomes lower than the predetermined voltage threshold is during a demagnetization process of the secondary winding.

30. A method for synchronous rectification of a power converter, the power converter including a primary winding and a secondary winding, the method comprising:
receiving an input voltage;
processing information associated with the input voltage;
generating a drive signal based on at least information associated with the input voltage; and
outputting the drive signal to a transistor coupled to the secondary winding;
wherein the processing information associated with the input voltage includes:
determining whether the input voltage becomes lower than a predetermined voltage threshold; and
if the input voltage becomes lower than the predetermined voltage threshold, determining whether a time when the input voltage becomes lower than the predetermined voltage threshold is during or not during any demagnetization process of the secondary winding.

31. The method of claim 30 wherein the generating the drive signal based on at least information associated with the input voltage includes:
if the time when the input voltage becomes lower than the predetermined voltage threshold is during a demagnetization process of the secondary winding, allowing the drive signal to turn on the transistor.

32. The method of claim 31 wherein the generating the drive signal based on at least information associated with the input voltage further includes:
if the time when the input voltage becomes lower than the predetermined voltage threshold is during a demagnetization process of the secondary winding, generating the drive signal to turn on the transistor if one or more logic conditions are satisfied.

33. The method of claim 30 wherein the processing information associated with the input voltage further includes:
determining whether a downward slope of the input voltage is larger than a predetermined slope threshold; and
determining whether the input voltage becomes smaller than the predetermined voltage threshold.

34. The method of claim 33 wherein the processing information associated with the input voltage further includes:
if the downward slope of the input voltage is larger than the predetermined slope threshold and the input voltage becomes smaller than the predetermined voltage threshold, determining that the time when the input voltage becomes lower than the predetermined voltage threshold is during a demagnetization process of the secondary winding.

35. The method of claim 34 wherein the processing information associated with the input voltage further includes:
if the downward slope of the input voltage is smaller than the predetermined slope threshold and the input voltage becomes smaller than the predetermined voltage threshold, determining that the time when the input voltage becomes lower than the predetermined voltage threshold is not during any demagnetization process of the secondary winding.

\* \* \* \* \*